(12) United States Patent
Wan et al.

(10) Patent No.: US 7,947,108 B2
(45) Date of Patent: May 24, 2011

(54) PRECIOUS METAL RECOVERY USING THIOCYANATE LIXIVIANT

(75) Inventors: Rong Yu Wan, Highlands Ranch, CO (US); K. Marc LeVier, Englewood, CO (US)

(73) Assignee: Newmont USA Limited, Denver, CO (US)

( * ) Notice: Subject to any disclaimer, the term of this patent is extended or adjusted under 35 U.S.C. 154(b) by 0 days.

(21) Appl. No.: 12/476,084

(22) Filed: Jun. 1, 2009

(65) Prior Publication Data

US 2009/0288521 A1 Nov. 26, 2009

Related U.S. Application Data

(62) Division of application No. 11/868,378, filed on Oct. 5, 2007, now Pat. No. 7,559,973, which is a division of application No. 10/651,184, filed on Aug. 28, 2003, now Pat. No. 7,285,256.

(60) Provisional application No. 60/470,045, filed on May 12, 2003, provisional application No. 60/460,795, filed on Apr. 4, 2003.

(51) Int. Cl.
*C22B 3/04* (2006.01)
(52) U.S. Cl. .............................. 75/743; 75/744; 423/27
(58) Field of Classification Search .............. 75/743, 75/744; 423/27
See application file for complete search history.

(56) References Cited

U.S. PATENT DOCUMENTS

| | | | |
|---|---|---|---|
| 3,403,020 A | 9/1968 | Lower | |
| 3,545,964 A * | 12/1970 | Hansen et al. | 423/38 |
| 3,793,429 A | 2/1974 | Queneau et al. | |
| 4,608,176 A | 8/1986 | Fleming | |
| 4,764,353 A | 8/1988 | Babjak et al. | |
| 4,913,730 A | 4/1990 | Deschenes et al. | |
| 5,061,459 A | 10/1991 | Bennett et al. | |
| 5,071,477 A * | 12/1991 | Thomas et al. | 75/744 |
| 5,093,091 A | 3/1992 | Dauplaise et al. | |
| 5,127,942 A | 7/1992 | Brierley et al. | |
| 5,147,617 A | 9/1992 | Touro et al. | |
| 5,158,603 A | 10/1992 | Stierman et al. | |
| 5,223,023 A | 6/1993 | Awadalla et al. | |
| 5,244,493 A | 9/1993 | Brierley et al. | |
| 5,246,486 A | 9/1993 | Brierley et al. | |
| 5,260,040 A | 11/1993 | Kenna | |
| 5,332,559 A | 7/1994 | Brierley et al. | |
| 5,458,866 A | 10/1995 | Simmons | |
| 5,536,480 A | 7/1996 | Simmons | |

(Continued)

FOREIGN PATENT DOCUMENTS

CA 2013537 A1 9/1991

(Continued)

OTHER PUBLICATIONS

Barbosa-Filho, O et al. Thermochemistry of thiocyanate systems for leaching gold and silver ores. Precious Metals '89. TMS, 1988. pp. 307-339.

(Continued)

*Primary Examiner* — George Wyszomierski
*Assistant Examiner* — Tima M McGuthry-Banks
(74) *Attorney, Agent, or Firm* — Marsh Fischmann & Breyfogle LLP

(57) ABSTRACT

Mineral materials comprising copper and precious metal are subjected to an acidic leach of the copper followed by an acidic thiocyanate leach of the precious metal.

14 Claims, 20 Drawing Sheets

U.S. PATENT DOCUMENTS

| | | | |
|---|---|---|---|
| 5,698,170 A * | 12/1997 | King | 423/24 |
| 5,834,294 A | 11/1998 | Brierley et al. | |
| 5,851,499 A | 12/1998 | Gathje et al. | |
| 5,885,327 A | 3/1999 | Virnig | |
| 5,914,441 A * | 6/1999 | Hunter et al. | 75/712 |
| 6,344,068 B1 | 2/2002 | Fleming et al. | |
| 6,355,175 B1 | 3/2002 | Green et al. | |
| 6,379,919 B1 | 4/2002 | Carter | |
| 6,395,063 B1 | 5/2002 | Cole | |
| 6,641,642 B2 | 11/2003 | Simmons et al. | |
| 6,660,059 B2 | 12/2003 | Ji et al. | |
| 7,285,256 B2 | 10/2007 | Wan et al. | |
| 7,537,640 B2 | 5/2009 | Wan et al. | |
| 7,559,973 B2 | 7/2009 | Wan et al. | |
| 2002/0092377 A1 | 7/2002 | Ji et al. | |

FOREIGN PATENT DOCUMENTS

| | | | |
|---|---|---|---|
| GB | 2 180 829 A | | 4/1987 |
| RU | 2070588 C1 | | 12/1996 |
| RU | 2081193 C1 | * | 6/1997 |
| WO | 91/11539 A1 | | 8/1991 |
| WO | 03/010345 A1 | | 2/2003 |
| WO | 2004/046036 A2 | | 6/2004 |

OTHER PUBLICATIONS

Barbosa-Filho, O et al. Leaching of gold in thiocyanate solutions—Part 1: Chemistry and thermodynamics. Transactions of the Institute of Mining and Metallurgy (Section C). 1994. vol. 103. pp. C105-C110.

Barbosa-Filho, O et al. Leaching of gold in thiocyanate solutions—Part 2: Redox processes in iron (III)—thiocyanate solutions. Transactions of the Institute of Mining and Metallurgy (Section C). 1994. vol. 103. pp. C111-C116.

Barbosa-Filho, O et al. Leaching of gold in thiocyanate solutions—Part 3: Rates and mechanism of gold dissolution. Transactions of the Institute of Mining and Metallurgy (Section C). 1994. vol. 103. pp. C117-C125.

Botz, M et al. Technologies for the regeneration of cyanide from thiocyanate. SME Annual Meeting. Feb. 28-Mar. 1, 2000. Salt Lake City, Utah. pp. 1-10.

Broadhurst, JL et al. A thermodynamic study of the dissolution of gold in an acidic aqueous thiocyanate medium using iron (III) sulfate as an oxidant. Hydrometallurgy. 1993. vol. 32. pp. 317-344.

Kholmogorov, A.G. et al. Thiocyanate solutions in gold technology. Hydrometallurgy. 2002. vol. 64. pp. 43-48.

Laskorin, BI et al. Autoclave Oxidation of Sulfide-Arsenious Gold-Bearing Concentrates. Gold Hydrometallurgy. USSR Academy of Sciences. "Nauka" Publisher. 1980. pp. 52-53.

Munoz, GA et al. Noncyanide leaching of an auriferous pyrite ore from Ecuador. Minerals and Metallurgical Processing. 2000. vol. 17, No. 3. pp. 198-204.

Meretukov, MA and Orlov AM. Metallurgy of Precious Metals Foreign Experience. Moscow "Metallurgy" Publisher. 1991. pp. 242-245.

Monhemius et al. Leaching of Dominican gold ores in iodide-catalysed thiocyanate solutions. Transactions of the Institute of Mining and Metallurgy (Section C). 1995. vol. 104, pp. C117-124.

* cited by examiner

PRECIOUS METAL RECOVERY USING THIOCYANATE LIXIVIANT

CROSS-REFERENCE TO RELATED APPLICATIONS

This application is a divisional of U.S. patent application Ser. No. 11/868,378 entitled "PRECIOUS METAL RECOVERY USING THIOCYANATE LIXIVIANT" filed Oct. 5, 2007, now U.S. Pat. No. 7,559,973, which is a divisional of U.S. patent application Ser. No. 10/651,184 by Wan et al. entitled "PRECIOUS METAL RECOVERY USING THIOCYANATE LIXIVIANT" filed Aug. 28, 2003, now U.S. Pat. No. 7,285,256, which claims a priority benefit to U.S. Provisional Patent Application No. 60/470,045 by Wan et al. entitled "PRECIOUS METAL RECOVERY USING THIOCYANATE LIXIVIANT" filed May 12, 2003 and to U.S. Provisional Patent Application No. 60/460,795 by Wan et al. entitled "PRECIOUS METAL RECOVERY USING THIOCYANATE LIXIVIANT" filed Apr. 4, 2003; and each and every portion of the contents of each of the aforementioned U.S. patent application Ser. No. 11/868,378, U.S. patent application Ser. No. 10/651,184, U.S. Provisional Patent Application No. 60/470,045 and U.S. Provisional Patent Application No. 60/460,795 are incorporated by reference herein as if set forth herein in full.

FIELD OF THE INVENTION

The invention described herein relates to methods for use in mineral processing for precious metal recovery, and more specifically to the use of thiocyanate lixiviants for gold recovery.

BACKGROUND OF THE INVENTION

A common technique for recovering gold from gold-bearing ores is to leach the gold into an aqueous cyanide leach solution in which the gold is solubilized as gold-cyanide complex. In some instances, the gold is leached directly from the ore or a concentrate prepared from the ore. This is the case for many oxide ores. In other instances, prior to cyanide leaching the ore or ore concentrate is pretreated to effect a chemical change to enhance cyanide leach performance. For example, gold-bearing sulfide ores are often refractory to direct cyanide leaching. Therefore, prior to cyanide leaching, such refractory sulfide ores, or sulfide concentrates prepared from such refractory sulfide ores, are often subjected to an oxidative pretreatment to decompose sulfide minerals and thereby release gold for recovery during subsequent cyanide leaching.

The leach solution loaded with gold is often referred to as a "pregnant" leach solution. After the gold has been dissolved into a cyanide leach solution, the gold is then removed from the pregnant cyanide leach solution. This is typically accomplished by contacting the pregnant cyanide leach solution with activated carbon granules under conditions conducive to adsorption of the gold-cyanide complex onto the activated carbon granules. After the carbon granules are loaded with gold, the carbon granules are then separated from the now barren cyanide leach solution, which may be recycled to leach additional gold. Gold is removed from the loaded carbon granules by stripping the gold from the carbon granules using a suitable strip solution, such as for example a hot caustic solution. The gold is then removed from the strip solution, such as for example by electro-winning to prepare a crude metallic product called doré. The doré is subjected to further refining to high purity gold.

Cyanide leaching can be conducted either in a heap operation or in a reactor. In a heap operation, barren cyanide leach solution feed is applied to the surface of a heap of the mineral material to be treated. The cyanide leach solution percolates through the heap and leaches gold from the mineral material. Pregnant cyanide leach solution draining from the heap is collected and contacted with activated carbon to remove gold from the pregnant cyanide leach solution.

When cyanide leaching is conducted in a reactor, the mineral material to be leached is slurried with the cyanide leach solution in a reactor vessel or vessels for sufficient time for effective leaching of the gold. In a so-called carbon-in-pulp operation, following the cyanide leach, activated carbon is then contacted with the pulp in a series of vessels, with the activated carbon advancing through the series of vessels in a countercurrent fashion relative to advancement of the pulp. In a so-called carbon-in-leach operation, the leaching is conducted in the presence of the activated carbon, so that cyanide leaching and adsorption onto activated carbon occur simultaneously in the same vessels.

The cyanide leach process is an industry standard that works well in many situations. There are, however, situations when implementation of a cyanide leach is difficult or impractical.

One problematic situation involves the processing of refractory sulfide gold ores in which the gold is locked within one or more sulfide mineral from which the gold is generally not amenable to recovery by direct cyanide leaching. As noted, these ores, or concentrates made from such ores, are frequently subjected to an oxidative pretreatment prior to cyanide leaching. During the oxidative pretreatment, at least a portion of sulfide sulfur in the sulfide mineral is oxidized, resulting in decomposition of sulfide minerals and release of gold. The gold released from the sulfide minerals remains with the solids following the oxidative pretreatment, and the solids are then leached with a cyanide leach solution to dissolve the gold. One oxidative pretreatment technique is bio-oxidation, in which sulfide sulfur in the ore or concentrate is oxidized as a result of microbial activity. Another oxidative pretreatment technique is pressure oxidation, in which the ore or concentrate is subjected to oxygen gas at high temperature and pressure in an autoclave. Yet another oxidative pretreatment technique is oxidative roasting of the ore or concentrate.

A problem with cyanide leaching of the residual solids following oxidative pretreatment is that the residual solids are often highly acidic, while the cyanide leach must ordinarily be conducted at an alkaline pH. As a consequence, it is necessary to neutralize the solids prior to cyanide leaching. This neutralization typically requires adding large quantities of lime or some other neutralizing reagent to the solids, and significantly adds to the expense and complexity of the operation. In the case of bio-oxidation that has been performed in a heap, neutralizing the solids requires removing the heap following bio-oxidation, neutralizing the oxidized solids by mixing the solids with lime or some other neutralizing reagent, and then depositing a new heap of the neutralized mixture for the cyanide leach. Removing a heap, neutralizing solids and depositing a new heap following bio-oxidation to facilitate cyanide leaching significantly add to the cost and complexity of the gold recovery operation. Also, even after the addition of a neutralizing agent, the solids typically still contain significant sulfide sulfur, the presence of which can complicate gold recovery operations. For example, some amount of sulfide sulfur may continue to oxidize during cyanide leaching operations, and even low levels of such oxidation may cause significant material handling problems. One such material handling problem is that oxidized sulfur can react with calcium from the neutralizing agent (e.g., from the lime addition) to form insoluble gypsum, that can plug pores in the heap, resulting in localized reductions in heap permeability during cyanide leaching. As another example, cyanide lixiviant may react directly with remaining sulfide sulfur, resulting in high consumption of cyanide.

Another problematic situation involves processing sulfide gold ores that have only a moderate sulfide mineral content. As opposed to refractory sulfide gold ores, these moderately sulfuric ores typically have a lower sulfide sulfur content and an appreciable portion of the gold is frequently recoverable by direct cyanide leaching. Cyanide leaching is, nevertheless, operationally difficult because these ores tend to be highly acidic, and often produce significant quantities of sulfuric acid as sulfide minerals oxidize during storage and during cyanide leaching operations. The need to neutralize such ores for cyanide leaching presents a significant problem.

Yet another problematic situation involves processing either sulfide or oxide gold ores that contain appreciable quantities of copper in a form that is susceptible to dissolving into the cyanide leach solution along with the gold. The presence of significant quantities of dissolved copper in the cyanide leach solution complicates gold recovery and increases processing costs. Furthermore, it is necessary to destroy copper cyanide for disposal, further increasing processing costs. Although it is sometimes possible to preleach copper from the ore, such as with a sulfuric acid solution, the preleached ore will still require neutralization prior to cyanide leaching. Also, if the ore is being processed in a heap operation, following the acidic preleach it is necessary to remove the heap, neutralize the solids and deposit a new heap for the cyanide leach, presenting problems similar to the situation with bio-oxidation of refractory sulfide ores, as discussed above.

Still a further problematic situation involves processing of either sulfide or oxide gold ores that contain appreciable quantities of organic carbonaceous material that has an affinity to adsorb the gold-cyanide complex during cyanide leaching. Such refractory carbonaceous ores are frequently referred to as "preg-robbing" ores, because available gold is "robbed" from the pregnant cyanide leach solution by the organic carbonaceous material. Several pretreatment techniques have been proposed to reduce or eliminate the preg-robbing ability of the organic carbonaceous material. These pretreatment techniques typically leave the ore in an acidic state requiring neutralization prior to cyanide leaching. As an alternative, thiosulfate lixiviants have been used to leach gold from such refractory carbonaceous ores without first pretreating the ores to destroy the preg-robbing ability of the organic carbonaceous material. The resulting gold-thiosulfate complex is less susceptible to being adsorbed on organic carbonaceous material than gold-cyanide complex. As with cyanide, however, such thiosulfate leaching operations must generally be operated at an alkaline pH, which can require significant neutralization prior to the thiosulfate leach, depending upon the specific ore being processed and the specific processing operation being employed.

In addition to the foregoing, there continues to be increased regulatory restrictions placed on the use of cyanide for gold leaching operations. There has, therefore, been interest in the gold mining industry to identify alternative processes for leaching gold that use lixiviants other than cyanide. For example, the potential use of thiourea and thiosulfate lixiviants has received considerable attention. The use of thiourea, however, is typically not practical due to high thiourea consumption caused by a high susceptibility of thiourea to oxidative degradation. Greater success has been achieved with the use of thiosulfate lixiviants, but, as noted, thiosulfate leaching operations generally must be conducted at an alkaline pH, presenting the same technical problems in many situations as noted previously with respect to cyanide leaching. Moreover, removal of gold from pregnant thiosulfate leach solutions is considerably more difficult than gold removal from pregnant cyanide leach solutions, because gold-thiosulfate complex does not readily adsorb onto activated carbon granules. Still other lixiviants have been suggested as alternatives for cyanide, but have not been investigated to a large extent, and practical implementation has been uncertain.

SUMMARY OF THE INVENTION

With the present invention, it has been found that with careful control of leach conditions, thiocyanate leaching of precious metal, and particularly gold, from a precious metal-containing mineral material may be effective using only a very low concentration of dissolved thiocyanate in an acidic thiocyanate leach solution. Moreover, it has been found that such an acidic thiocyanate leach may be advantageously combined with acidic pretreatment operations for processing some ores and concentrates in preparation for recovering precious metal. Such acidic pretreatment operations may include, for example, oxidative pretreatment of refractory sulfide ores and concentrates to release precious metal from sulfide minerals or acidic pre-leaching of ores to selectively preleach soluble copper, or some other soluble component, prior to precious metal recovery.

For enhanced performance of the acidic thiocyanate leach, properties of the thiocyanate leach solution, and especially in the feed of the thiocyanate leach solution fed to the thiocyanate leach operation, are carefully controlled. The thiocyanate leach solution is typically an acidic aqueous solution, and for enhanced performance the pH of the thiocyanate leach solution is controlled within a narrow range of pH and the thiocyanate leach solution contains dissolved ferric iron at a high concentration relative to the concentration of dissolved thiocyanate. By dissolved thiocyanate, it is meant that the leach solution includes dissolved species including the thiocyanate chemical group, SCN. The primary soluble thiocyanate specie will generally be the thiocyanate ion $SCN^-$, although other soluble thiocyanate species may also be present, such as for example tri-thiocyanate $(SCN)_3^-$ and thiocyanogen $(SCN)_2$. The dissolved thiocyanate may include uncomplexed thiocyanate species and/or thiocyanate species complexed with one or more metals, and often complexed with ferric iron. Table 1 shows some exemplary iron-thiocyanate complex species and stability constants that have been reported for the species (Barbosa-Filho, O., and Monhemius, A. J., Leaching of gold in thiocyanate solutions—Part I: Chemistry and thermodynamics, *Transactions of the Institute of Mining and Metallurgy (Section C)*, 1994, Vol. 103, C117-125).

TABLE 1

| Iron Ion | Complex | Stability Constant (At 25° C.) |
|---|---|---|
| $Fe^{2+}$ (ferrous iron) | $FeSCN^+$ | $2.04 \times 10^1$ |
| $Fe^{3+}$ (ferric iron) | $FeSCN^{2+}$ | $1.05 \times 10^3$ |
| | $Fe(SCN)_2^+$ | $2.00 \times 10^5$ |
| | $Fe(SCN)_4^-$ | $3.31 \times 10^5$ |

TABLE 1-continued

| Iron Ion | Complex | Stability Constant (At 25° C.) |
|---|---|---|
| | $Fe(SCN)_5^{2-}$ | $1.58 \times 10^6$ |
| | $Fe(SCN)_6^{3-}$ | $1.26 \times 10^6$ |

Dissolved thiocyanate in the leach solution is capable of complexing with precious metal to solubilize precious metal in the leach solution. Table 2 shows examples of some gold-thiocyanate complex species and stability constants that have been reported for the complex species (Barbosa-Filho, O., and Monhemius, A. J., Leaching of gold in thiocyanate solutions—Part I: Chemistry and thermodynamics, *Transactions of the Institute of Mining and Metallurgy* (Section C), 1994, Vol. 103, C117-125). Under conditions of thiocyanate leaching according to the present invention, di-thiocyano-aurous $(Au(SCN)_2^-)$ and tetrathiocyano-auric $(Au(SCN)_4^-)$ complexes appear to be the most important gold-thiocyanate complex species for dissolution of the gold during the thiocyanate leach.

TABLE 2

| Gold Ion | Complex | Stability Constant (At 25° C.) |
|---|---|---|
| $Au^+$ | $Au(SCN)_{aq}$ | $1.86 \times 10^{15}$ |
| | $Au(SCN)_2^-$ | $1.45 \times 10^{19}$ |
| $Au^{3+}$ | $Au(SCN)_4^-$ | $4.57 \times 10^{43}$ |
| | $Au(SCN)_5^{2-}$ | $4.17 \times 10^{43}$ |
| | $Au(SCN)_6^{3-}$ | $4.68 \times 10^{43}$ |

For enhanced performance, the pH of the feed of the thiocyanate leach solution, as supplied to the thiocyanate leach, should be in an acidic range having a lower limit of pH 0.75, preferably pH 1 and more preferably pH 1.5 and having an upper limit of pH 3.5, preferably pH 3 and more preferably pH 2.5. One preferred range for the feed of the thiocyanate leach solution is from pH 1 to pH 3, with a pH of from 1.5 to pH 2.5 being more preferred. A pH of pH 2 is particularly preferred for the feed of the thiocyanate leach solution. In one possible process enhancement, the thiocyanate leach solution may be maintained within the noted acidic pH ranges throughout the thiocyanate leach, and preferably also during subsequent precious metal recovery operations. In another possible process enhancement, the feed of the thiocyanate leach solution may be carefully prepared to contain a high concentration of dissolved ferric iron relative to the concentration of dissolved thiocyanate. For this enhancement, the feed of the thiocyanate leach solution preferably has a molar ratio of dissolved ferric iron to dissolved thiocyanate (such ratio being sometimes referred to herein as $[Fe^{3+}]/[SCN]$) of at least 2, more preferably at least 4, even more preferably at least 7, still more preferably at least 8 and most preferably at least 10. As yet a further possible enhancement, the molar ratio of the dissolved ferric iron to the dissolved thiocyanate may be maintained at a level that is not larger than 20. The molar ratio of the dissolved ferric iron to the dissolved thiocyanate may be determined by dividing the molar concentration of the dissolved ferric iron by the molar concentration of the dissolved thiocyanate. By molar concentration, it is meant the gram-moles (referred to herein simply as moles) of dissolved ferric iron or dissolved thiocyanate, as the case may be, per liter of solution (molar concentrations sometimes being designated herein with the abbreviated symbol "M"). As used herein, concentration refers to molar concentration unless specifically noted otherwise. As used herein, a concentration denoted as "ppm" refers to parts per million parts on a weight basis. As will be appreciated, the ratio of the molar concentrations of dissolved ferric iron to dissolved thiocyanate is also equal to the ratio of the total moles of the dissolved ferric iron to the total moles of dissolved thiocyanate in the leach solution. The ratio of molar concentrations of components and the ratio of total moles of the components are each often referred to herein simply as a "molar ratio" of the components.

Maintaining a high concentration of dissolved ferric iron relative to dissolved thiocyanate significantly improves the kinetics of gold dissolution. Not to be bound by theory, but to aid in understanding of the invention, the improved kinetics are believed to be related to what has been referred to as an "auto-reduction" process, in which the thiocyanate ion $SCN^-$ is oxidized by the spontaneous reduction of ferric iron to ferrous iron. Intermediate thiocyanate species produced as a result of this auto-reduction process are believed to be important for speeding the oxidation and dissolution of gold during the thiocyanate leach.

As a further enhancement, the concentration of dissolved thiocyanate in the thiocyanate leach solution may be maintained at a very low concentration. For preferred operation, the concentration of the dissolved thiocyanate in feed of the thiocyanate leach solution is no larger than 0.03 M, preferably no larger than 0.02 M and even more preferably no larger than 0.01 M. The concentration of dissolved thiocyanate in the feed of the thiocyanate leach solution will, however, typically be at least 0.0001 M, preferably at least 0.001 M, more preferably at least 0.002 M, and often at least 0.005 M. Also, as a further enhancement, the dissolved thiocyanate concentration in the thiocyanate leach solution may be preferably maintained at the noted low concentrations throughout the thiocyanate leach, and preferably also during precious metal recovery operations. As used herein, the concentration of dissolved thiocyanate is determined with respect to the SCN chemical group. In effect, all thiocyanate species are assumed to be in the form of the thiocyanate ion $SCN^-$ for the purpose of determining the concentration of dissolved thiocyanate. For example, $SCN^-$ counts as one mole of dissolved thiocyanate, whereas a mole of $(SCN)_2$ counts as two moles of dissolved thiocyanate and a mole of $(SCN)_3^-$ counts as three moles of dissolved thiocyanate.

As noted previously, the concentration of dissolved ferric iron in the thiocyanate leach solution should preferably be significantly larger than the concentration of dissolved thiocyanate. In one preferred implementation, the concentration of dissolved ferric iron in the feed of the thiocyanate leach solution may be at least 0.05 M, and preferably at least 0.1 M, although in some instances it may be desirable for the concentration of the dissolved ferric iron to be at least 0.2 M or even higher. In one preferred implementation, the concentration of dissolved ferric iron in the feed of the thiocyanate leach solution is in a range of from 0.05 M to 0.3 M and more preferably in a range of from 0.05 M to 0.2 M.

The thiocyanate leach may be conducted at any desired temperature, providing that the temperature is not detrimental to dissolution of gold in the form of gold-thiocyanate complex. Typically, the thiocyanate leach is conducted at a temperature in a range of from 15° C. to 50° C.

The precious metal-containing mineral material processed according to the invention may include, for example, one or more of the following: precious metal-bearing ore, precious metal-containing concentrate (such as for example produced from processing an ore by flotation or other concentration techniques), and precious metal-bearing solid residue from prior mineral processing operations (such as for example solids resulting from prior oxidative pretreatment of a sulfide ore or concentrate or tailings resulting from prior milling operations that still contain precious metal). Moreover, the precious metal-containing mineral material may include a combination of materials, such as for example a combination of two or more of the following: ore, concentrate and solid residue from prior mineral processing operations.

In one aspect, the invention involves a method for processing a precious metal-containing mineral material in which the mineral material is subjected to an acidic thiocyanate leach, preferably with careful control of properties of the feed of the thiocyanate leach solution, and particularly with respect to pH, thiocyanate concentration, ferric iron concentration and the molar ratio of thiocyanate to ferric iron. The feed of the thiocyanate leach solution may be prepared by conditioning the thiocyanate leach solution, with the conditioning comprising recycling barren effluent of the thiocyanate leach solution following precious metal recovery and increasing the concentration of ferric iron in the thiocyanate leach solution relative to the concentration of ferric iron in the recycled effluent of the thiocyanate leach solution. During the conditioning, increasing the concentration of the ferric iron may involve, for example, adding to the thiocyanate leach solution a ferric iron-rich acidic effluent liquid from an oxidative pretreatment operation (such as bio-oxidation or pressure oxidation), adding a ferric iron-containing reagent to the thiocyanate leach solution, and/or by oxidizing ferrous iron in the thiocyanate leach solution to the ferric form.

In one aspect, the invention involves a method comprising acidic pretreatment of a mineral material feed prior to a thiocyanate leach. In one implementation the mineral material feed comprises preg-robbing organic carbon, and the acidic pretreatment involves oxidative treatment to decompose and/or passivate the organic carbon to reduce the preg-robbing capability of the mineral material. In another implementation, the mineral material feed comprises precious metal locked in sulfide minerals, such as might be the situation with refractory sulfide ores and concentrates, and the acidic pretreatment involves oxidative pretreatment to decompose sulfide minerals to release precious metal prior to the thiocyanate leach. In one implementation, oxidative pretreatment may include, for example, bio-oxidation or pressure oxidation of the mineral material feed. In another implementation, the mineral material feed may include a nonferrous, nonprecious metal (such as for example one or more of copper, nickel, zinc and lead) in sufficient quantity for economic recovery, and the acidic pretreatment may involve leaching the nonferrous nonprecious metal from the mineral material feed prior to the thiocyanate leach to extract precious metal. Leaching of the nonferrous nonprecious metal may also involve decomposition of sulfide minerals, such as for example, during bio-oxidation or pressure oxidation pretreatment to decompose sulfide minerals. In one implementation, the acidic pretreatment may involve acidic leaching of a component from the mineral material feed that would otherwise interfere with or complicate precious metal recovery using the thiocyanate leach. For example, when the mineral material feed includes appreciable soluble copper, the soluble copper may be removed in an acidic preleach, such as using an acidic sulfate leach solution. This implementation may be used, for example, to remove nuisance quantities of soluble copper from the mineral material feed prior to the thiocyanate leach of the precious metals, to recover by-product copper from precious metal ores or concentrates, or to permit by-product precious metal recovery following copper recovery from copper ores or concentrates, such as in a copper dump leach operations.

When implementation of the invention involves acidic pretreatment prior to the acidic thiocyanate leach, one of both of the operations may be performed in a reactor, such as in a tank, vat or pressure vessel, depending upon the circumstances. In one preferred implementation, however, the acidic pretreatment and the thiocyanate pretreatment are performed sequentially on a heap initially including the mineral material feed. This is possible with the present invention, because both operations are performed at an acidic pH, and it is not necessary to remove the heap after the acidic pretreatment and redeposit a new heap, as is the case with cyanide leaching operations when solids must be neutralized in preparation for the cyanide leach. With respect to bio-oxidation pretreatment of a refractory sulfide material, in one implementation the level of oxidation of sulfide sulfur during the bio-oxidation pretreatment may be lower than would be required prior to cyanide leaching. This is because additional oxidation of easily oxidized sulfide minerals may be accommodated in the acidic conditions of the thiocyanate leach, whereas such additional oxidation would be detrimental to an alkaline cyanide leach.

In another aspect, the invention involves direct leaching precious metal from a mildly refractory sulfide material using the acidic thiocyanate leach. The thiocyanate leach is well suited to processing such naturally acidic materials. In one implementation, the thiocyanate leach may be preceded by an acidic pretreatment wash.

In one aspect, the invention involves recovery of precious metal from pregnant thiocyanate leach solutions. In one implementation, acidic pregnant thiocyanate leach solution is contacted with an organic extractant phase for transfer of dissolved precious metal from the aqueous thiocyanate leach solution into the organic extractant phase. In another implementation, precious metal in the acidic thiocyanate leach solution is transferred from precious metal-thiocyanate complex to a complex with a different complexing agent, preferably cyanide, to form a different precious metal complex, preferably precious metal-cyanide complex, in the thiocyanate leach solution. The precious metal-cyanide complex may then be recovered from the thiocyanate leach solution, such as by loading precious metal onto an adsorption material, such as ion exchange resin or activated carbon. To effect the complex transfer, a small quantity of dissolved cyanide may be introduced into the acidic pregnant thiocyanate leach solution. In one implementation, following removal of the precious metal, residual cyanide in the thiocyanate leach solution is converted to thiocyanate.

In one aspect, the invention involves preparation and/or conditioning of acidic thiocyanate leach solutions involving converting dissolved cyanide to dissolved thiocyanate in an acidic aqueous liquid. This implementation may be used, for example, to initially prepare a thiocyanate solution or to compensate for thiocyanate losses during thiocyanate leaching operations.

Additional disclosure concerning these and other aspects of the invention are provided in the detailed description presented below.

DETAILED DESCRIPTION OF THE INVENTION

As used herein, "precious metal" includes gold and/or silver. The invention is described and illustrated herein primarily with reference to processing and recovery of gold, but the same principles apply also to processing and recovery of silver, with or without also processing and recovering gold.

Figure 1:
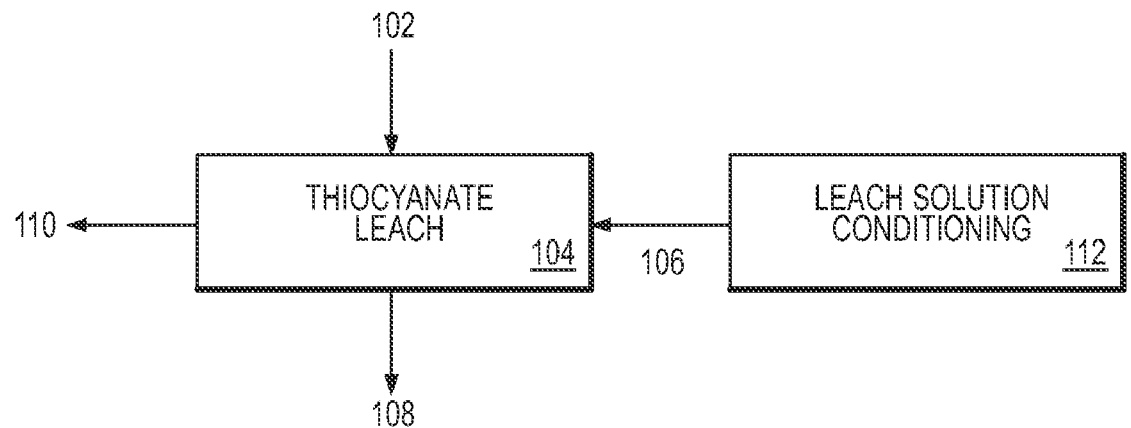
FIG. 1 is a generalized process block diagram of one embodiment of an implementation of the present invention involving thiocyanate leaching.

Referring to FIG. 1, a generalized process block diagram is shown for one implementation of an acidic thiocyanate leach according to the present invention. As shown in FIG. 1, a particulate, gold-bearing mineral material 102 is subjected to a thiocyanate leach 104 under acidic conditions. During the thiocyanate leach 104, gold is leached from the mineral material 102 into a thiocyanate leach solution. Feed of the thiocyanate leach solution 106 is fed to the thiocyanate leach 104 to contact the mineral material 102. Pregnant thiocyanate leach solution 108 containing dissolved gold in the form of gold-thiocyanate complex is removed from the thiocyanate leach 104, and may be further processed to remove the dissolved gold. Residual solids 110 that are depleted in gold may be subjected to additional metal recovery operations or to further treatment for disposal in an appropriate manner. By gold-thiocyanate complex, it is meant any and all soluble gold-thiocyanate species that may be present in the pregnant thiocyanate leach solution 108, such as for example any of the species listed in Table 2.

Prior to being fed to the thiocyanate leach, the thiocyanate leach solution is subjected to leach solution conditioning 112. During the leach solution conditioning 112, the properties of the thiocyanate leach solution are adjusted to the properties desired for the feed of thiocyanate leach solution 106 that is supplied to the thiocyanate leach 104. These properties of the thiocyanate leach solution that may be adjusted during the leach solution conditioning include, but are not limited to, concentrations and molar ratio of dissolved thiocyanate and dissolved ferric iron, pH and temperature. The leach solution conditioning 112 could include, for example, one or more of adjusting pH, adjusting temperature, adjusting dissolved ferric iron concentration, adjusting dissolved thiocyanate concentration, precipitating undesirable components, bleeding liquid and adding liquid, to effect desired adjustment of the properties of the thiocyanate leach solution to prepare the feed of thiocyanate leach solution 106.

In one preferred implementation of the invention, during the leach solution conditioning 112 the concentrations of the dissolved thiocyanate and dissolved ferric iron are adjusted, as well as the molar ratio of dissolved ferric iron to dissolved thiocyanate. Also, depending upon the circumstances, undesirable components may be precipitated to prevent excessive build-up of the components in the thiocyanate leach stream and to adjust the pH to be within a desired range. Because leaching gold with thiocyanate involves reduction of at least some of the ferric iron to ferrous iron, the leach solution conditioning 112 will typically involve increasing the concentration of ferric iron in the thiocyanate leach solution. Also, at least some fresh thiocyanate will typically be added during the leach solution conditioning 112 to compensate for thiocyanate losses. Increasing the concentration of ferric iron in the thiocyanate leach solution during the leach solution conditioning 112 may be accomplished by a variety of techniques. For example, a reagent containing ferric iron that is soluble in the thiocyanate leach solution may be added to the thiocyanate leach solution.

In one preferred variation, one or more oxidant reagents are introduced into the thiocyanate leach solution to cause ferrous iron already dissolved in the thiocyanate leach solution to be oxidized to ferric iron. By "oxidant" or "oxidant reagent" it is meant a substance that alone or in combination with another substance causes oxidation of dissolved ferrous iron to dissolved ferric iron in the thiocyanate leach solution. Such oxidant reagent(s) may be introduced into the thiocyanate leach solution during any convenient stage of processing. For example, in the implementation shown in FIG. 1, oxidant(s) may be introduced into the thiocyanate leach solution during the thiocyanate leach 104 and/or during the leach solution conditioning 112. When oxidant(s) are introduced into the thiocyanate leach solution during gold leaching, such as during the thiocyanate leach 104, the oxidant(s) should preferably be selected so as not to interfere with, and more preferably to enhance, the gold leaching rate, and so as not to affect thiocyanate degradation. Also, in this situation, oxidizing potential and pH conditions in the thiocyanate leach solution should be controlled with appropriate reagent additions, as appropriate under the circumstances. When oxidant(s) are introduced into an effluent or recycled thiocyanate leach solution following precious metal recovery operations, the oxidant(s) should preferably provide the desired oxidation to produce ferric iron, but more preferably without causing significant destruction of thiocyanate dissolved in the solution. Some nonlimiting examples of potential oxidant reagents that may be used alone, or in combination with other chemically compatible reagents, include Caro's acid (persulfuric acid), persulfates (such as for example ammonium persulfate and alkali metal persulfates, such as potassium persulfate and sodium persulfate), peroxides (such as for example inorganic peroxides, such as hydrogen peroxide and alkali metal peroxides, and organic peroxides), manganese dioxide, ozone, halogens (such as for example chlorine, iodine and bromine) and hypochlorites (such as for example sodium hypochlorite). As noted, one or more of these oxidant reagents may be used alone or with other chemically compatible reagents. Also, multiple of the oxidant reagents may be used together to the extent that the multiple oxidant reagents are chemically compatible in the particular system. An example of an oxidant reagent that is preferably used with one or more other reagent is oxygen gas (such as for example provided in air or in a purified oxygen gas composition). In one preferred variation, oxygen gas is used in combination with at least a second reagent to oxidize ferrous iron to ferric iron in the thiocyanate leach solution. The oxygen gas may be introduced into the thiocyanate leach solution for example, by sparging air or a stream of purified oxygen gas into the thiocyanate leach solution. The second reagent is preferably, sulfur dioxide, a bisulfite (such as for example an alkali metal bisulfite or ammonium bisulfite) or a metabisulfite (such as for example sodium metabisulfite or potassium metabisulfite). A copper or other catalyst, such as copper sulfate, may also be used with the oxygen and the second reagent for improved performance. In the case of sulfur dioxide as the second reagent, the sulfur dioxide may be introduced by sparging sulfur dioxide gas into the thiocyanate leach solution, either together with or separate from the oxygen gas. In the case of a bisulfite or metabisulfite as the second reagent, the second reagent may be introduced into the thiocyanate leach solution as a solid that dissolves in the thiocyanate leach solution or the second reagent may be predissolved in a concentrated reagent solution.

In another variation, the leach solution conditioning 112 includes oxidizing dissolved ferrous iron to dissolved ferric iron by the action of microorganisms under acidic conditions, and preferably at a pH in a range suitable for use during the thiocyanate leach 112. The oxidation could be performed on all or a portion of the thiocyanate leach solution in a separate bioreactor. The bioreactor may be, for example, a separate heap or heaps containing the microorganisms on rock or some other support. As another example, the bioreactor may be one or more tanks or vats containing the microorganisms on rock or some other support. Preferably, the support on which the microorganisms are disposed is highly porous and permeable. In this variation, it is important that the thiocyanate not be toxic to the microorganisms, such as for example microorganisms disclosed in U.S. Pat. No. 6,379,919 entitled "Method of Isolating Thiocyanate Resistant Bacteria", the entire contents of which are incorporated by reference herein as if set forth herein in full.

As yet a further variation, the leach solution conditioning 112 comprises oxidation of ferrous iron to ferric iron in all or a portion of the thiocyanate leach solution is accomplished by passing all or a portion of the solution through an electrochemical cell while applying a sufficient electrical potential across the cell to cause dissolved ferrous iron to oxidize to dissolved ferric iron.

Figure 2:
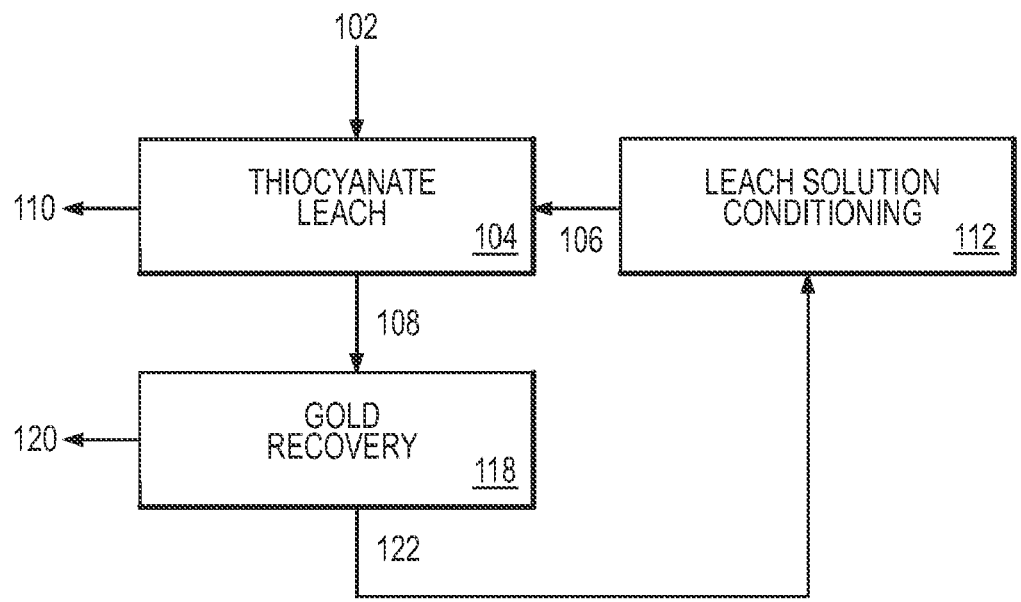
FIG. 2 is a generalized process block diagram of one embodiment of an implementation of the present invention involving thiocyanate leaching and recycling of thiocyanate leach solution following precious metal recovery.

In a preferred implementation of the invention, thiocyanate leach solution is recycled from gold recovery operations for reuse for additional thiocyanate leaching. Referring now to FIG. 2, a generalized process block diagram is shown of one implementation of the invention in which thiocyanate leach solution is recycled following gold recovery for reuse in the thiocyanate leaching operation. Reference numerals are the same as those used in FIG. 1, except as noted. As shown in FIG. 2, the pregnant leach solution 108 is sent to gold recovery 118, where a purified gold product 120, such as for example doré, is produced. Barren effluent of the thiocyanate leach solution 122, including all or a portion of the thiocyanate leach solution from which the gold has been removed during the gold recovery 118, is recycled to the leach solution conditioning 112 for use to prepare the feed of thiocyanate leach solution 106 for additional thiocyanate leaching.

The thiocyanate leaching of the invention may be used to process a variety of precious metal-containing mineral materials. For example, the mineral material could comprise an oxide ore, a sulfide ore, concentrate prepared from an oxide ore or a sulfide ore, some other precious metal-containing solid product produced during prior mineral processing operations, or a combination including any number of the foregoing in any proportions. The present invention, however, is particularly well suited for processing mineral materials for which it would be beneficial to leach the precious metal at an acidic pH, such as for example naturally acidic ores, acidic concentrates or acidic solid residues resulting from prior oxidative pretreatment.

In one embodiment, the invention is directed to recovery of precious metal from precious metal-bearing mineral material feed including precious metal contained in one or more sulfide mineral. Such a mineral material feed could include, for example, a sulfide gold ore and/or gold-bearing sulfide concentrate prepared from a sulfide gold ore, such as by flotation. Sulfide gold ores that are not amenable to gold recovery by direct cyanide leaching because gold is bound in sulfide mineralization are typically referred to as "refractory" sulfide gold ores. Such refractory sulfide gold ores typically have a high sulfide sulfur content, usually at least 2 weight percent sulfide sulfur and frequently at least 3 weight percent or more sulfide sulfur, but typically less than 10 weight percent sulfide sulfur. Some ores contain lower amounts of sulfide sulfur and may be only mildly refractory due to the sulfide mineralization, with a significant amount of the gold being recoverable by direct cyanidation. These mildly refractory ores may have a significant gold-bearing oxide mineral component in addition to a gold-bearing sulfide mineral component, in which case the ores are sometimes referred to as transition ores. Also, such mildly refractory ores may result from stockpiling for a significant time ores that originally contained a higher level of sulfide sulfur, because appreciable sulfide sulfur oxidation may occur naturally during extended stockpiling, such as due to the action of naturally-occurring bacteria. Mildly refractory sulfide ores typically include less than 2 weight percent sulfide sulfur, and more typically include no more than 1.5 weight percent sulfide sulfur, but also typically include at least 0.5 weight percent sulfide sulfur.

The present invention may be used to treat refractory sulfide gold ores, mildly refractory sulfide gold ores, and/or sulfide concentrates prepared from one or more of any such ores. As will be appreciated, a sulfide concentrate will contain a higher sulfide sulfur content than the ore(s) from which the concentrate is prepared. The sulfide sulfur content of the sulfide concentrate is often at least twice as large and more often several times as large as the sulfide sulfur content of the ore materials from which the concentrate is prepared. The present invention may also be used to treat refractory gold ores and concentrates comprising significant gold not amenable to recovery by direct cyanide leaching for reasons other than or in addition to gold being bound in sulfide mineralization, such as for example because of the presence of preg-robbing organic carbon.

Figure 3:
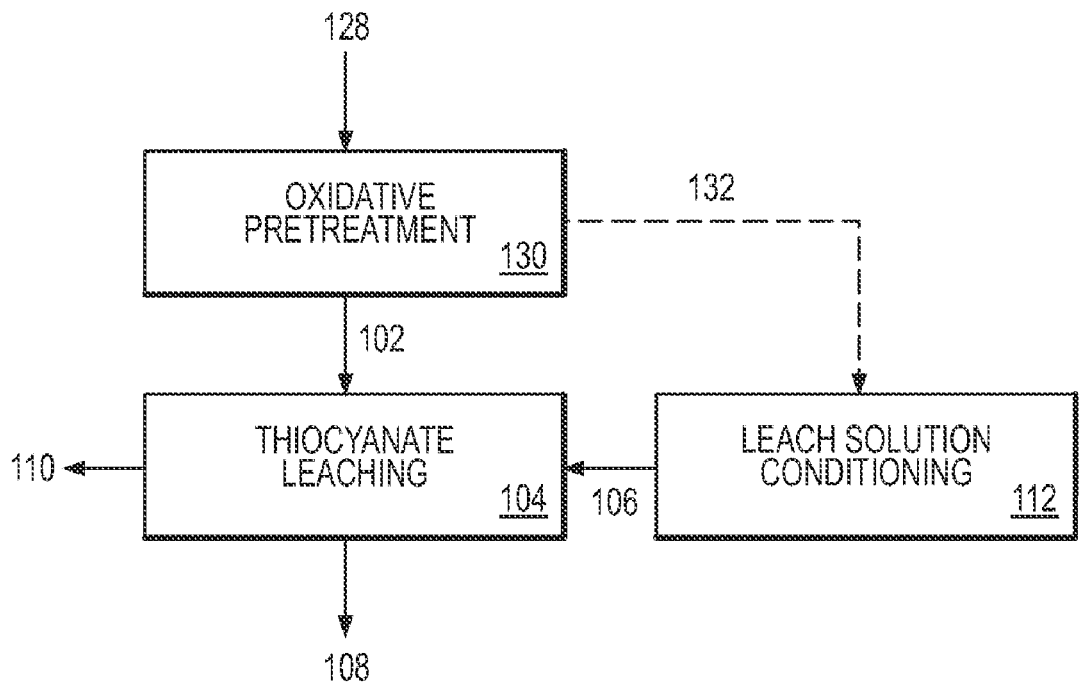
FIG. 3 is a generalized process block diagram of one embodiment of an implementation of the present invention involving oxidative pretreatment prior to thiocyanate leaching.

Referring now to FIG. 3, a generalized process block diagram is shown for one implementation of the present invention for processing refractory gold ores, concentrates prepared from such refractory gold ores and/or other gold-bearing refractory mineral material comprising gold that is not amenable to recovery by direct cyanide leaching. Reference numerals are the same as those used in FIGS. 1 and 2, except as noted. As shown in FIG. 3, a refractory mineral material feed 128, typically in particulate form, is subjected to oxidative pretreatment 130. The refractory mineral material feed 128 could be refractory due to one or multiple characteristics of the mineral material feed. For example, the refractory mineral material feed 128 could be refractory because it comprises significant gold that is bound in sulfide minerals not amenable to gold recovery by direct cyanide leaching (refractory sulfide mineral material) and/or because the refractory mineral material feed 128 comprises preg-robbing organic carbon (refractory carbonaceous mineral material). A refractory sulfide mineral material feed may comprise preg-robbing organic carbon in addition to refractory sulfide mineral material. Likewise, a refractory carbonaceous mineral material feed may comprise refractory sulfide mineral material in addition to the preg-robbing organic carbon.

During the oxidative pretreatment 130, chemical properties of the refractory mineral material feed 128 are altered in an oxidizing environment to reduce the refractory nature of the mineral material, thereby permitting recovery of gold that is not amenable to recovery by direct cyanide leaching of the refractory mineral material feed 128. In the situation where the refractory mineral material feed 128 comprises refractory sulfide mineral material, during the oxidative pretreatment 130 at least a portion of sulfide sulfur of sulfide minerals in the refractory sulfide mineral material is oxidized, and at least a portion of the sulfide minerals are thereby decomposed to release gold from the sulfide minerals. In the situation where the refractory mineral material feed 128 comprises refractory carbonaceous mineral material, during the oxidative pretreatment 130 the preg-robbing capability of organic carbon is reduced, such as by decomposition and/or passivation of the preg-robbing organic carbon. In the situation where the refractory mineral material feed 128 includes both refractory sulfide mineral material and refractory carbonaceous mineral material, during the oxidative pretreatment 130 at least a portion of sulfide sulfur of sulfide minerals in the refractory sulfide mineral material is oxidized to release gold from the sulfide minerals, or the preg-robbing capability of the preg-robbing organic carbon is reduced, or both. The mineral material 102 that is subjected to the thiocyanate leach 104 includes solid residue resulting from the oxidative pretreatment 130. Such solid residue will typically be highly acidic.

An optional feature with the implementation as shown in FIG. 3 when the oxidative pretreatment generates significant dissolved ferric iron is to use during the leach solution conditioning 112 an acidic effluent liquid 132 that is produced during the oxidative pretreatment 130 that contains a high concentration of dissolved ferric iron. The acidic effluent liquid 132, when used, will typically involve only a portion of liquid effluent produced during the oxidative pretreatment 130. During the leach solution conditioning 112, the acidic effluent liquid 132 may be added to the thiocyanate leach solution to increase the concentration of dissolved ferric iron in the thiocyanate leach solution to prepare the feed of thiocyanate leach solution 106. To maintain the appropriate liquid volume of thiocyanate leach solution, a portion of the thiocyanate liquid may be bled or otherwise removed from the thiocyanate leach solution during the leach solution conditioning 112. For example, water could be removed, such as by bleeding liquid or by evaporation, before or after addition of the acidic effluent liquid 132, but preferably before. For the implementation of the invention as shown in FIG. 3 with the use of the acidic effluent liquid 132, the oxidative pretreatment 130 is of a type to produce the acidic effluent liquid 132 with a high concentration of dissolved ferric iron.

When used, the acidic effluent liquid 132 should include dissolved ferric iron at a concentration that is higher, and preferably much higher, than the concentration of dissolved ferric iron in the feed of thiocyanate leach solution 106. Examples of preferred operations for the oxidative pretreatment 130 are pressure oxidation and bio-oxidation.

Preferably the concentration of dissolved ferric iron in the acidic effluent liquid 132 is at least twice as large (and more preferably at least four times as large) as the concentration of dissolved ferric iron in the feed of thiocyanate leach solution 106. Also, the acidic effluent liquid 132 may be substantially as produced during the oxidative pretreatment 132, or may result from treatment following production in the oxidative pretreatment 132. For example, the pH of the acidic effluent liquid 132 may be adjusted up or down as desired prior to being mixed with the thiocyanate leach solution. Also, the acidic effluent liquid 132 may be a more concentrated solution formed by removal of water, such as by evaporation, from a less concentrated solution produced during the oxidative pretreatment 130. When mixed with the thiocyanate leach solution during the leach solution conditioning 112, the acidic effluent liquid 132 preferably has a pH of no larger than pH 3 and preferably no larger than ph 2.5. In one variation, the acidic effluent liquid 132, when mixed with the thiocyanate leach solution during the leach solution conditioning 112, may have a pH of pH 2 or less or even pH 1.5 or less. In one variation, the acidic effluent liquid 132 has a pH in a range of from pH 0.1 to pH 3, and preferably in a range of from pH 1 to pH3, when added to the thiocyanate leach solution during the leach solution conditioning 112.

Use of the acidic effluent liquid 132 as a source of ferric iron may be advantageous, for example, when a significant amount of thiocyanate leach solution is being recycled from gold recovery operations for reuse to prepare the feed of thiocyanate leach solution 106 (such as recycle of the effluent of the thiocyanate leach solution 122 from the gold recovery operation 118 shown in FIG. 2). During the thiocyanate leach 104, a considerable quantity of ferric iron is typically reduced to ferrous iron, so that recycled thiocyanate leach solution will typically be deficient in ferric iron relative to the concentration of dissolved ferric iron in the feed of thiocyanate leach solution 106. Nonlimiting examples of processes for potential use during the oxidative pretreatment 130 include bio-oxidation (such as by treatment in a heap, tank or vat), pressure oxidation (with or without additions such as of sulfuric acid, nitric acid or chlorine-containing reagents), nitric acid oxidation (such as by treatment in a heap, tank or vat) and chlorination (such as by treatment in a heap, tank or vat with a hypochlorite reagent or another chlorine-containing oxidizing reagent). When the refractory mineral material feed 128 comprises refractory sulfide mineral material, preferred processing options for use during the oxidative pretreatment 130 include bio-oxidation, pressure oxidation, and nitric acid oxidation. When the refractory mineral material feed 128 comprises refractory carbonaceous mineral material, examples of processing options for use during the oxidative pretreatment include pressure oxidation and chlorination. When the refractory mineral material feed 130 comprises both refractory sulfide mineral material and refractory carbonaceous mineral material, one example of a processing option for the oxidative pretreatment 130 includes pressure oxidation.

Figure 4:
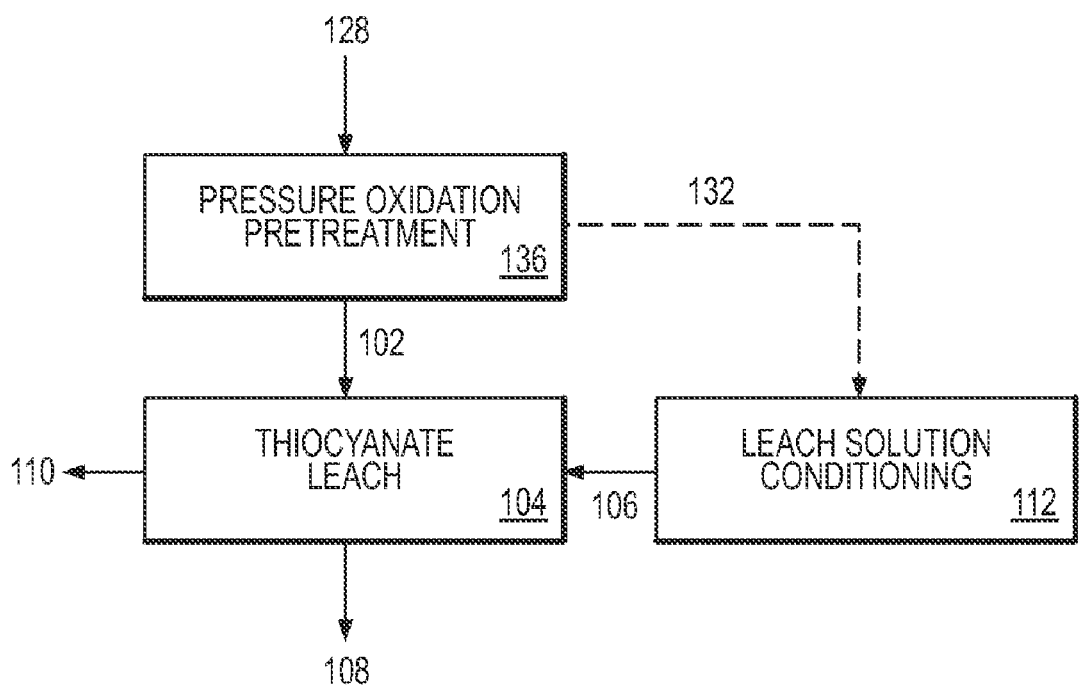
FIG. 4 is a generalized process block diagram of one embodiment of an implementation of the present invention involving pressure oxidation pretreatment prior to thiocyanate leaching.

In one variation of the implementation shown in FIG. 3, the oxidative pretreatment 130 involves pressure oxidation, and especially for treatment of a refractory sulfide mineral material feed. Referring now to FIG. 4, a generalized process block diagram is shown for one implementation of such a variation. Reference numerals in FIG. 4 are the same as used in FIGS. 1-3, except as noted. As shown in FIG. 4, the refractory mineral material feed 128 (which for exemplary purposes is described as a refractory sulfide mineral material feed) is subjected to pressure oxidation pretreatment 136. The mineral material 102, including residual solids from the pressure oxidation 136, is then subjected to the thiocyanate leach 104 to dissolve gold from the residual solids. In one embodiment, the acidic effluent liquid 132, including some acidic liquid produced during the pressure oxidation pretreatment 136, may optionally be supplied to the leach solution conditioning 112, to provide a source of ferric iron, and for pH adjustment as desired. When used, such acidic effluent liquid 132 from the pressure oxidation pretreatment 136 preferably includes a concentration of dissolved ferric iron of larger than 0.05 M and more preferably larger than 0.1 M.

During the pressure oxidation pretreatment 136, at least a portion of sulfide sulfur in the refractory material feed 128 is oxidized to the sulfate form, destroying sulfide minerals to release gold for recovery during the thiocyanate leach 104. The pressure oxidation pretreatment 136 is conducted in one or more reactors, typically referred to as autoclaves, and the acidic effluent liquid 132 may be, for example, acidic aqueous liquid discharged from the autoclave(s).

Figure 5:
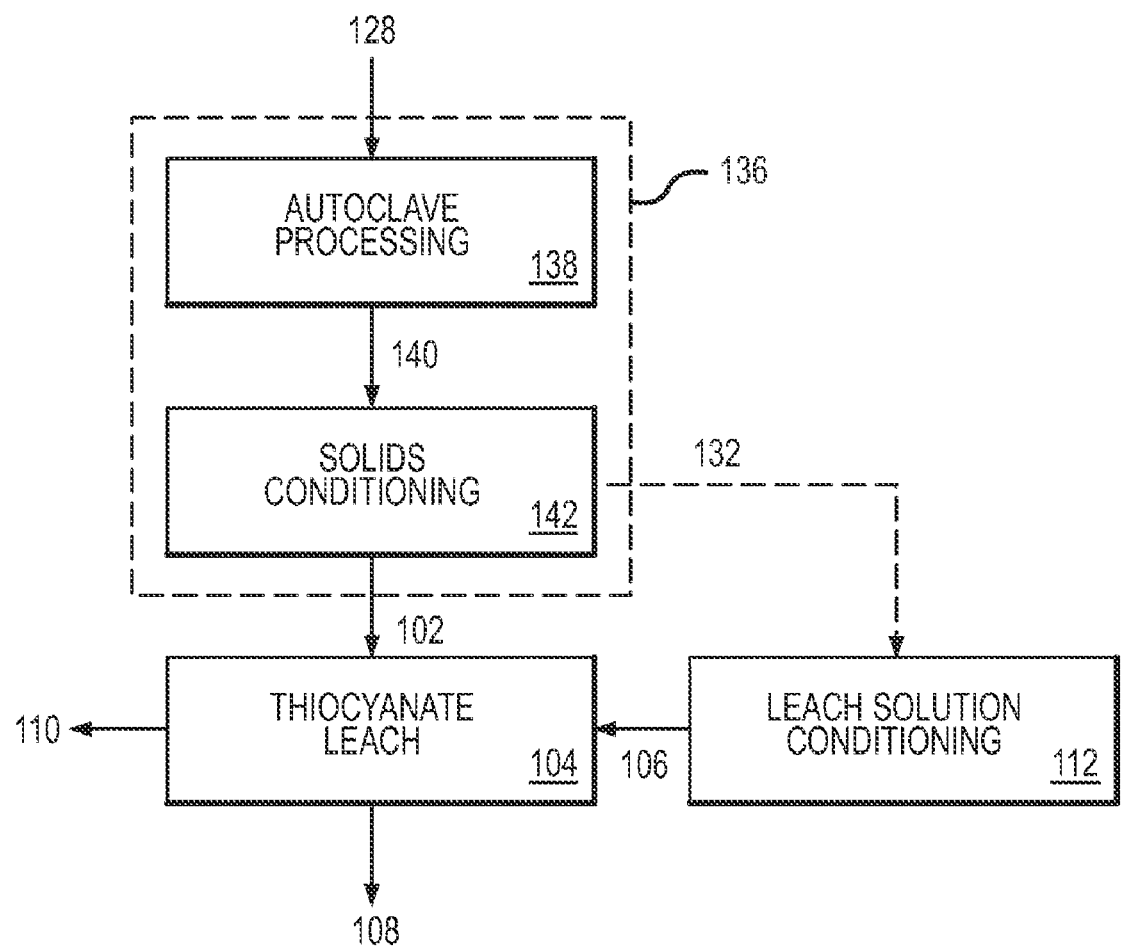
FIG. 5 is a generalized process block diagram of one embodiment of an implementation of the present invention involving pressure oxidation pretreatment prior to thiocyanate leaching, with the pressure oxidation pretreatment including general steps of autoclave processing and solids conditioning.

Referring now to FIG. 5, a more specific variation of the implementation of FIG. 4 is shown. Reference numerals in FIG. 5 are the same as for FIGS. 1-4, except as noted. As shown in FIG. 5, the pressure oxidation pretreatment 136 includes the general steps of autoclave processing 138 and solids conditioning 142. During the autoclave processing 138, the refractory sulfide mineral material feed 128 is pressure oxidized in one or more autoclave(s) at elevated temperature and pressure and with purified oxygen gas being introduced into the autoclave(s). As fed to the autoclave processing 138, the refractory mineral material feed 128 will preferably be in a finely ground particulate form slurried with an aqueous liquid.

The conditions in the autoclave(s) during the autoclave processing may be any conditions effective to produce the desired pressure oxidation of the refractory sulfide mineral material feed. The autoclave processing 138 is typically conducted at an elevated temperature, with the temperature in the autoclave(s) often reaching at least 160° C., but the temperature in the autoclave(s) is often much higher. In some situations, the temperature in the autoclave(s) may be as high as 235° C., or even higher. The total pressure in the autoclave(s) during pressure oxidation processing will generally include the vapor pressure exerted by noncondensible gases in the autoclave(s) (such as carbon dioxide and sulfur dioxide) and the overpressure of oxygen gas supplied to the autoclave(s). By oxygen gas overpressure, it is meant the amount that the pressure of the oxygen gas fed to an autoclave exceeds the pressure exerted by the other components in the autoclave, such as water vapor and noncondensible gases. Even at low processing temperatures, such as around 160° C., the total pressure may be 85 psi (586 kPa) or more, while at higher temperatures, such as around 225° C., the total pressure may be 485 psi (3,344 kPa) or more. Oxygen gas is fed to the autoclave(s) at an overpressure of typically at least 10 psi (68.9 kPa) and frequently at least 25 psi (172.4 kPa). When operating at high temperatures, the oxygen gas overpressure may be as high as 100 psi, (689 kPa), or even as high as 125 psi (862 kPa), or higher. A more preferred operating range for pressure oxidation is a temperature of from 180° C. to 225° C., a total pressure of from 155 psi (1,069 kPa) to 460 psi (3,172 kPa) and oxygen gas overpressure of from 25 psi (172 kPa) to 100 psi (689 kPa). The pressure oxidation occurring during the autoclave processing 138 typically results in at least 80 percent and preferably at least 90 percent of sulfide sulfur in the refractory mineral material feed 128 being oxidized, preferably to a sulfate form. To effect the desired extent of pressure oxidation during the autoclave processing 138, a single autoclave may be used, which may include multiple compartments arranged in series. In another implementation, a plurality of autoclaves may be arranged in series. When using multiple compartments within an autoclave or multiple autoclaves in series, each of the different compartments or the different autoclaves may independently be operated at different conditions. Moreover, the autoclave processing may involve a single pressure oxidation processing train or may involve multiple parallel pressure oxidation processing trains.

With continued reference to FIG. 5, oxidized slurry 140 from the autoclave processing 138 is processed through the solids conditioning 142 to prepare the mineral material 102 to be supplied to the thiocyanate leach 104. The oxidized slurry 140 is a highly acidic slurry containing residual solids and acidic aqueous liquid, with the liquid containing typically 10 grams per liter or more of free sulfuric acid and also typically containing a significant concentration of dissolved ferric iron. In some instances, the free sulfuric acid may be at least 20 grams per liter or even at least 50 grams per liter, although the free sulfuric acid will also often be no larger than 100 grams per liter. The concentration of dissolved ferric iron will often be at least 0.05 M (approximately 2.8 g/L) and preferably at least 0.1 M (approximately 5.58 g/L), although the concentrate of dissolved ferric iron will also most often be no larger than 0.2 M.

During the solids conditioning 142, any operation or combination of operations may be implemented to prepare residual solids of the oxidized slurry 140 for use to prepare the mineral material 102 for processing in the thiocyanate leach 104. Such operations may include, for example, liquid-solid separation, dilution, partial neutralization of solids, addition or reagents, washing solids and repulping solids. In one variation, the solids conditioning 142 includes liquid-solid separation to separate most or all of the acidic liquid in the autoclave discharge from the solids, optionally followed by washing of the solids with water to remove additional acidic liquid and increase the pH of the solids to a higher, but still acidic, pH for the thiocyanate leach 104. If additional pH adjustment is desired, a neutralizing agent (such as for example lime, limestone or a hydroxide) may be added. In one preferred implementation, the mineral material 102, will include all or some of the residual solids from the autoclave processing 138 in a dense slurry at an acidic pH, preferably at an acidic pH in a range of from pH 1 to pH 3.

One feature shown in FIGS. 4 and 5 is the optional use of all or a portion of acidic liquid produced during the pressure oxidation pretreatment 136 for the optional supply of the acidic effluent liquid 132 to the leach solution conditioning 112 for use to prepare the feed of the thiocyanate leach solution 106. With the implementations of FIGS. 4 and 5, the acidic effluent liquid 132 would typically be liquid separated from oxidized slurry discharged from pressure oxidation autoclave(s). The acidic effluent liquid 132 may be provided to the leach solution conditioning 112 with or without pH adjustment or other intermediate processing. Referring to FIG. 5, in one variation the oxidized slurry 140 may be subjected during the solids conditioning 142 to liquid-solid separation to separate acidic liquid from the solids, with at least a portion of the separated acidic liquid being optionally supplied as the acidic effluent liquid 132 to the leach solution conditioning. The solids may also be washed if desired. Wash water may be combined with separated acidic liquid to prepare the acidic effluent liquid 132, or may be processed separately.

One variation for the processing shown in FIGS. 4 and 5 is to not separately deliver acidic effluent liquid 132 directly to the leach solution conditioning 112, and to feed the mineral material 102 to the thiocyanate leach 104 slurried with acidic autoclave discharge liquid, with or without dilution, pH adjustment or other treatment. For example, referring to FIG. 5, a portion of the acidic liquid may be separated from the oxidized slurry 140 during the solids conditioning 142 and a portion of the acidic autoclave discharge liquid may be left with the solids to be fed with the mineral material 102 to the thiocyanate leach 104, providing a source of ferric iron for the thiocyanate leach 104. In this case, even though not fed separately to the thiocyanate leach 104, the acidic liquid with the mineral material 102 is considered part of the feed of the leach solution 106 and contributes to achieving desired conditions in the thiocyanate leach with respect to dissolved ferric iron and dissolved thiocyanate, as previously described. As another alternative, the mineral material 102 may be fed to the thiocyanate leach 104 without the addition of the acidic effluent liquid 132 to the leach solution conditioning 112 and without acidic autoclave discharge liquid being slurried with the mineral material 102.

Referring again to FIG. 3, when the oxidative pretreatment 130 includes oxidation of the ore in a reactor (such as typically is the case with pressure oxidation pretreatment and may be the case with bio-oxidation pretreatment), then the thiocyanate leaching 104 will also typically be performed in a reactor. By reactor, it is meant one or more fluid containment vessels that contain the materials during the particular processing operation. For example, in the case of the pressure oxidation pretreatment 136 as shown in FIG. 5, the autoclave processing 138 includes pressure oxidation performed in a reactor (one or more pressure vessels generally referred to as autoclaves) and the thiocyanate leach 104 is performed in another reactor, such as for example one or more stirred tanks, vats or other vessels.

Figure 6:
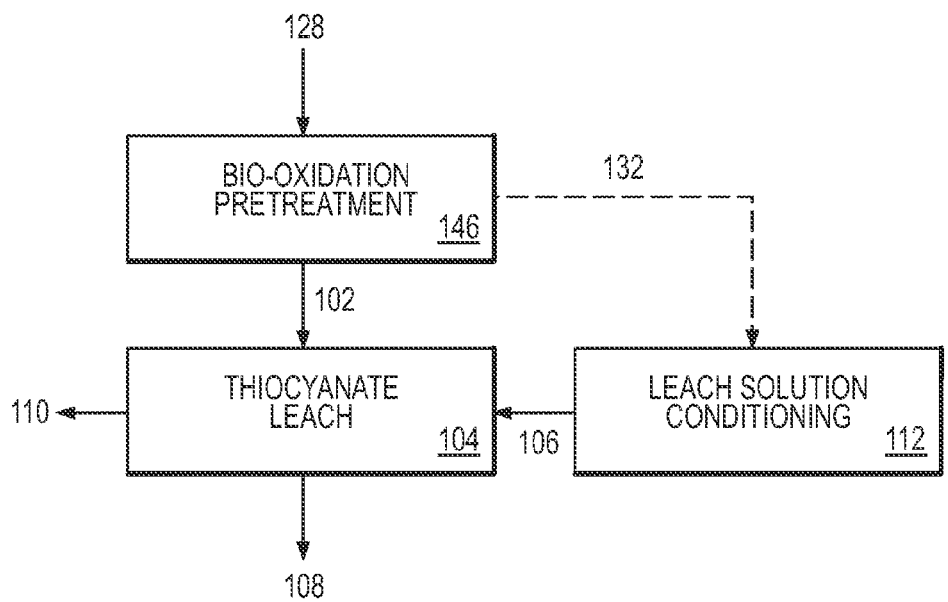
FIG. 6 is a generalized process block diagram of one embodiment of an implementation of the present invention involving bio-oxidation pretreatment prior to thiocyanate leaching.

In another variation of the implementation shown in FIG. 3, the oxidative pretreatment 132 involves bio-oxidation. This is one preferred option for treating a refractory sulfide mineral material feed. Referring now to FIG. 6, a generalized process block diagram is shown for one embodiment involving bio-oxidation as an oxidative pretreatment step. Reference numerals in FIG. 6 are the same as for FIG. 3, except as noted. As shown in FIG. 6, the refractory mineral material feed 128 (which for exemplary purposes is described as a refractory sulfide mineral material feed) is subjected to bio-oxidation pretreatment 146 to oxidize at least a portion of sulfide sulfur in the refractory mineral material feed 128, thereby decomposing sulfide minerals and freeing gold for recovery during the thiocyanate leach 104. The bio-oxidation pretreatment 146 may be performed in a reactor, such as for example one or more stirred tank or other vessel, in which case the thiocyanate leach 104 will also preferably be performed in a reactor, such as for example one or more stirred tank or other vessel. In a preferred variation, the bio-oxidation pretreatment 146, and also the thiocyanate leach 104, are performed in a heap, due to especially advantageous processing in a heap with the present invention. The embodiment shown in FIG. 6 is therefore described primarily with reference to processing in a heap.

With continued reference to FIG. 6 in relation to a heap operation, the bio-oxidation pretreatment 146 typically involves circulating acidic bio-leach solution through a heap initially containing the refractory mineral material feed 128. Circulation of the acidic bio-leach solution continues until oxidation of sulfide minerals has progressed to a desired extent. After the heap has been sufficiently bio-oxidized, remaining solids provide the mineral material 102 for the thiocyanate leach 104. During the thiocyanate leach 104, the feed of thiocyanate leach solution 106 is applied to the heap, such as for example through a drip irrigation system, and the thiocyanate leach solution percolates through the heap to dissolve gold in the form of gold-thiocyanate complex. The pregnant thiocyanate leach solution 108 is collected as it drains from the heap. The residual solids 110 remaining in the heap following the thiocyanate leach 104 are depleted in gold.

As shown in FIG. 6, acidic effluent liquid 132 produced during the bio-oxidation pretreatment 146 may optionally be provided to the leach solution conditioning 112 for use to prepare the feed of thiocyanate leach solution 106. The acidic effluent liquid 132 is rich in dissolved ferric iron and may be used to help adjust dissolved ferric iron levels in the leach solution and to adjust pH, in a manner as previously discussed. Because significant ferric iron is generated during the bio-oxidation pretreatment 146, the acidic effluent liquid 132 will typically have a very high concentration of ferric iron. The acidic effluent liquid 132 in the bio-oxidation implementation of FIG. 6 will typically contain a concentration of dissolved ferric iron of at least 0.1 M (approximately 5.6 g/L), more typically at least 0.3 M (16.7 g/L) and preferably at least 0.4 M (approximately 22.3 g/L), although the concentration of dissolved ferric iron will also often be no larger than 0.8 M. Moreover, the acidic effluent liquid 132 is preferably at a pH of from pH 1 to pH 3.

When processing in a heap environment, one enhancement for the operation is to agglomerate mineral material feed prior to or when the mineral material feed is deposited to initially form the heap. For example, with reference to FIG. 6, during agglomeration the refractory mineral material feed 128 in particulate form may be mixed with an acidic bacterial inoculate liquid. The agglomeration may be accomplished by mixing particles of the mineral material with the bacterial inoculate liquid under conditions to promote agglomeration of the particles wetted with the bacterial inoculate liquid into larger aggregate units. For example, the bacterial inoculate liquid could be sprayed onto the particulate refractory mineral material 128 with the particulate material being processed through a rotating drum prior to or during the spraying to promote the agglomeration.

Figure 7:
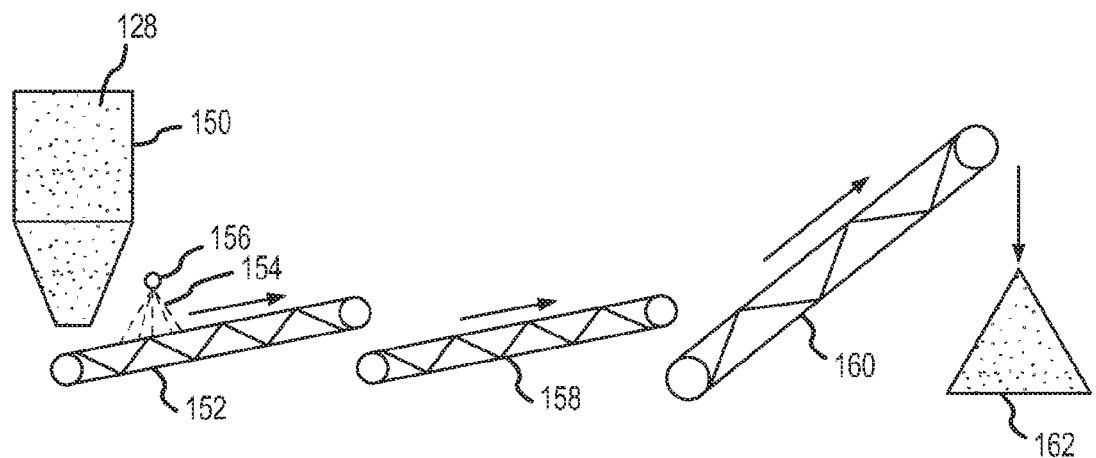
FIG. 7 is a schematic depicting one embodiment of an implementation for agglomerating particulate mineral material for heap processing with the invention.

One implementation for performing such an agglomeration is shown in FIG. 7. As shown in FIG. 7, the refractory mineral material feed 128 in particulate form is fed from a hopper 150 to a conveyor 152. While traveling on the conveyor 152, the refractory mineral material feed 128 is sprayed with a spray 154 of an acidic sulfate inoculate liquid from a spray apparatus 156. The refractory mineral material feed 128 is then transferred through additional conveyors 158 and 160 and deposited to form a heap 162, which may then be subjected to bio-oxidation. The use of the multiple conveyors 152, 158 and 160 as shown in FIG. 7 assists to thoroughly mix particles of the refractory mineral material feed 128 and the sprayed inoculate solution. Also, the action of the mineral material spilling from one conveyor to another promotes agglomeration of particles of the refractory mineral feed 128 into larger aggregate units, which improves properties, such as permeability, of the heap 162 for subsequent bio-oxidation and thiocyanate leaching operations.

An important aspect of the implementation of the present invention as shown in FIG. 6 is that it is not necessary to remove the heap after the bio-oxidation pretreatment 146 and redeposit a new heap prior to the thiocyanate leach 104. Both the bio-oxidation pretreatment 146 and the thiocyanate leach 104 are conducted at an acidic pH, and neutralization of solids in the heap is not required between the bio-oxidation 146 and the thiocyanate leach 104. The heap therefore may remain substantially structurally undisturbed between completion of the bio-oxidation pretreatment 146 and commencement of the thiocyanate leach 104, and it is not necessary to redeposit the solids in a new heap prior to performing the thiocyanate leach 104.

When operating a bio-oxidation/thiocyanate leach operation as generally described with reference to FIG. 6, the operation may at any given time involve a number of heaps in various stages of processing. For example, one or more heaps may be undergoing the bio-oxidation pretreatment 146 while one or more other heaps are simultaneously undergoing the thiocyanate leach 104. The heap or heaps undergoing the bio-oxidation pretreatment 146 operate at an acidic pH and produce acidic sulfate solutions having high concentrations of dissolved ferric iron. A typical pH for bio-leach solution is less than pH 2.5, and more typically in a range of from pH 1.3 to pH 2.0. Any suitable iron-oxidizing acidophilic microorganism may be used for the bio-oxidation pretreatment 146. Examples of such microorganisms include *thiobacillus ferrooxidans, leptospirillum ferrooxidans, sulfobocillus thermosulfidooxidans, metallospheara, sedula* and *Acidianus brierley*. Additional information concerning bio-oxidation in general is provided in U.S. Pat. Nos. 5,246,486; 5,332,559; 5,834,294; 5,127,942 and 5,244,493, the entire contents of each of which are incorporated herein by reference as if set forth herein in full.

Figure 8:
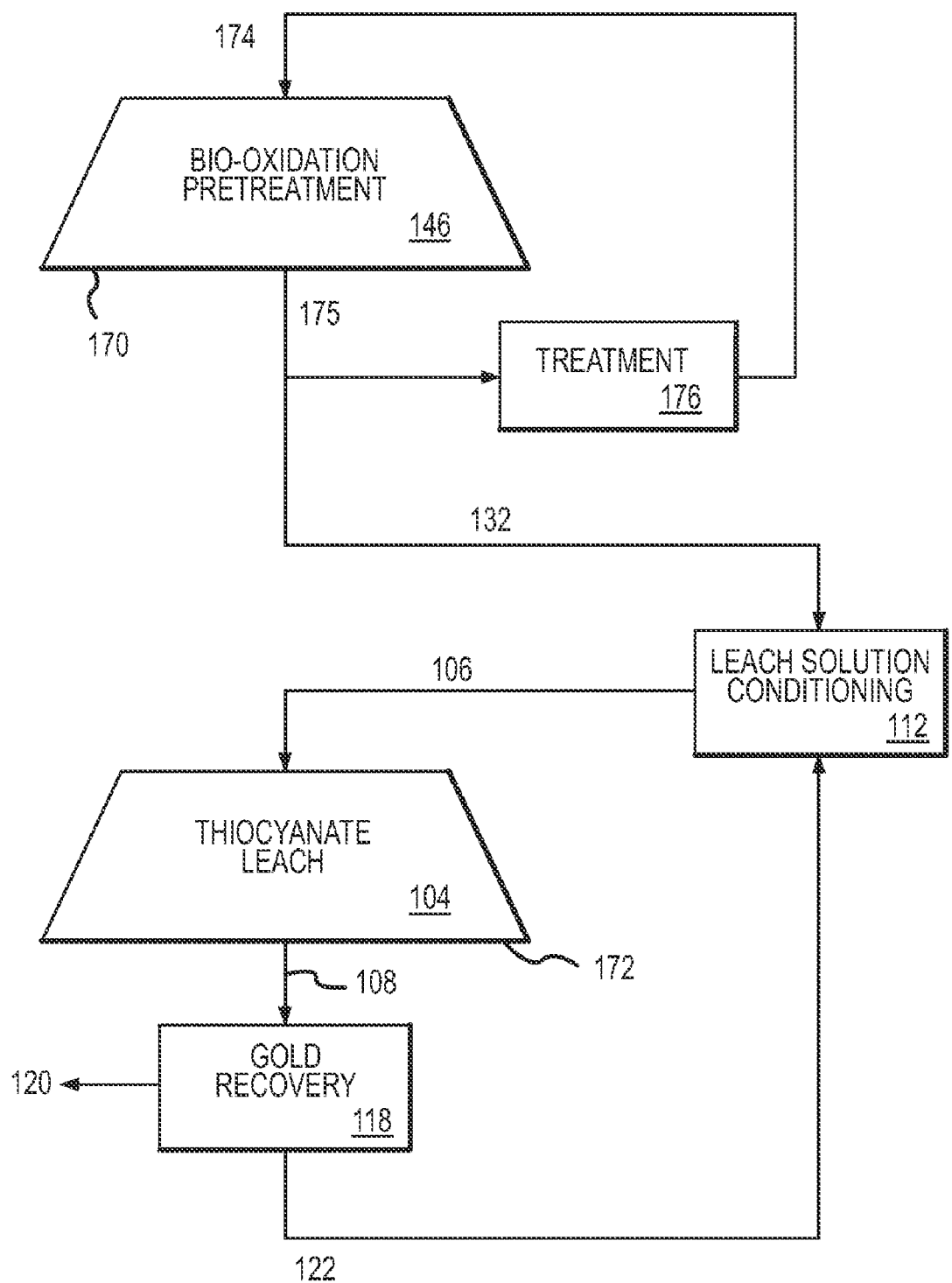
FIG. 8 is a generalized process schematic of one embodiment of an implementation of the present invention involving simultaneous bio-oxidation and thiocyanate leaching of different heaps.

An important variation of the present invention involving bio-oxidation followed by thiocyanate leaching is that the acidic effluent liquid collected from a heap being subjected to bio-oxidation may optionally be used to prepare a thiocyanate leach solution feed to be applied to another heap being subjected to the thiocyanate leach. Reference is now made to FIG. 8 showing one implementation of the present invention in which bio-oxidation and thiocyanate leaching are simultaneously performed on different heaps. Reference numerals are the same as those used in FIGS. 2, 3 and 6, except as noted. In the embodiment shown in FIG. 8, a first heap 170 is undergoing the bio-oxidation pretreatment 146 while a second heap 172, which has already been pretreated by bio-oxidation, is simultaneously being subjected to the thiocyanate leach 104. In practice, these two heaps may be at distant locations from each other or may be located adjacent to one another, and in the latter case there is preferably an impermeable barrier placed between the heaps 170 and 172 to prevent fluid communication between the heaps 170 and 172.

As shown in FIG. 8, acidic feed of acidic bio-leach solution 174 is applied to the first heap 170, such as for example by drip irrigation or another technique. Acidic effluent of the bio-leach liquid 175 draining from the first heap 170 is collected and a major portion is sent to treatment 176 for reuse to prepare the feed of the bio-leach solution 174 that is applied to the first heap 170. During the treatment 176, the pH may be adjusted, typically upward to a desired range for the bio-oxidation pretreatment 146, components such as iron and arsenic may be precipitated, liquid may be added or removed as needed and other reagents may be added as desired. Raising the pH and precipitating iron and arsenic may be accomplished, for example, by treating the solution with lime or some other neutralizing agent to partially neutralize the solution and precipitate the unwanted components.

Simultaneously, with operation of the bio-oxidation pretreatment 146 on the first heap 170, the feed of thiocyanate leach solution 106 is applied to the second heap 172, such as for example by drip irrigation or another technique. The pregnant thiocyanate leach solution 108 draining from the second heap 172 is collected and sent to the gold recovery 118, where gold is removed from the pregnant thiocyanate leach solution 108 and the purified gold product 120 is prepared. The barren effluent of thiocyanate leach solution 122 from the gold recovery 118 is sent to the leach solution conditioning 112 for use to prepare the feed of thiocyanate leach solution feed 106. A portion of the effluent of bio-leach solution 175, which is rich in dissolved ferric iron, provides the acidic effluent liquid 132 supplied to the leach solution conditioning 112.

A significant enhancement available when combining bio-oxidation pretreatment with thiocyanate leaching with the present invention is that the bio-oxidation pretreatment may be operated for only a short time prior to commencing the thiocyanate leach relative to bio-oxidation operations performed prior to cyanide leaching. Also, the combined duration of the bio-oxidation pretreatment and the thiocyanate leach may be achieved in a short duration, relative to a combined bio-oxidation and cyanide leach operation. When operating a traditional bio-oxidation/cyanide leach operation, it is necessary to oxidize the sulfide sulfur content in the feed of mineral material to such an extent that no significant additional oxidation of sulfide sulfur occurs during the subsequent cyanide leaching operations. Acid produced as a result of any such additional oxidation of sulfide sulfur would interfere with operation of a cyanide leach, because the cyanide leach must be conducted at an alkaline pH. With the present invention, however, it is not necessary to prevent further oxidation of sulfide sulfur during the thiocyanate leach operation, because the thiocyanate leach operation is preformed at an acidic pH, and significant additional sulfide sulfur oxidation may be accommodated during the thiocyanate leach, so long as the pH and other properties of the thiocyanate leach solution are maintained within acceptable ranges.

During a traditional bio-oxidation/cyanide leach operation, the bio-oxidation pretreatment often lasts for 180 days or more. The bio-oxidation time required for any particular ore material will depend upon a number of variables, including ore mineralogy and the coarseness of the particle size of the treated material. A significant advantage with the present invention is that it is often possible to reduce the bio-oxidation pretreatment time. As one example, for some mineral materials, the duration of the bio-oxidation pretreatment preceding a thiocyanate leach with the present invention may be only half as long, or even shorter, relative to the duration that would be required to precede a cyanide leach. In this example, a mineral material requiring 180 days of bio-oxidation pretreatment prior to a conventional cyanide leach may in some cases require only 90 days or less of bio-oxidation pretreatment prior to the thiocyanate leach. One reason that a shorter duration may be sufficient with the present invention is that continued oxidation of sulfide minerals, such as pyrite, during acidic thiocyanate leaching of gold does not create the same type of pH management problems that would be present during normal alkaline cyanide leaching. With the present invention, the bio-oxidation pretreatment may be discontinued for example when the sulfide sulfur oxidation is less than 30%, although the total amount of sulfide sulfur oxidized during both the bio-oxidation and the thiocyanate leach may be larger than 30%, and may often be significantly larger than 30%, such as perhaps 50% or more. When operating with a shortened duration for the bio-oxidation pretreatment, as may be the case with the present invention, a ratio of the quantity of sulfide sulfur oxidized during the thiocyanate leach to the quantity of sulfide sulfur oxidized during the bio-oxidation pretreatment may in one implementation be at least 1:10, in another implementation at least 1:5, in yet another implementation be at least 1:4 and in still another implementation be at least 1:3. One preferred range for such a ratio is from 1:5 to 1:2.

In addition to processing refractory sulfide ores and concentrates of such ores, the present invention is also useful for processing ores, and concentrates made from such ores, that include only a moderate level of sulfide sulfur and which, therefore, are only mildly refractory to direct cyanide leaching for gold recovery. Such mildly refractory ores have a sulfide sulfur content of typically smaller than 2 weight percent, often no greater than 1.5 weight percent, and sometimes even no greater than 1 weight percent. Such ores will, however, typically have a sulfide sulfur content of at least 0.5 weight percent. As noted previously, these ores may be referred to as transition ores when significant gold is associated with oxide minerals and with sulfide minerals.

The method of the present invention is particularly useful for treating mildly refractory sulfide ores, because these ores may often be processed with the present invention without an oxidation pretreatment step and without the cumbersome and expensive pH modification required for cyanide leaching operations. With this implementation of the present invention involving the treatment of mildly refractory mineral materials, it is preferred that at least 50 percent of the gold, and often at least 70 percent of the gold, is cyanide leachable gold, as determined by laboratory testing described below. These mildly refractory mineral materials tend to produce significant quantities of acid, which may significantly complicate and add to the expense of recovering the gold by direct cyanide leaching.

Figure 9:
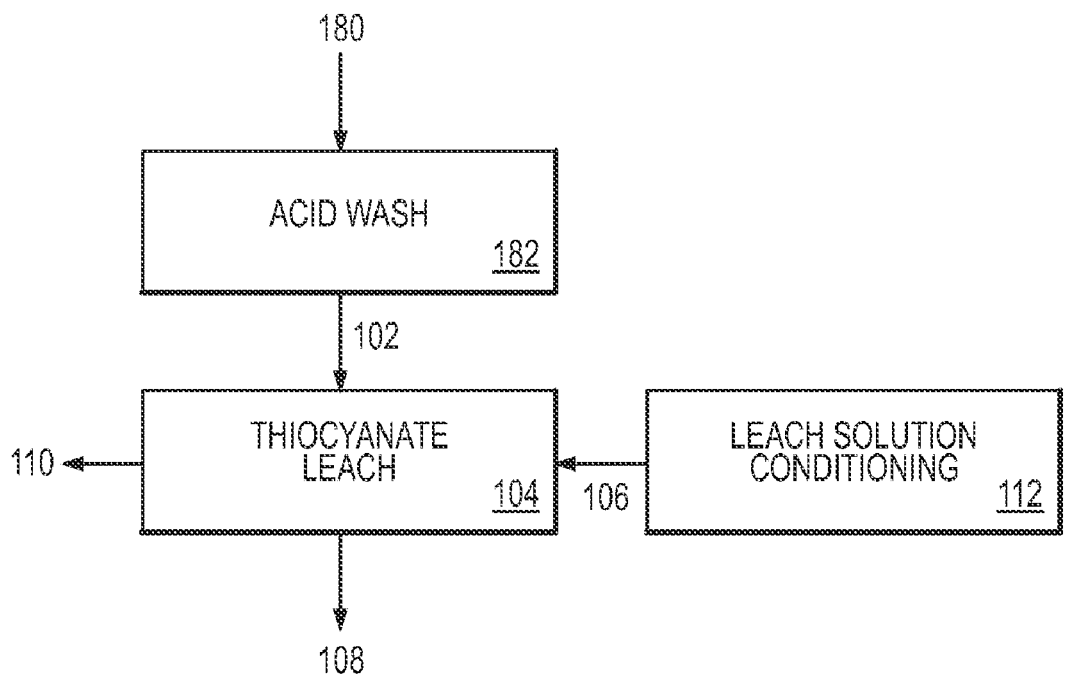
FIG. 9 is a generalized process block diagram of one embodiment of an implementation of the present invention involving acid wash of a feed material prior to thiocyanate leaching.

When processing mildly refractory sulfide ores, in one implementation the ore is subjected to an acid wash pretreatment prior to thiocyanate leaching. Referring now to FIG. 9, a generalized process block diagram is shown for one such implementation of the present invention for treating a mildly refractory material. Reference numerals are the same as in FIG. 1, except as noted. As shown in FIG. 9, a mildly refractory mineral material feed 180 in particulate form, such as for example mildly refractory ore and/or a concentrate prepared from a mildly refractory ore, is subjected to an acid wash 182, preferably with an acidic sulfate wash solution. During the acid wash 182, oxidation of easily oxidizable portions of the sulfide minerals is promoted, thereby promoting further release of gold. The acidic wash solution applied to contact the mildly refractory mineral material 180 may be at any acidic pH, but is preferably at a pH of no higher than pH 4, more preferably at a pH of no higher than pH 3, often in a range of from pH 0.1 to pH 3, and more often in a range of from pH 1 to pH 3. The acid wash 182 may include bio-oxidation pretreatment, but in one variation the acidic sulfate wash solution does not have added bacteria for promoting such bio-oxidation pretreatment. The acid wash 182 may be continued for any period of time, and it is preferably continued until oxidation of easily oxidized sulfide sulfur in the mineral material feed 180 has proceeded to a desired extent. Following the acid wash 182 remaining solids in the form of the mineral material 102 are subjected to the thiocyanate leach 104.

In another implementation of the present invention, a method is provided for treating a mineral material containing copper mineralization that includes appreciable soluble copper. As used herein, "soluble copper" refers to copper that would be susceptible to being dissolved into the thiocyanate leach solution if present during an acidic thiocyanate leach according to the present invention, if not removed prior to the acidic thiocyanate leach. Such soluble copper would also typically be susceptible to being dissolved in cyanide leach solutions were the mineral material instead subjected to cyanide leaching. For example, the mineral material may be a gold-bearing oxide ore or concentrate that includes a nuisance quantity of soluble copper. Such nuisance quantities of copper may often be present in ores in a range of from a few hundred ppm soluble copper to a few thousand ppm soluble copper, and possibly more. Such nuisance copper is frequently of little or no value and complicates gold recovery when using traditional cyanide leaching to dissolve gold, because copper is easily dissolved by cyanide leach solutions and results in high cyanide consumption. Also, copper cyanide presents a disposal issue that may require special processing. Examples of mineralizations that may contribute to the soluble copper content in a mineral material include elemental copper, copper-containing oxide minerals, and secondary copper-containing sulfide minerals, such as for example may be the case with chalcocite ($Cu_2S$) or covellite (CuS) as secondary sulfide minerals.

Alternatively, the soluble copper may be present in high enough quantities to be of economic value. The copper may represent the primary value in the ore (the gold being a by-product value) or the gold may represent the primary value in the ore (the copper being a by-product value).

In some instances when soluble copper represents the primary value in the ore, it is not economic during conventional processing to recover by-product gold after copper recovery, and the gold represents a lost economic value. This may be the case, for example, when copper is recovered from lower-grade copper ores in acidic dump leaching operations. In dump leaching operations, large piles of coarse copper-containing rock are leached with an acidic sulfate solution to dissolve copper that is easily solubilized. It is often not economic to recover gold with a cyanide leach following the acidic dump leach, because the cyanide leach has to be performed under alkaline conditions.

Figure 10:
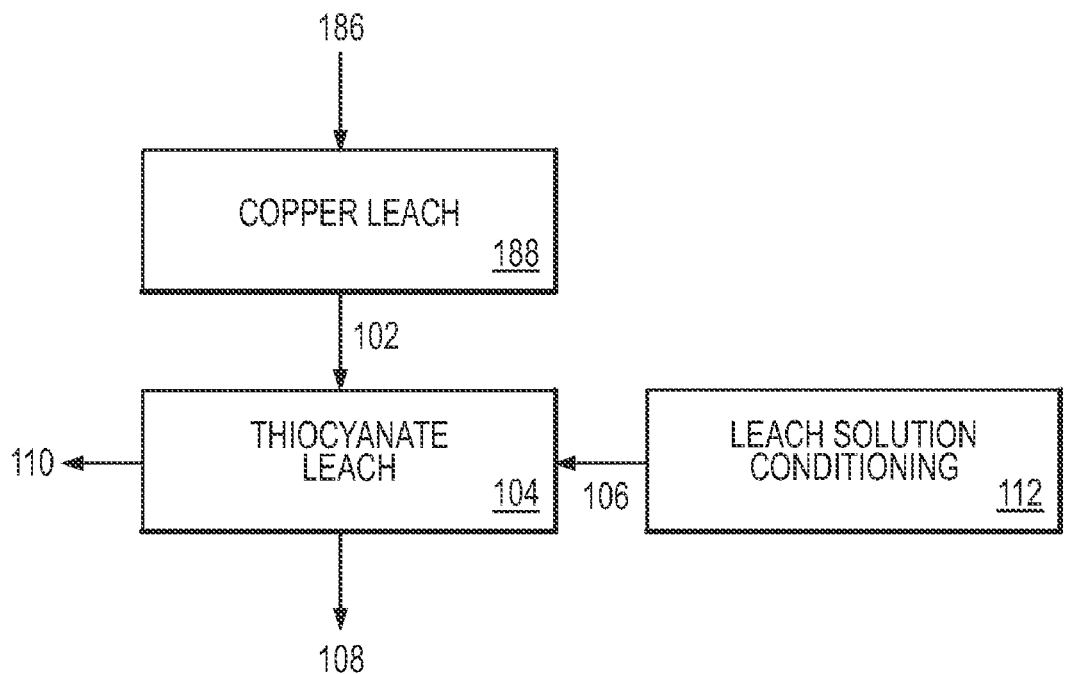
FIG. 10 is a generalized process block diagram of one embodiment of an implementation of the present invention involving leaching of copper from a feed material prior to thiocyanate leaching.

Referring now to FIG. 10, a generalized process block diagram is shown for one implementation of the present invention for treating ores, concentrates or other mineral materials that include an appreciable quantity of soluble copper. Reference numerals are the same as used in FIG. 1, except as noted. As shown in FIG. 10, a soluble copper-containing mineral material feed 186 is subjected to an acidic copper leach 188. During the copper leach 188, the soluble copper-containing mineral material feed 186 is leached with an acidic leach solution, typically an acidic sulfate leach solution, to dissolve soluble copper. Preferably, most or essentially all of the soluble copper is dissolved into the acidic leach solution during the copper leach 188. The soluble copper-containing mineral material feed 186 may include, for example, a gold-bearing oxide ore, transition ore and/or a concentrate that contains appreciable quantities of soluble copper. As another example, the soluble copper-containing mineral material feed 186 may include a copper ore or concentrate that contains by-product gold. Feed of the acidic leach solution supplied to the copper leach 188 will have an acidic pH, preferably will have a pH of no larger than pH 4, more preferably will have a pH of no larger than pH 3, typically will have a pH in a range of from pH 0.1 to pH 3 and more typically will have a pH in a range of from pH 1 to pH 3. When it is determined that the soluble copper has been sufficiently leached from the soluble copper-containing mineral material feed 186, then the copper leach 188 is discontinued and remaining solids in the form of the mineral material 102 are subjected to the thiocyanate leach 104 to dissolve gold. In a preferred variation, the copper leach 188 and the thiocyanate leach 104 are conducted in a heap operation. An even more preferred variation is for the copper leach 188 and the thiocyanate leach 104 to be conducted in the same heap, such that it is not necessary to disturb the structure of the heap between the copper leach 188 and the thiocyanate leach 104 and it is not necessary to redeposit a new heap for the thiocyanate leach. Performing the copper leach 188 and the thiocyanate leach in the same heap is possible because advantageously both operations are carried out under acidic conditions.

The soluble copper content of the copper-containing mineral material feed 186 may vary depending upon the situation. When the copper-containing mineral material feed 186 is an ore containing only a nuisance quantity of soluble copper, the soluble copper content will typically be at least 200 ppm (0.02 weight percent), but is often at least 500 ppm (0.05 weight percent) or even at least 1000 ppm (0.1 weight percent) or more. When the copper-containing mineral material feed 186 is a concentrate made from such an ore, the soluble copper content of the concentrate may be significantly smaller, significantly larger or about the same as the soluble copper content in the ore, depending upon the characteristics of the specific ore. When the copper-containing mineral material feed 186 is an ore containing sufficient soluble copper for the soluble copper to be a valuable component of the ore, the soluble copper content of the ore is often at least 0.1 weight percent, may be at least 0.5 weight percent, or may be at least 1 weight percent or more. When the soluble copper represents the primary metal value in the ore, the soluble copper content may be at least 2 weight percent, or even at least 5 weight percent or more. When the copper-containing mineral material feed 186 is a concentrate of such an ore, the soluble copper content is preferably significantly larger than the soluble copper content of the ore from which the concentrate was prepared. Even in the case of a concentrate, however, the soluble copper content will often be no larger than 20 weight percent.

When the soluble copper is only present in a nuisance quantity, then effluent acidic leach solution loaded with dissolved copper that results from the copper leach 188 may be subjected to water treatment to remove the dissolved copper and prepare the copper for disposal. When the soluble copper represents a valuable product, the effluent leach solution loaded with dissolved copper that results from the copper leach 188 may be further processed for copper recovery. Such copper recovery may involve, for example, iron cementation or solvent extraction. One preferred implementation for copper recovery involves solvent extraction of the dissolved copper from the acidic leach solution.

In another implementation, the present invention may involve processing a mineral material containing valuable precious metal values and valuable non-ferrous base metal values, wherein a significant portion of one or both of the precious metal values and the nonferrous base metal values is contained within sulfide minerals that must be decomposed to release the metal values for recovery. By non-ferrous base metal it is meant a base metal other than iron. Examples of non-ferrous base metals include copper, zinc, nickel, cobalt, indium and chromium. Particularly preferred for this implementation are mineral materials containing copper and/or zinc as nonferrous base metal values.

Figure 24:
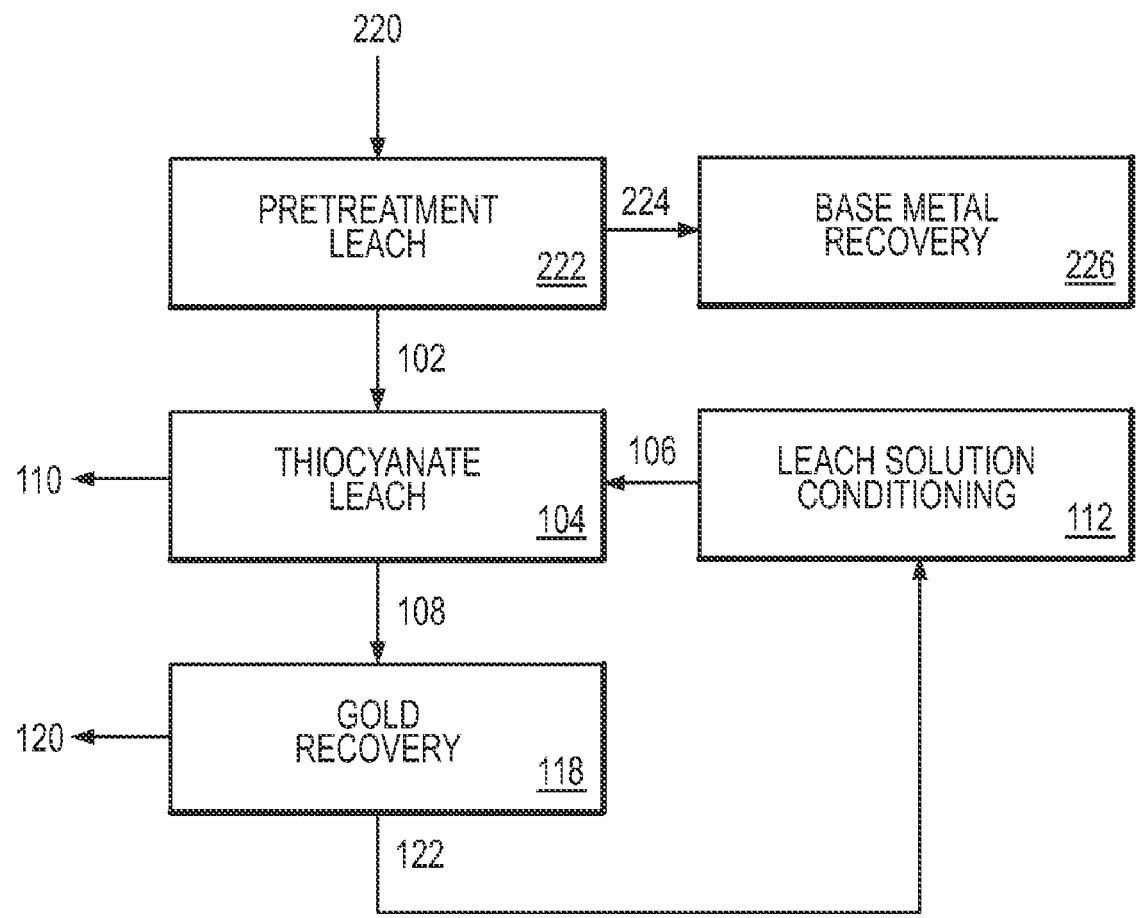
FIG. 24 is a generalized process block diagram of one embodiment of an implementation of the present invention involving processing of a material including recoverable nonferrous base metal and precious metal, with pretreatment leaching associated with recovery of nonferrous base metal followed by thiocyanate leaching associated with recovery of precious metal.

In this implementation, an acidic thiocyanate leach to dissolve precious metals follows an acidic pretreatment operation during which sulfide minerals are decomposed and non-ferrous base metal values are leached. The acidic pretreatment combines oxidative pretreatment to decompose sulfide minerals to release precious metal and/or non-ferrous base metal for recovery and leaching of the non-ferrous base metal. One specific implementation is shown in FIG. 24. Reference numerals in FIG. 24 are the same as for FIG. 2, except as noted.

As shown in FIG. 24, a mineral material feed 220 is subjected to a pretreatment leach 222. During the pretreatment leach 222, sulfide minerals in the mineral material feed 220 are decomposed and non-ferrous base metal is dissolved to form an acidic pregnant leach solution 224 containing the dissolved non-ferrous base metal. The mineral material 102, including residual solids from the pretreatment 222, is then processed in the thiocyanate leach 104 to dissolve gold. The pregnant leach solution 224 is then subjected to base metal recovery 226. During the base metal recovery 226, the non-ferrous base metal is removed from the pregnant leach solution 224 to prepare purified product(s) including non-ferrous base metal. For example, when processing a copper-gold ore or concentrate, during the base metal recovery 226 the copper may be removed from the pregnant leach solution 224 by solvent extraction into an organic extractant phase, and the extracted copper may then be stripped from the organic extractant phase into an aqueous strip solution and a copper-containing product prepared from the aqueous strip solution, such as for example by electrowinning or precipitation. As another example, when processing a zinc-gold ore or concentrate, during the base metal recovery 226 the zinc may be removed from the pregnant leach solution 224 by solvent extraction of the zinc or by selective precipitation of the zinc as a hydroxide. As yet a further example, when processing a copper-zinc-gold ore or concentrate, the base metal recovery 226 may include, for example, solvent extraction to selectively remove copper from the pregnant leach solution 224 followed by selective precipitation of zinc as a hydroxide.

In another aspect, the present invention involves removal of precious metal, and particularly gold, from a pregnant thiocyanate leach solution, such as may result from thiocyanate leaching of a precious metal-containing mineral material. Referring again to FIG. 2, during the gold recovery 118, gold-thiocyanate complex may be removed from the pregnant thiocyanate leach solution 108 by adsorption onto activated carbon, in a manner similar to removing gold-cyanide complex from cyanide leach solutions. The rate of adsorption of gold-thiocyanate complex onto activated carbon is, however, very slow. Also, activated carbon promotes reduction of dissolved ferric iron in the thiocyanate leach solution to ferrous iron, which is generally not desirable. As an alternative, gold-thiocyanate complex may be removed from pregnant thiocyanate leach solution by ion exchange resin. Ion exchange resin, however, is expensive and use of ion exchange resin may require complex processing to selectively elute gold-thiocyanate complex. With the present invention, neither adsorption of gold-thiocyanate complex onto activated carbon nor the recovery of gold-thiocyanate complex on exchange resin is preferred as a technique for remaining gold from a pregnant thiocyanate leach solution, although each may be used, if desired.

One preferred technique with the invention for removing precious metal, and particularly gold, from a pregnant thiocyanate leach solution is solvent extraction. Solvent extraction is effective for removing gold from the acidic thiocyanate leach solution and good phase separation of the organic and aqueous phases may be attained. Also, solvent extraction does not tend to promote reduction of ferric iron in the thiocyanate leach solution, as does the use of activated carbon. During the solvent extraction, the acidic aqueous pregnant thiocyanate leach solution is contacted with an organic phase that includes an extractant for removal of gold-thiocyanate complex from the pregnant thiocyanate leach solution. Some examples of extractants for use in the organic phase include phosphorous-containing extractants, such as phosphate, phosphonate, phosphinate and phosphine oxide extractants. Phosphates are particularly preferred as phosphorous-containing extractants for use with the invention. Other examples of extractants include amine extractants, which may comprise primary, secondary or tertiary amines. The use of amine extractants is particularly preferred for use with the present invention to remove gold-thiocyanate complex from acidic pregnant thiocyanate leach solutions by solvent extraction. Following extraction into the organic phase, gold-thiocyanate complex may then be removed from the loaded organic phase by stripping into an aqueous strip solution, such as for example an alkaline aqueous strip solution. Not to be bound by specific mechanism, but to aid in understanding of the invention, the extraction of gold-thiocyanate complex using amine extractants is believed to proceed generally as follows:

1) An amine acid salt is formed,

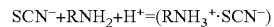

2) Amine-acid and gold-thiocyanate complex form an ion-pair,

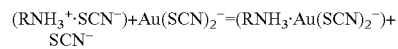

Figure 11:
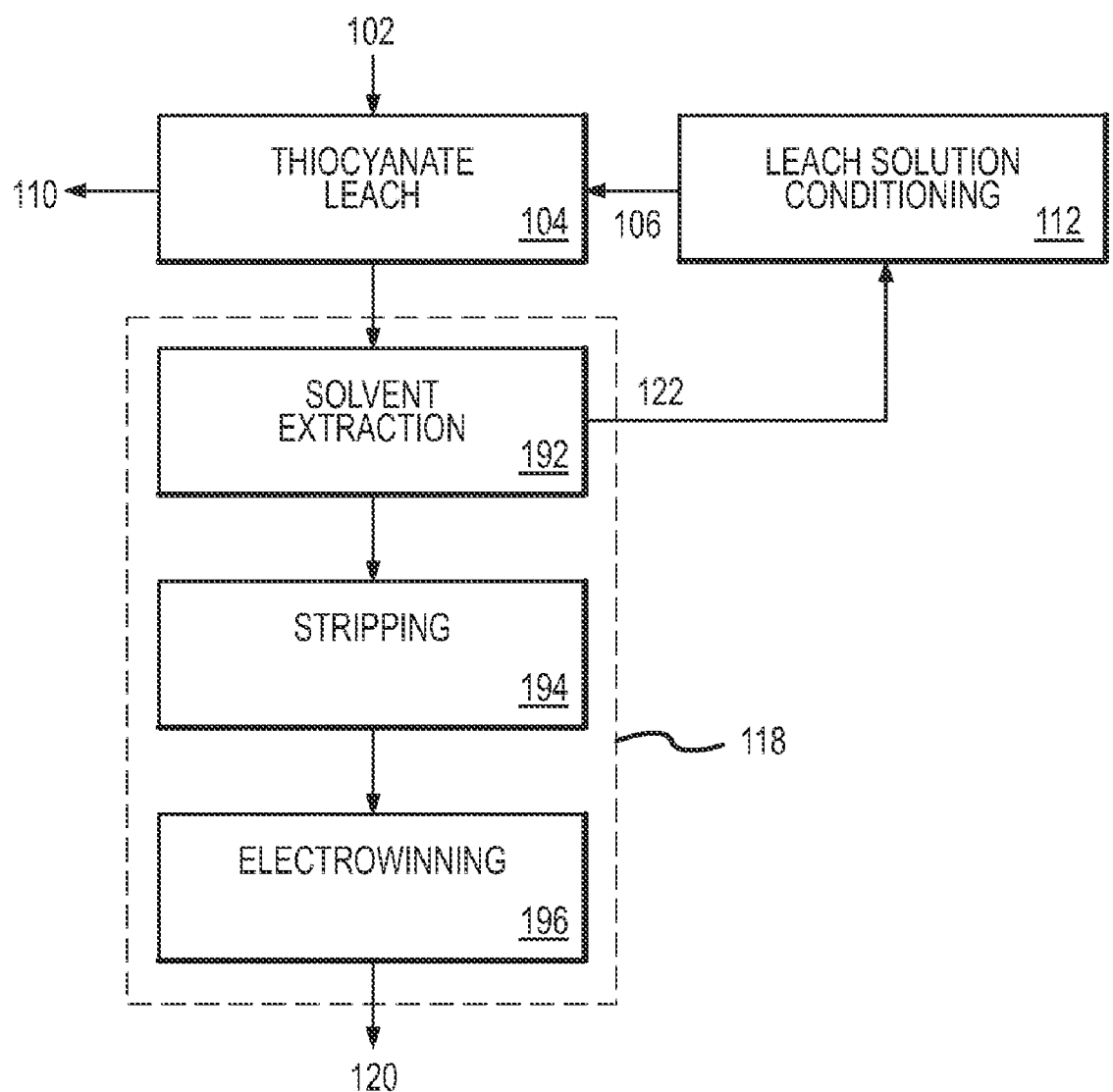
FIG. 11 is a generalized process block diagram of one embodiment of an implementation of the present invention involving solvent extraction recovery of precious metal following thiocyanate leaching, and recycling of the thiocyanate leach solution for use to prepare feed of the thiocyanate leach solution for supply to the thiocyanate leaching.

One implementation of the invention involving solvent extraction to recover gold is shown in the generalized process block diagram of FIG. 11. Reference numbers are the same as in FIG. 2, except as noted. As shown in FIG. 11, the pregnant thiocyanate leach solution 108 is subjected to the gold recovery 118, which comprises the general processing steps of solvent extraction 192, stripping 194 and electrowinning 196.

During the solvent extraction 192, the aqueous pregnant thiocyanate leach solution 108 is contacted with an organic liquid phase containing an extractant for gold-thiocyanate complex. Gold-thiocyanate complex is transferred from the pregnant thiocyanate leach solution 108 into the organic liquid phase. The organic liquid phase loaded with gold is separated from the thiocyanate leach solution, and the barren effluent of the thiocyanate leach solution 122 is supplied to the leach solution conditioning 112 for use to prepare the feed of the thiocyanate leach solution.

During the stripping 194, the loaded organic liquid phase is contacted with an aqueous strip solution to transfer gold from the organic liquid phase into the strip solution. The strip solution may be, for example an alkaline aqueous solution. The strip solution loaded with gold is then subjected to the electrowinning 196 to prepare the purified gold product 120.

In another preferred embodiment of the present invention, precious metal, and particularly gold, is removed from an acidic pregnant thiocyanate leach solution by transferring precious metal in the solution from the precious metal-thiocyanate complex to a new complex with a second complexing agent, with the new complex being more readily removable from the pregnant thiocyanate leach solution. In a preferred variation, the second complexing agent is cyanide and the new complex is precious metal-cyanide complex, and particularly gold-cyanide complex. When a small amount of cyanide is added to a pregnant thiocyanate leach solution containing gold-thiocyanate complex, gold quickly transfers in the solution from gold-thiocyanate complex to gold-cyanide complex. The pregnant thiocyanate leach solution may then be processed to remove gold-cyanide complex. For example, gold-cyanide complex may be removed from the pregnant thiocyanate leach solution by any technique used to remove gold-cyanide complex from cyanide leach solutions in conventional cyanide leaching operations.

In a preferred variation of this implementation, after transfer of gold to the gold-cyanide complex, the gold-cyanide complex is then removed from the pregnant leach solution by using an adsorbent material to adsorb gold-cyanide complex. The adsorbent material may be, for example carbon (preferably activated carbon) or ion exchange resin. Preferably the absorbent material comprises a carbonaceous adsorbent, such as granules of activated carbon. Once loaded with gold-cyanide complex, the absorbent material may be processed to recover gold in the same manner as with conventional cyanide leach operations. For example, gold-cyanide complex loaded onto activated carbon granules may be stripped from the granules into a hot caustic strip solution or some other strip solution, and the gold may then be recovered in a purified product, such as by electrowinning.

Figure 12:
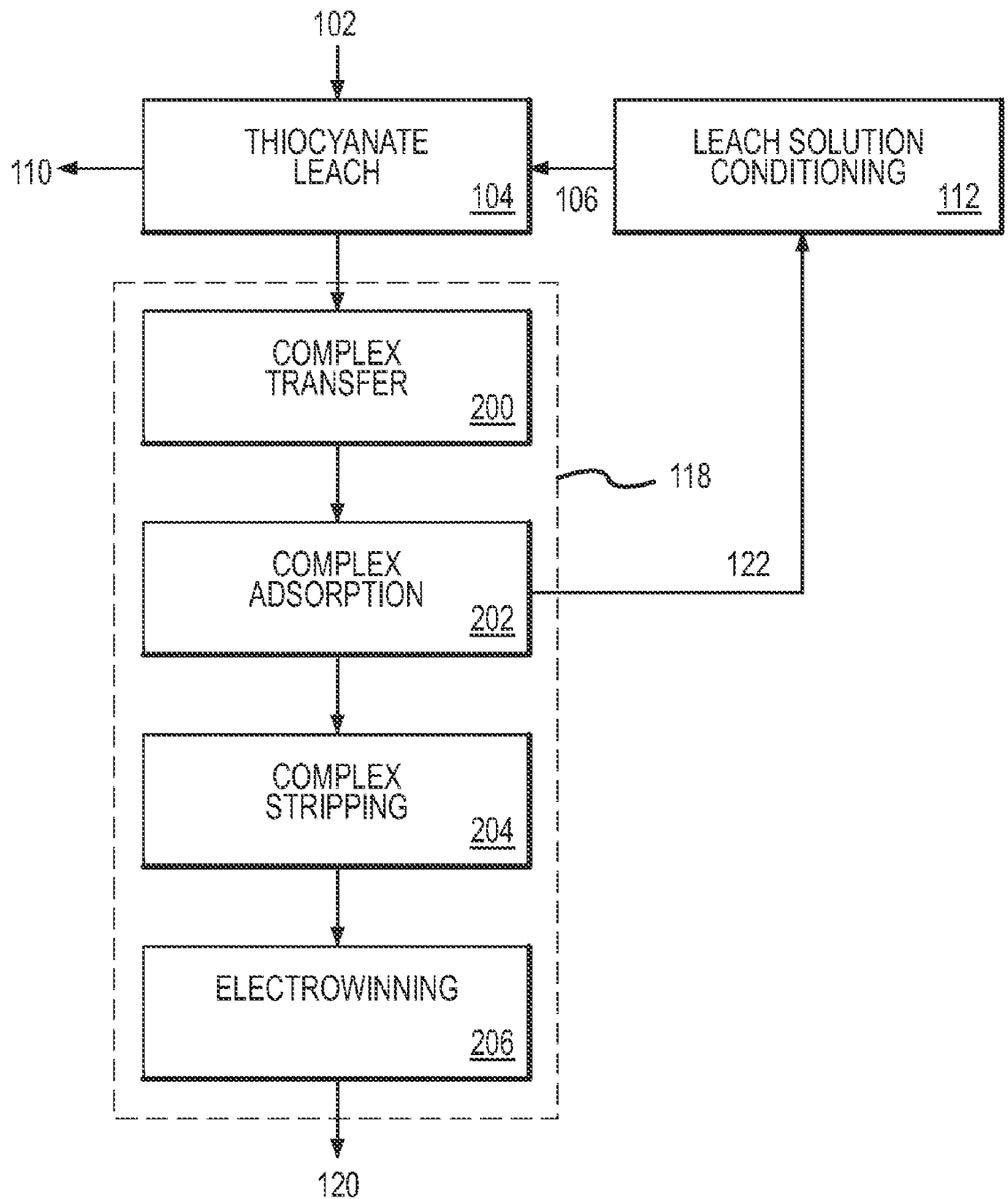
FIG. 12 is a generalized process block diagram of one embodiment of an implementation of the present invention involving complex transfer during precious metal recovery operations, and recycling of the thiocyanate leach solution for use to prepare feed of the thiocyanate leach solution for supply to the thiocyanate leaching.

One such preferred variation of the invention is shown in the generalized process block diagram of FIG. 12. Reference numerals are the same as in FIG. 2, except as noted. As shown in FIG. 12, after the thiocyanate leach 104, the pregnant thiocyanate leach solution 108 is sent to the gold recovery 118, which in this implementation comprises the general processing steps of complex transfer 200, complex absorption 202, complex stripping 204 and electrowinning 206. During the complex transfer 200, dissolved cyanide is introduced into the pregnant thiocyanate leach solution 108 and gold dissolved in the pregnant thiocyanate leach solution 108 is transferred from gold-thiocyanate complex to gold-cyanide complex. During the complex adsorption 202, gold-cyanide complex is loaded onto an adsorbent material, such as for example activated carbon granules or ion exchange resin. The barren thiocyanate leach solution 122 from which the gold-cyanide complex has been removed is supplied to the leach solution conditioning 112 for use to prepare the feed of thiocyanate leach solution 106.

Because gold-cyanide complex is thermodynamically favored over gold-thiocyanate complex, during the complex transfer 200 the gold dissociates from thiocyanate complexing agent to form a complex with cyanide complexing agent. During the complex transfer 200, preferably at least 80 percent, more preferably at least 90 percent, even more preferably at least 95 percent and most preferably at least 98 percent of gold dissolved in the pregnant thiocyanate leach solution 108 is transferred from gold-thiocyanate complex to gold-cyanide complex.

The complex transfer 200 and the complex adsorption 202 may be performed separately or together. For example, the dissolved cyanide may be introduced into the pregnant thiocyanate leach solution 108 prior to adding the adsorbent material, to permit most of the gold to transfer to gold-cyanide complex prior to contacting the pregnant thiocyanate leach solution 108 with the adsorbent material. In a preferred alternative, however the adsorbent material is added prior to or at about the same time as introduction of the dissolved cyanide, so that the complex transfer 200 and the complex adsorption 202 proceed concurrently. During the complex stripping 204, gold-cyanide complex is removed from the loaded adsorbent material by stripping the gold-cyanide complex into an aqueous strip solution. Stripped adsorbent material may be recycled for reuse during the complex adsorption 202 to be loaded with additional gold-cyanide complex. During the electrowinning 206, gold is removed from the loaded strip solution by electrowinning to prepare the purified gold product 120. During the complex transfer 200 and the complex adsorption 202, the thiocyanate leach solution is preferably at an acidic pH, and more preferably at a pH in a range of from pH 1 to pH 3. Preferably the thiocyanate leach solution is maintained at such an acidic pH throughout the thiocyanate leach 104, the complex transfer 200 and the complex adsorption 202.

With the implementation of the invention involving transfer of precious metal from precious metal-thiocyanate complex to precious metal-cyanide complex, removal of precious metal-cyanide complex by loading onto an adsorbent material, such as shown in FIG. 12, is preferred. Even though not preferred, however, other techniques may be used instead to remove precious metal from the pregnant leach solution following transfer of precious metal to the precious metal-cyanide complex. For example, gold-cyanide complex may be removed from the pregnant leach solution by solvent extraction or gold may be removed from the pregnant leach solution by cementation.

The transfer of gold from gold-thiocyanate complex to gold-cyanide complex during the complex transfer 200 may advantageously be accomplished in a preferred implementation of the invention by addition to the pregnant thiocyanate leach solution 108 of only a small quantity of dissolved cyanide. A stoichiometric quantity of cyanide required for complete complexation with the gold to from gold-cyanide complex is two moles of the cyanide group CN per mole of gold, assuming all gold is solubilized as the aurocyanide ion $Au(CN)_2^-$. The disclosed cyanide may be introduced into the pregnant thiocyanate leach solution 108 in any suitable form, such as for example in the form of sodium or potassium cyanide. Moreover, the cyanide may be introduced into the pregnant thiocyanate leach solution 108 in any convenient manner, such as for example, by dissolving a cyanide reagent (e.g. sodium or potassium cyanide) into the pregnant thiocyanate solution 108, or (preferably) by adding to the pregnant thiocyanate leach solution 108 a small quantity of a pre-prepared, concentrated cyanide solution. Also, the quantity of the cyanide added to the pregnant thiocyanate leach solution 108 will typically be at a molar ratio of the added cyanide to precious metal (and preferably of the added cyanide to gold) of no larger than 20:1 (ten times a stoichiometric quantity), preferably no larger than 10:1 (5 times a stoichiometric quantity), more preferably no larger than 5:1 (2.5 times a stoichiometric quantity) and even more preferably no larger than 4:1 (two times a stoichiometric quantity). The quantity of added cyanide will typically be at a molar ratio of cyanide to precious metal (and preferably of the added cyanide to gold) of at least 2:1 (a stoichiometric quantity). Moreover, the cyanide will typically be added to the pregnant thiocyanate leach solution 108 in a quantity that is small in comparison to the amount of dissolved thiocyanate in the pregnant thiocyanate leach solution 108. The quantity of added cyanide will typically be at a molar ratio of cyanide to dissolved thiocyanate of no larger than 1:2, preferably no larger than 1:4, more preferably no larger than 1:5, even more preferably no larger than 1:7 and still more preferably no larger than 1:10.

After introduction of the dissolved cyanide into the pregnant thiocyanate leach solution 108, some or all of residual dissolved cyanide may be converted to thiocyanate in the thiocyanate leach solution, preferably after removal of precious metal-cyanide complex from the thiocyanate leach solution. The conversion of residual cyanide in the thiocyanate leach solution to the thiocyanate provides a source of new thiocyanate lixiviant to partially or completely compensate for thiocyanate losses that occur during gold leaching and/or gold recovery operations. Also, although the use of activated carbon as an absorbent material tends to promote reduction of ferric iron in the thiocyanate leach solution to ferrous iron, kinetics of adsorption of gold-cyanide complex onto activated carbon are much faster than for adsorption of gold-thiocyanate complex, resulting in the use of shorter contact times with activated carbon granules and/or lower concentrations of activated carbon granules, thereby significantly lessening the potential problem associated with such reduction of ferric iron.

In another implementation of the invention, a portion or all of the dissolved thiocyanate in a feed of the thiocyanate leach solution is provided by conversion of dissolved cyanide to dissolved thiocyanate. For example, a thiocyanate leach solution may be initially prepared by dissolving cyanide in an acidic sulfate solution and then converting the dissolved cyanide in the solution to dissolved thiocyanate. The conversion may take place either before or during thiocyanate leaching of a mineral material. For example, leaching of gold from a heap could be commenced with a leach solution initially including dissolved cyanide that is converted to dissolved thiocyanate as the acidic leach progresses. Moreover, make-up thiocyanate may be supplied to an existing thiocyanate leach solution to compensate for thiocyanate losses over time by the addition of small quantities of cyanide, which then convert in solution to thiocyanate. This may be done in conjunction with gold recovery operations, as discussed above, or separately. This technique is useful for providing dissolved thiocyanate in a thiocyanate leach solution using cyanide reagents, such as sodium or potassium cyanide, rather than by dissolving potentially more expensive thiocyanate reagents, such as for example sodium thiocyanate, potassium thiocyanate or ammonium thiocyanate.

Figure 13:
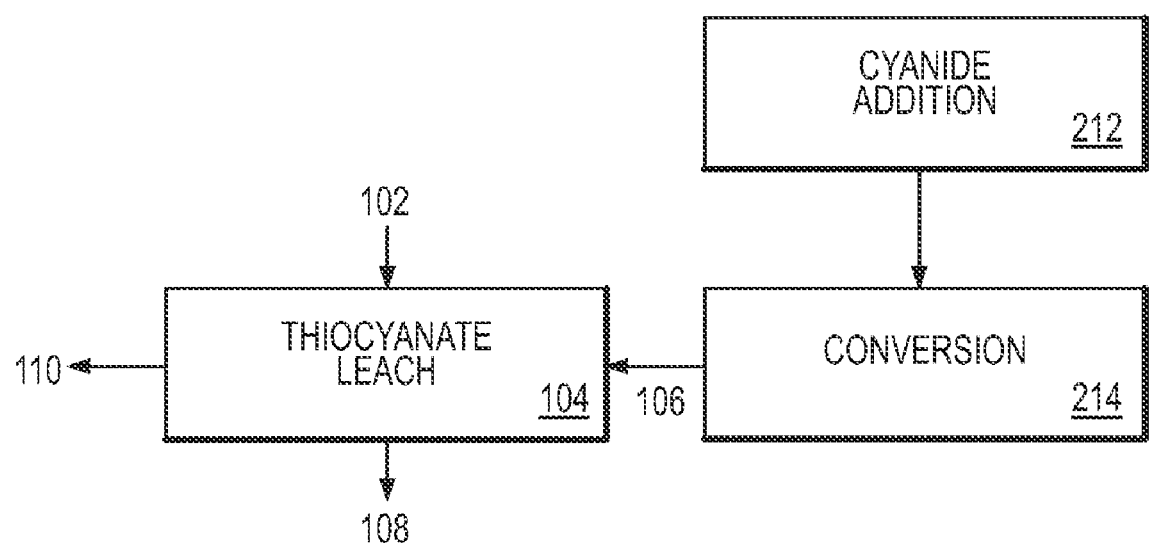
FIG. 13 is a generalized process block diagram of one embodiment of an implementation of the present invention involving conversion of cyanide to thiocyanate for use in thiocyanate leaching.

Referring now to FIG. 13, a generalized process block diagram is shown for one variation of this implementation. As shown in FIG. 13, during cyanide addition 212, cyanide is added to an aqueous liquid so that the aqueous liquid, after the cyanide addition 212, contains dissolved cyanide. The cyanide may be added, for example, as a pre-prepared concentrated cyanide solution added to the aqueous liquid or in a solid salt form that is dissolved into the aqueous liquid. The cyanide may be added in any desired form, such as for example in the form of sodium cyanide or potassium cyanide. After being dissolved in the aqueous liquid, at least a portion of the dissolved cyanide, and preferably substantially all of the dissolved cyanide, is converted to dissolved thiocyanate during the conversion 214, to prepare the feed of thiocyanate leach solution 106. During the conversion 214, typically at least 80 mole percent, preferably at least 90 mole percent and more preferably substantially all of the dissolved cyanide converts to dissolved thiocyanate. Preferably, both the cyanide addition 212 and the conversion 214 are performed at an acidic pH, more preferably in a range of from pH 1 to pH 3. The aqueous liquid may or may not already contain dissolved thiocyanate prior to the cyanide addition 212. As an example, the cyanide addition 212 and conversion 214 of FIG. 13 may be performed as part of the leach solution conditioning 112 of any of the embodiments shown in any of FIGS. 1-6, 8-12 and 24. As another example, the cyanide addition 212 and the conversion 214 of FIG. 13 may involve initial preparation of a thiocyanate solution prior to commencement of thiocyanate leaching operations.

In one preferred variation of the implementation of FIG. 13, rapid conversion of dissolved cyanide to dissolved thiocyanate is promoted during the conversion 214 by introducing appropriate reagent(s) into the aqueous liquid during the conversion 214. Preferred reagents for converting cyanide to thiocyanate include sulfide and hydrosulfide materials. Examples of possible reagents include sodium sulfide, sodium hydrosulfide, potassium sulfide, potassium hydrosulfide, ammonium sulfide, ammonium hydrosulfide and hydrogen sulfide. Other examples of possible reagents include sulfide minerals, such as for example pyrrohotite.

As another example, some or all of the conversion of cyanide to thiocyanate could occur during thiocyanate leaching, such as due to contact with sulfide minerals, such as pyrrohotite, present in the mineral material being leached. For example, referring again to FIG. 12, some or all of cyanide introduced into the thiocyanate leach solution for the complex transfer 200 could subsequently be converted to thiocyanate during the thiocyanate leach 104 by contact with sulfide minerals, such as for example pyrrohotite, in the mineral material 102.

EXAMPLES

The following examples are provided to further aid understanding of the present invention and not to limit the scope of the invention.

Example 1

Column Leach of Mildly Refracting Ore

Tests are performed on a mildly refractory sulfide ore from the Lone Tree mine located in Nevada, U.S.A. XRD/XRF semiquantitative analysis indicates the ore to be composed of about 86% quartz, 6% kaolin, 3% pyrite, 2% alunite, 1% gypsum, 1% jarosite and 1% barite. Representation assay information for the ore samples is shown in Table 3. The ore does not exhibit preg-robbing tendencies.

TABLE 3

Representative Ore Sample Assay

| Au g/t[1] | S-Total[2] weight % | S-Sulfide[3] weight % | Fe weight % | As ppm |
|---|---|---|---|---|
| 2.26 | 1.643 | 0.951 | 1.551 | 655.9 |

[1] grams per tonne
[2] total sulfur content
[3] sulfide sulfur content

Two sets of leach tests are performed, one using a cyanide leach solution and the other using a thiocyanate leach solution. All tests are performed on minus 10 mesh (1.68 mm) ore samples placed in 2 inch (50.8 mm) diameter columns for leaching.

Figure 14:
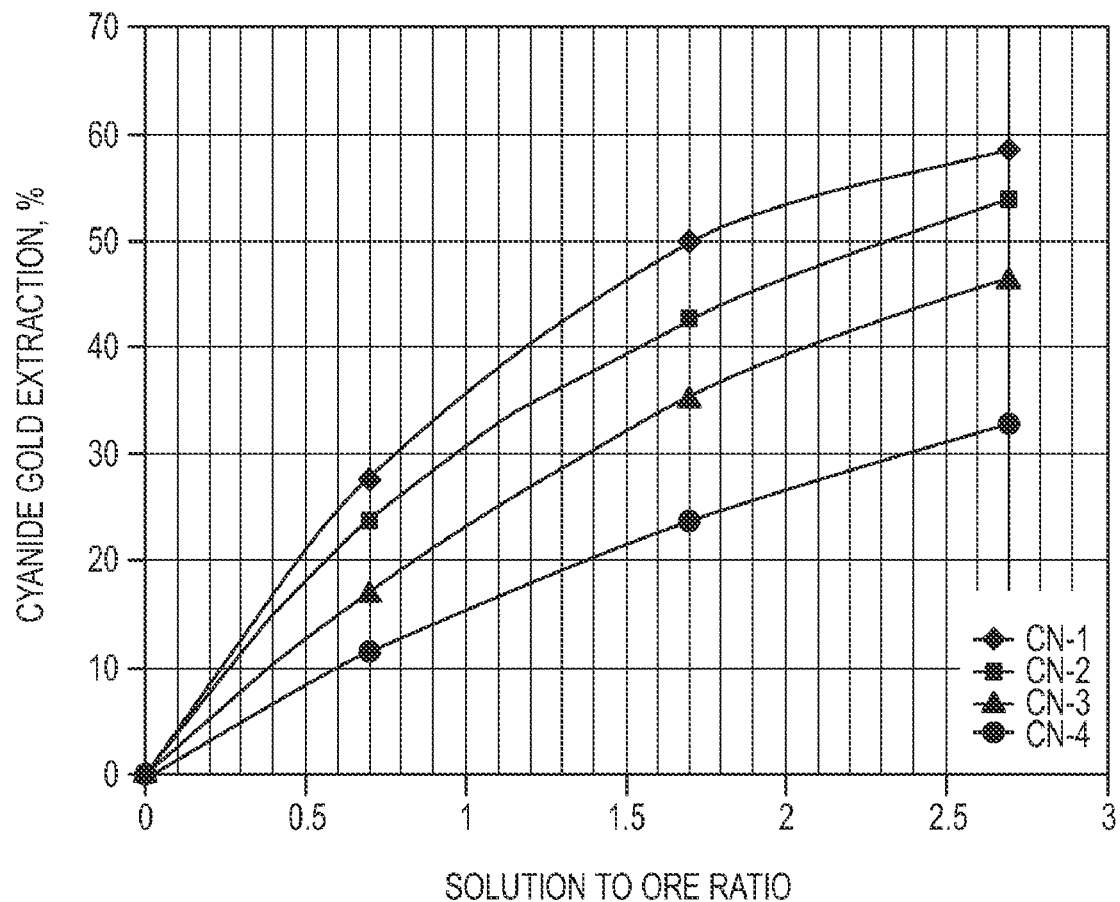
FIG. 14 is a plot of gold extraction vs weight ratio of thiocyanate leach solution to ore for cyanide leach tests presented in Example 1.

For the cyanide leach tests, 200 grams of ore sample, alone or mixed with lime for neutralization, are loaded into the column and leached with an aqueous sodium cyanide (NaCN) leach solution to a weight ratio of final solution to ore of 2.68 (i.e., each 200 gram sample is treated with 536 grams of leach solution). The leach solution initially contains 125 ppm NaCN and is at pH 9.8-10. Results of the cyanide leach tests are summarized in Table 4. As shown in Table 4, the maximum gold extraction with cyanide is achieved in the test using the largest amount of lime, and therefore operating at the most alkaline pH. Gold recovery is particularly low when no lime is used. FIG. 14 shows a plot of gold extraction vs. cumulative solution-to-ore weight ratio for each of the tests, further demonstrating the beneficial effect of operation of the cyanide leach at an alkaline pH.

TABLE 4

Cyanide Leach Test Results

| Test | CN-1 | CN-2 | CN-3 | CN-4 |
|---|---|---|---|---|
| Lime Addition (lb/st)[1] | 15 | 10 | 5 | 0 |
| Final Solution to Ore Ratio[2] | 2.68 | 2.68 | 2.68 | 2.68 |
| Final Pregnant Leach Solution pH | 9.1 | 7.0 | 5.2 | 4.0 |
| Gold Extraction (%)[3] | 56.67 | 51.52 | 44.24 | 30.61 |
| Gold Extraction (%)[4] | 58.55 | 53.62 | 46.67 | 32.65 |

[1] pounds of lime per short ton of ore
[2] weight ratio of total cyanide leach solution to ore sample
[3] based on measured feed gold
[4] based on calculated feed gold For the thiocyanate leach tests, an aqueous thiocyanate leach solution is prepared using either ammonium thiocyanate ($NH_4SCN$) or potassium thiocyanate (KSCN) reagent dissolved in water. Ferric sulfate ($Fe_2(SO_4)_3$) is added to the leach solution to obtain a desired quantity of dissolved ferric iron and a desired oxidation-reduction potential. The thiocyanate leach solution is initially at about pH 2. For each test, 800 grams ore sample is loaded into the column, and the sample is leached with the thiocyanate leach solution. The leach solution is tested using different concentrations of dissolved thiocyanate and dissolved ferric iron, and leaching is conducted to various final solution-to-ore weight ratios. Results of the thiocyanate leaching tests are summarized in Table 5. As shown in Table 5, gold extractions achieved in the thiocyanate leach tests are generally as high as or higher than gold extractions achieved during the cyanide leach tests involving significant lime addition. This is particularly noteworthy because each of the thiocyanate leach tests is conducted at an acidic pH.

TABLE 5

Thiocyanate Leach Test Results

| | Test | | | | | |
|---|---|---|---|---|---|---|
| | SCN-1 | SCN-2 | SCN-3 | SCN-4 | SCN-5 | SCN-6 |
| SCN Concentration (M)[1] | 0.05 | 0.05 | 0.02 | 0.02 | 0.01 | 0.01 |
| $Fe^{3+}$ Concentration (M)[2] | 0.2 | 0.1 | 0.2 | 0.1 | 0.2 | 0.1 |
| $Fe^{3+}$/SCN Molar Ratio[3] | 4 | 2 | 10 | 5 | 20 | 10 |
| Weight Ratio of Final Solution to Ore | 4.125 | 4.112 | 3.066 | 2.546 | 4.300 | 4.505 |
| Gold Extraction (%)[4] | 61.13 | 59.78 | 57.26 | 59.38 | 59.59 | 53.48 |
| Gold Extraction (%)[5] | 61.31 | 60.14 | 56.61 | 59.90 | 54.42 | 51.83 |

[1]Moles dissolved thiocyanate per liter of leach solution (1 mole of dissolved thiocyanate provided per mole ammonium or potassium thiocyanate reagent)
[2]Moles dissolved ferric sulfate per liter of leach solution
[3]Ratio of moles of thiocyanate reagent to moles of ferric sulfate used per liter of leach solution
[4]Based on measured feed gold
[5]Based on calculated feed gold Example 2

Bottle Roll Leach Following Bio-Oxidation Pretreatment of Refractory Sulfide Ore Tests are preformed on samples of a refractory sulfide gold ore from the Lone Tree mine. A 65.8 kg sample of ore crushed to 100% passing 2 inches (50.8 mm) is subjected to bio-oxidation pretreatment in a column having an inside diameter of 11 inches (279.4 mm), to simulate bio-oxidation in a heap. Prior to placing the ore in the column, 1920 mL of a mixed culture of acidophilic iron-oxidizing bacteria, containing *Acidithiobacillus ferrooxidans* and *Leptospirillum ferrooxidans*, is mixed with the ore. During bio-oxidation a nutrient solution containing 0.4 g/L $(NH_4)_2SO_4$, 0.4 g/L $MgSO_4 \cdot 7H_2O$ and 0.04 g/L $K_2HPO_4$, is continuously recirculated through the ore in the column at a flow rate of about 6.5 mL/min. The column is continuously aerated from the base at an air flow rate of 28.3 L/h. The bio-oxidation pretreatment is continued for 258 days at room temperature (approximately 20-22° C.). Upon termination of the bio-oxidation pretreatment, the ore is removed from the column. During the bio-oxidation pretreatment, about 35% of the sulfide sulfur is oxidized. Representative assay information for the bio-oxidized ore is shown in Table 6.

TABLE 6

Representative Bio-Oxidized Ore Sample Assay

| Au g/t[1] | Total Sulfur Weight % | Sulfide Sulfur Weight % | Fe Weight % | Cu ppm | As ppm |
|---|---|---|---|---|---|
| 2.81 | 3.14 | 2.72 | 2.63 | 30.46 | 1853 |

[1]grams per tonne

Following completion of the bio-oxidation, the bio-oxidized ore is washed to remove soluble iron, dried and then crushed and ground to a $P_{80}$ size of about 200 mesh (74 microns) for gold extraction testing. A $P_{80}$ size means that 80 weight percent of the sample passes a screen opening of the noted size. For gold extraction testing, a sample of the crushed and ground bio-oxidized ore is placed in a 1 gallon (3.78 L) bottle along with freshly prepared thiocyanate leach solution at a pulp density of 20 weight percent solids. Several leach tests are performed using thiocyanate leach solutions of approximately pH 2 made with varying concentrations of potassium thiocyanate (KSCN) and ferric sulfate ($Fe_2(SO_4)_3$) dissolved in deionized water.

During the thiocyanate leach tests, the bottles are open to the air and solution samples are taken at time intervals. The leaching lasts for a total of about 6 hours. Solution potential, pH values, and thiocyanate concentrations are measured. Gold is analyzed by atomic absorption spectrophotometry (AAS). To overcome matrix effects, all AAS calibration standards are diluted in solutions representative of the thiocyanate leach solutions used in the particular leach tests. For some tests, gold concentration is also determined by solvent extraction with di-isobutyl ketone (containing 1% Aliquat 336) and AAS analysis. Thiocyanate concentration is determined by Volhard titration, which determines the total $SCN^-$ concentration. Total iron concentration is determined by AAS and ferrous ion concentration is determined by titration with potassium permanganate ($KMnO_4$) or potassium dichromate ($K_2Cr_2O_7$) in the presence of sulfuric acid after complete precipitation of the thiocyanate ion. The solids residue from each thiocyanate leach test is washed thoroughly with water and dried prior to analysis of a representative sample for gold using fire assay followed by digestion and AAS.

Table 7 summarizes the molar concentrations of thiocyanate, ferric iron and cyanide in the prepared leach solutions. Results are summarized in Table 8. Table 8 reports solution oxidation-reduction potential (designated as E). E, as used herein, refers to solution oxidation-reduction potential expressed in millivolts as measured using a platinum (Pt) working electrode relative to a silver/silver chloride (Ag/AgCl) reference electrode. Eh (oxidation-reduction potential relative to a standard hydrogen electrode) may be determined from the reported E values by correction relative to a standard hydrogen electrode.

TABLE 7

Prepared Leach Solutions

| Test | [CN] M | [SCN] M | [$F_e^{3+}$] M | Ratio [$F_e^{3+}$]:[SCN] |
|---|---|---|---|---|
| SCN-7 | — | 0.01 | 0.1 | 10 |
| SCN-8 | — | 0.02 | 0.1 | 5 |
| SCN-9 | — | 0.05 | 0.1 | 2 |
| SCN-10 | — | 0.01 | 0.2 | 20 |
| SCN-11 | — | 0.02 | 0.2 | 10 |
| SCN-12 | — | 0.05 | 0.2 | 4 |
| SCN-13 | — | 0.01 | 0.3 | 30 |
| SCN-14 | — | 0.02 | 0.3 | 15 |
| SCN-15 | — | 0.05 | 0.3 | 6 |

TABLE 8

Leach Results

| Test | Pregnant Leach Solution pH | Pregnant Leach Solution E mV | Gold Extraction % |
|---|---|---|---|
| SCN-7 | 1.98 | 481 | 39.81 |
| SCN-8 | 1.95 | 476 | 41.10 |
| SCN-9 | 1.91 | 462 | 50.05 |
| SCN-10 | 1.88 | 498 | 47.49 |
| SCN-11 | 1.87 | 493 | 50.14 |
| SCN-12 | 1.85 | 480 | 56.55 |
| SCN-13 | 1.75 | 509 | 45.10 |
| SCN-14 | 1.74 | 504 | 48.60 |
| SCN-15 | 1.74 | 492 | 55.00 |

Figure 15:
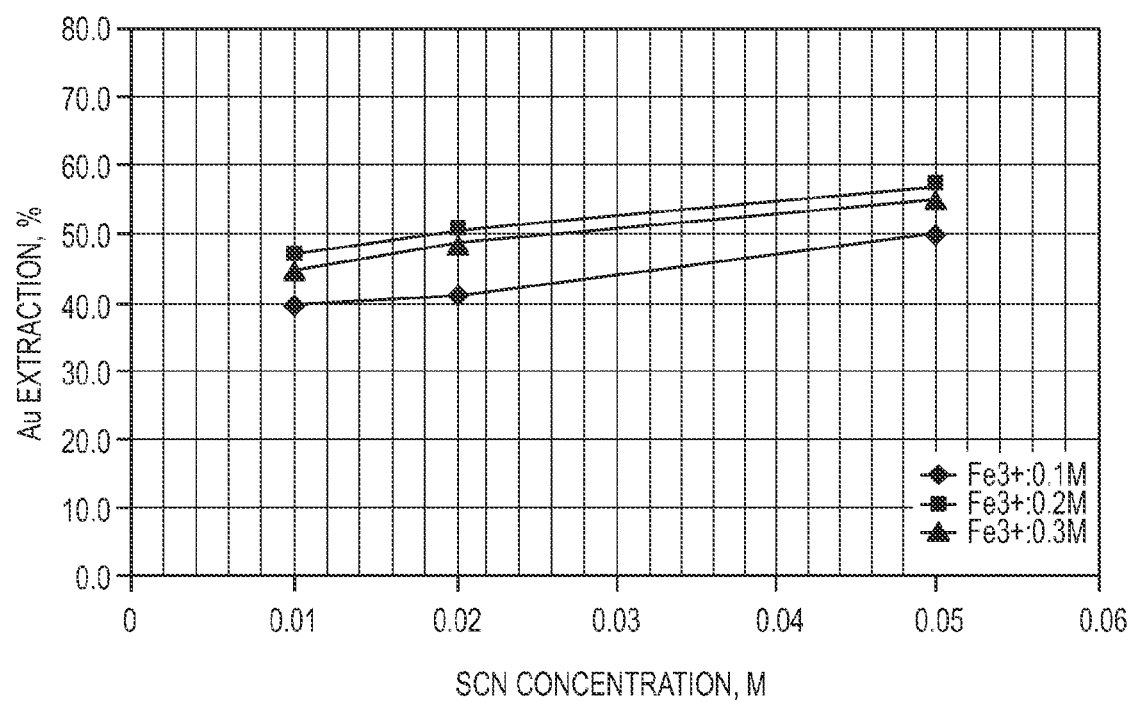
FIG. 15 is a plot of gold extraction vs thiocyanate concentration in thiocyanate leach solutions for thiocyanate leach tests presented in Example 2.

FIG. 15 shows plots of gold extraction vs. initial thiocyanate concentration in the thiocyanate leach solution for the tests involving 0.1 M ferric iron, 0.2 M ferric iron and 0.3 M ferric iron. As seen in FIG. 15, the tests with 0.2 M and 0.3 M ferric iron consistently showed significantly higher gold recoveries than the corresponding test with only 0.1 M ferric iron, for the same concentration of thiocyanate.

Example 3

Bottle Roll Leach Following Bio-Oxidation Pretreatment of Refractory Sulfide Ore Bottle roll leach tests are performed as described in Example 2 using the biooxidized ore of Example 2. Tests are performed using freshly prepared thiocyanate leach solutions containing dissolved thiocyanate and ferric iron as shown in Table 9. Leaching continues for a total of 24 hours for each test. For each test, leach solution samples are obtained and analyzed at 2 hours, 4 hours, 6 hours 12 hours and 24 hours. For comparison, cyanide leachable gold for this ore is determined to be 69%. By "cyanide leachable gold", it is meant gold extracted from a sample of the mineral material (e.g., the ore or the concentrate) by a standardized test procedure as follows:

A 5 gram sample of the mineral material pulverized to a size of minus 200 mesh is placed into a test tube along with 10 ml of a solution containing 0.3 weight percent sodium cyanide and 0.3 weight percent sodium hydroxide in ionized water. The test tube is rotated for one hour at room temperature. The solution and remaining solids are then separated by centrifuge, and gold content in the solution is determined by atomic absorption analysis. Cyanide leachable gold is then determined as the percent gold extraction into the solution based on solution gold content (determined from the atomic absorption analysis) relative to the original gold content in the mineral material (determined by fire assay analysis).

TABLE 9

Prepared Leach Solutions

| Test | [SCN] M (g/L) | [$F_e^{3+}$] M (g/L) | Molar Ratio [$F_e^{3+}$]:[SCN] |
|---|---|---|---|
| SCN-16 | 0.01 (0.58) | 0.2 (11.1) | 20 |
| SCN-17 | 0.02 (1.16) | 0.2 (11.1) | 10 |
| SCN-18 | 0.05 (2.9) | 0.2 (11.1) | 4 |
| SCN-19 | 0.1 (5.8) | 0.2 (11.1) | 2 |
| SCN-20 | 0.05 (2.9) | 0.1 (5.58) | 2 |
| SCN-21 | 0.05 (2.9) | 0.3 (16.7) | 6 |

From the cyanide leach test, it is determined that about 69% of the gold in the bio-oxidized sample is cyanide leachable. The highest gold extraction for the thiocyanate leach tests is about 65%. Table 10 summarizes total gold extraction during 24 hours of leaching for each of the leach tests.

TABLE 10

Gold Extraction

| Test | Gold Extraction (%) |
|---|---|
| SCN-16 | 50.0 |
| SCN-17 | 60.49 |
| SCN-18 | 64.15 |
| SCN-19 | 63.05 |
| SCN-20 | 62.93 |
| SCN-21 | 65.49 |

Figure 16:
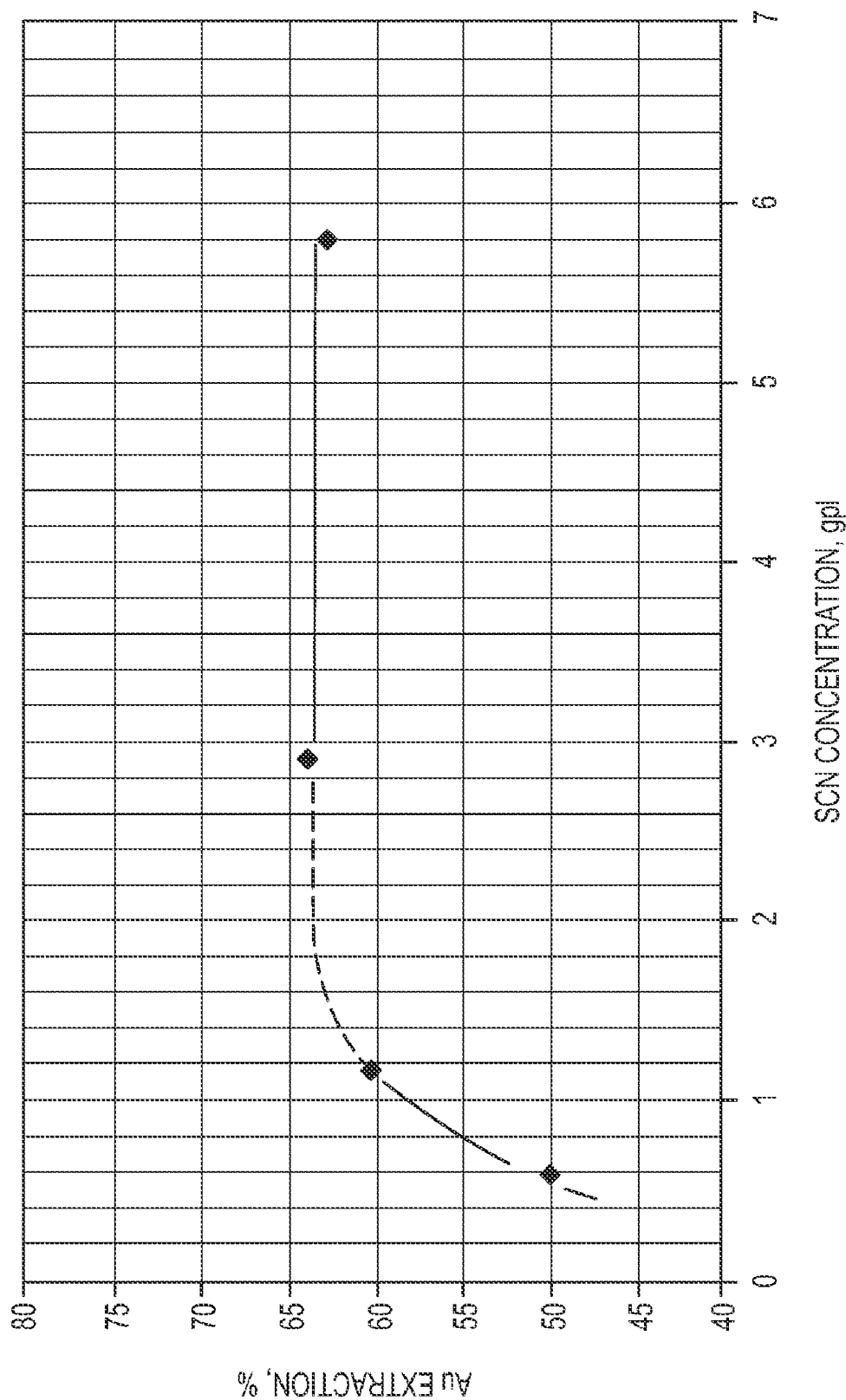
FIG. 16 is a plot of gold extraction vs thiocyanate concentration in thiocyanate leach solutions for thiocyanate leach tests presented in Example 3.
Figure 17:
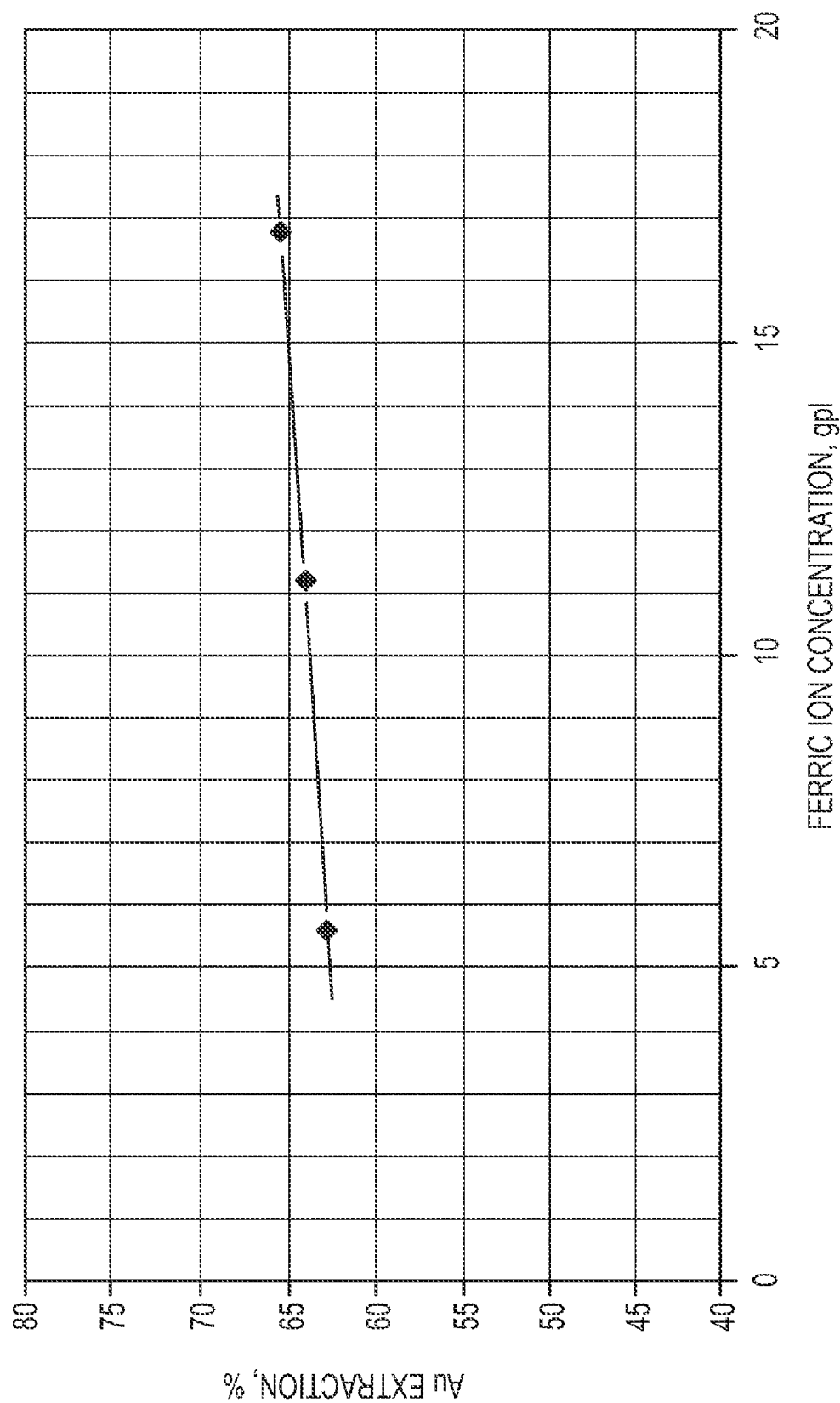
FIG. 17 is a plot of gold extraction vs ferric iron concentration in thiocyanate leach solutions for thiocyanate leach tests presented in Example 3.

Table 11 summarizes data for several tests concerning properties of the thiocyanate leach solution determined from solution samples obtained periodically during the tests. Data summarized in Table 11 includes changes in thiocyanate leach solution pH and E, reduction of ferric to ferrous iron in the thiocyanate leach solution and degradation of thiocyanate. FIG. 16 shows a plot of total gold extraction vs. thiocyanate concentration through 6 hours of leaching for tests SCN-16, 17, 18 and 19, which each use the same concentration of dissolved ferric iron (0.2 M) and different concentrations of dissolved thiocyanate. Notably, gold extractions are higher for test SCN-18 than SCN-19, even though SCN-19 uses a lower initial concentration of dissolved thiocyanate in the thiocyanate leach solution. FIG. 17 shows a plot of gold extraction vs. ferric iron concentration for tests SCN-18, 20, and 21, which each use the same concentration of dissolved thiocyanate (0.05 M) and different concentrations of dissolved ferric iron. As seen in FIG. 17, gold extraction for these tests increases with increasing initial concentrations of ferric iron.

TABLE 11

Thiocyanate Solution Analysis

| Test/Property | 2 hours | 4 hours | 6 hours | 12 hours | 24 hours |
|---|---|---|---|---|---|
| Test SCN-17 | | | | | |
| pH | 1.69 | 1.69 | 1.71 | 1.64 | 1.58 |
| E, mV | 509 | 508 | 505 | 499 | 492 |
| $Fe^{2+}$ Assay, M | 0.038 | 0.039 | 0.045 | 0.050 | 0.059 |
| Reduction $Fe^{3+}$ to $Fe^{2+}$, % | 19. | 19.5 | 22.5 | 25 | 29.5 |
| SCN Assay, g/L | 0.99 | 1.05 | — | 1.04 | 1.05 |
| Test SCN-18 | | | | | |
| pH | 1.73 | 1.73 | 1.71 | 1.66 | 1.60 |
| E, mV | 494 | 490 | 488 | 482 | 476 |
| $Fe^{2+}$ Assay, M | 0.046 | 0.051 | 0.058 | 0.063 | 0.070 |
| Reduction $Fe^{3+}$ to $Fe^{2+}$, % | 23 | 26 | 29 | 31.5 | 35 |
| SCN Assay, g/L | 2.70 | 1.75 | 2.16 | 2.22 | 2.66 |
| Test SCN-19 | | | | | |
| pH | 1.72 | 1.72 | 1.74 | 1.67 | 1.65 |
| E, mV | 479 | 478 | 475 | 471 | 465 |
| $Fe^{2+}$ Assay, M | 0.056 | 0.062 | 0.066 | 0.071 | 0.080 |
| Reduction $Fe^{3+}$ to $Fe^{2+}$, % | 28 | 31 | 33 | 35.5 | 40 |
| SCN Assay, g/L | 2.85 | 2.41 | 1.64 | 1.70 | 1.43 |
| Test SCN-20 | | | | | |
| pH | 1.94 | 1.94 | 1.88 | 1.83 | 1.74 |
| E, mV | 476 | 490 | 488 | 482 | 476 |
| $Fe^{2+}$ Assay, M | 0.040 | 0.043 | 0.043 | 0.052 | 0.056 |
| Reduction $Fe^{3+}$ to $Fe^{2+}$, % | 40 | 43 | 43 | 52 | 56 |
| SCN Assay, g/L | 2.74 | 2.75 | 2.08 | 1.15 | 2.08 |
| Test SCN-21 | | | | | |
| pH | 1.58 | 1.59 | 1.61 | 1.56 | 1.52 |
| E, mV | 506 | 502 | 500 | 494 | 489 |
| $Fe^{2+}$ Assay, M | 0.049 | 0.058 | 0.061 | 0.067 | 0.078 |
| Reduction $Fe^{3+}$ to $Fe^{2+}$, % | 16.3 | 19.3 | 20.3 | 22.3 | 26 |
| SCN Assay, g/L | 2.64 | 1.79 | 2.66 | 2.67 | 2.39 |

Example 4

Column Leach Following Bio-Oxidation Pretreatment of Refractory Sulfide Ore

A refractory sulfide gold ore from the Lone Tree mine, of a type generally as described in Example 2, is bio-oxidized. Representative assay information for the bio-oxidized ore is shown in Table 12. A portion of the bio-oxidized ore is air dried and crushed to a size of minus 10 mesh (1.68 mm) for gold extraction testing.

TABLE 12

Representative Bio-oxidized Ore Sample Assay

| Au (g/t)[1] | Total Sulfur (Weight %) | Sulfide Sulfur (Weight %) | Fe (Weight %) |
|---|---|---|---|
| 2.13 | 1.67 | 1.43 | 1.82 |

[1]grams per tonne

Gold extraction testing is performed by loading a sample of the bio-oxidized ore into a column having an internal diameter of 2 inches (50.8 mm). A freshly prepared acidic thiocyanate leach solution at about pH 2 is then passed through the bio-oxidized ore sample in the column, simulating a heap leach. A sample of pregnant thiocyanate leach solution is periodically analyzed for gold extraction and other properties. Table 13 summarizes concentrations of thiocyanate and ferric iron and the molar ratio of ferric iron to thiocyanate in the freshly prepared thiocyanate leach solutions for the tests.

TABLE 13

Prepared Thiocyanate Solutions

| Test | [SCN] M | $[F_e^{3+}]$ M | Molar Ratio $[F_e^{3+}]$:[SCN] |
|---|---|---|---|
| SCN-22 | 0.05 | 0.2 | 4 |
| SCN-23 | 0.05 | 0.1 | 2 |
| SCN-24 | 0.02 | 0.2 | 10 |
| SCN-25 | 0.02 | 0.1 | 5 |
| SCN-26 | 0.02 | 0.04 | 2 |
| SCN-27 | 0.01 | 0.1 | 10 |
| SCN-28 | 0.01 | 0.2 | 20 |

Figure 18:
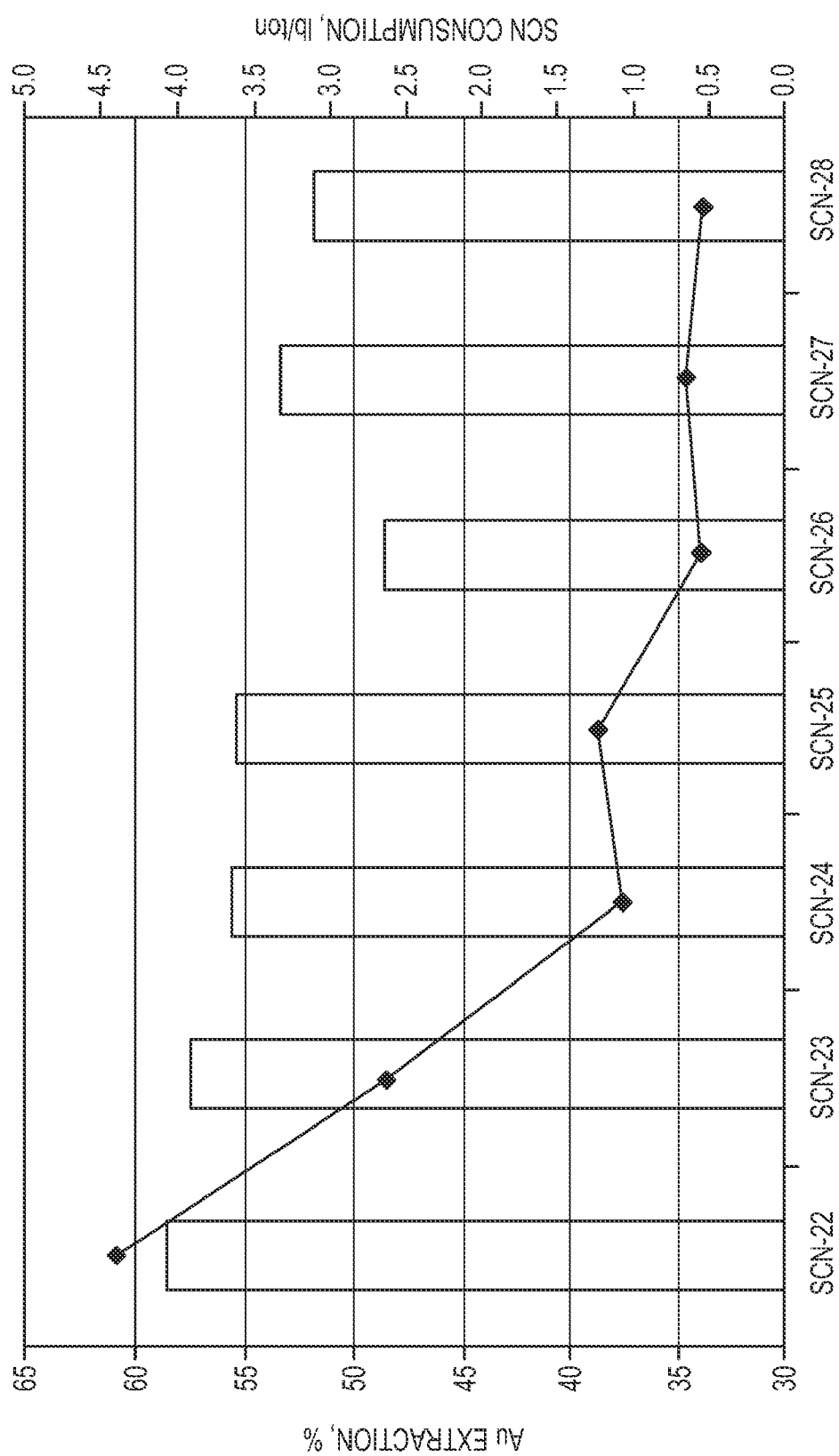
FIG. 18 is a bar plot of gold extraction and a line plot of thiocyanate consumption for thiocyanate leach tests presented in Example 4.

FIG. 18 shows a bar plot of gold extraction into the thiocyanate leach solution for each of the tests and a line plot of thiocyanate consumption (pounds of SCN consumed per short ton of bio-oxidized ore sample tested) for each of the tests.

Example 5

Column Leach Following Bio-Oxidation Pretreatment of Refractory Sulfide Ore

A portion of the bio-oxidized ore of Example 4 is air dried and crushed to a size of minus 32.8 mm for gold extraction testing. After crushing, a 13.6 kg sample of the bio-oxidized ore is loaded into each of three columns. Each column has an inside diameter of 4 inches (101.6 mm). The bio-oxidized ore sample in each column is leached with either a cyanide leach solution or a thiocyanate leach solution to extract gold. For the cyanide leach test, the bio-oxidized ore sample is agglomerated with lime at 6 kg per tonne of ore sample prior to being loaded into the column. The amount of lime addition is determined based on neutralization tests performed on the same bio-oxidized ore. Thiocyanate leach solutions are prepared at a pH of about pH 2 with ferric sulfate and potassium thiocyanate dissolved in deionized water. The cyanide leach solution is prepared at a pH between 10.5 and 11 with 0.25 g/L sodium cyanide. Properties of the prepared leach solutions are summarized in Table 14.

TABLE 14

Prepared Leach Solutions

| Test | [NaCN] g/L | [SCN] M | $[F_e^{3+}]$ M | Ratio $[F_e^{3+}]$:SCN | Solution pH | Solution E[1] |
|---|---|---|---|---|---|---|
| CN-5 | 0.25 | — | — | — | | |
| SCN-29 | — | 0.01 | 0.1 | 10 | 1.98 | 585 |
| SCN-30 | — | 0.02 | 0.1 | 5 | 1.99 | 570 |

[1]millivolts

For each test, leach solution is applied at a rate of about 9.8 L/hr-m² to the top of the bio-oxidized ore samples in the columns from a reservoir of leach solution having an initial volume of 1900 mL. The test continues for 17 days.

For the cyanide leach test, gold is recovered from the pregnant cyanide leach solution by contacting the pregnant solution with a column containing activated carbon granules. Following recovery of the gold, additional sodium cyanide is added to the barren cyanide leach solution to obtain 0.25 g/L sodium cyanide concentration and the barren cyanide leach solution is then recycled to the column for additional leaching.

For the thiocyanate leach tests, on each of days 1 through 10 and on days 13 and 16, the pregnant leach solution is removed and analyzed, and a fresh 1900 mL batch of leach solution is provided. On day 17, the pregnant leach solution is removed and analyzed. Also on day 17, the column is rinsed with a rinse solution of acidified deionized water (acidified to pH 2 with sulfuric acid) and the rinse solution is analyzed for gold content.

Figure 19:
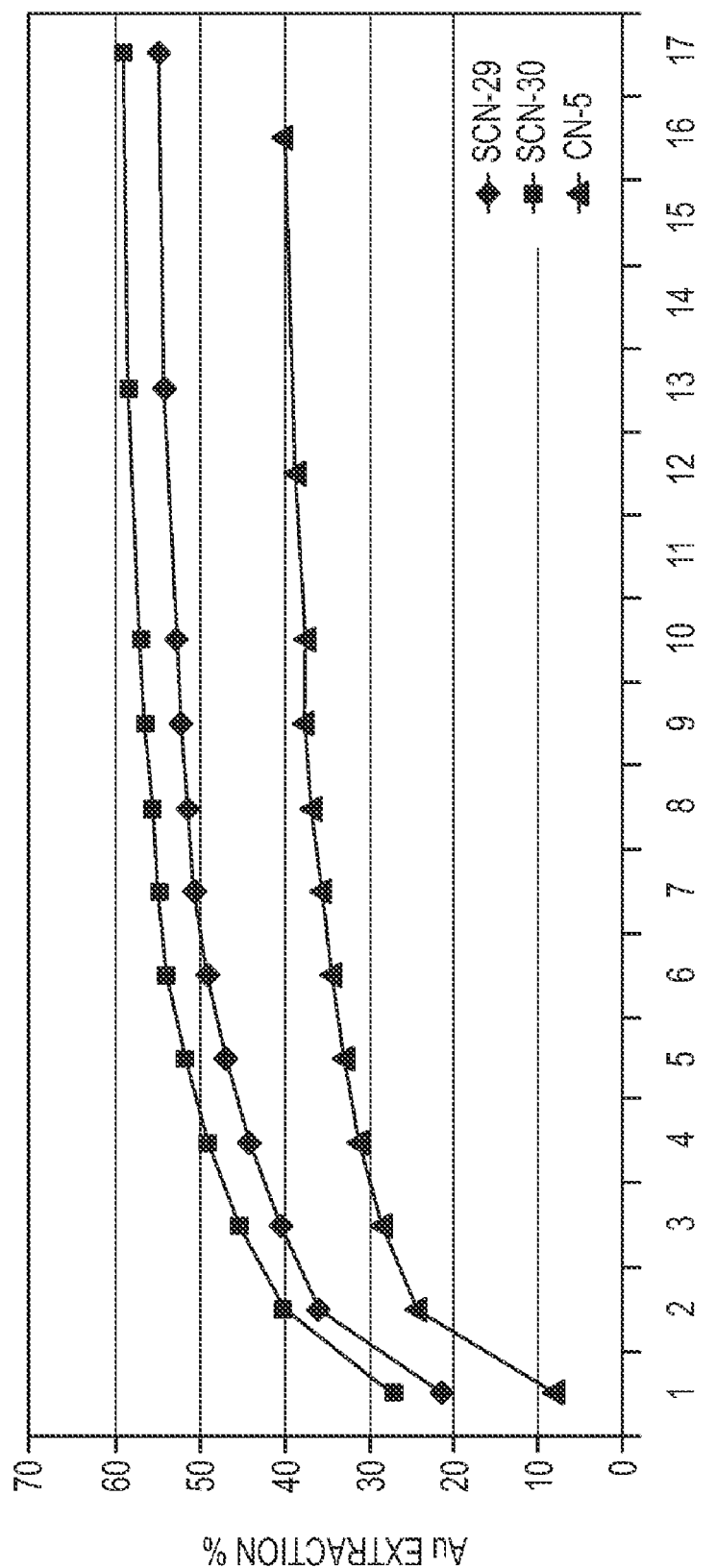
FIG. 19 is a plot of gold extraction vs leach duration for thiocyanate and cyanide leach tests presented in Example 5.
Figure 20:
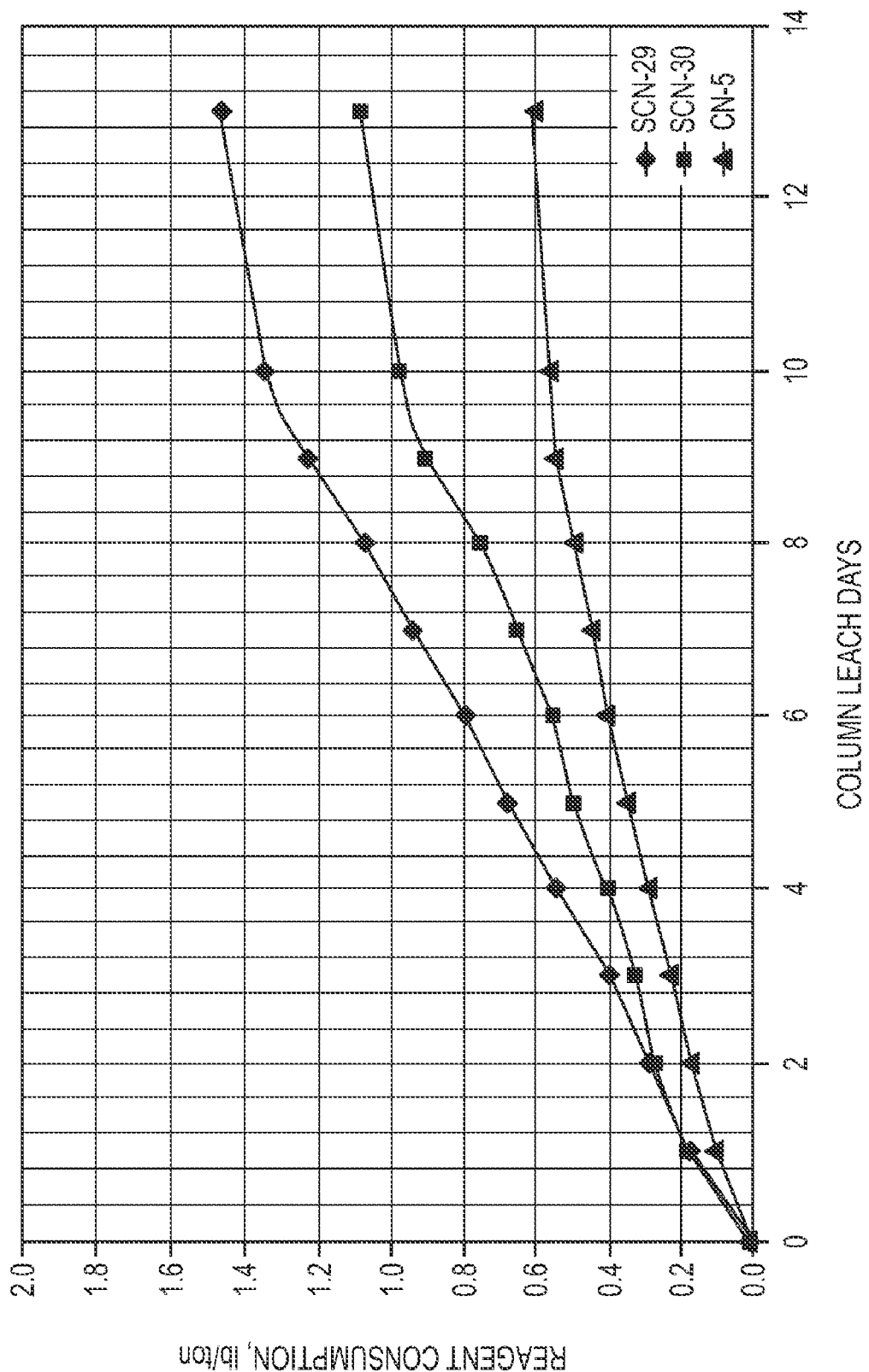
FIG. 20 is a plot of thiocyanate or cyanide reagent consumption vs leach duration for thiocyanate and cyanide leach tests presented in Example 5.

FIG. 19 shows a plot of gold extraction into the leach solution vs. time for each of tests CN-5, SCN-29 and SCN-30 through 13 days of leaching. FIG. 20 shows a plot of potassium thiocyanate consumption or sodium cyanide consumption (pounds of potassium thiocyanate or sodium cyanide consumed per short ton of bio-oxidized ore sample treated) vs. time for each of tests CN-5, SCN-29 and SCN-30. Tables 15 and 16 summarize results for tests SCN-29 and SCN-30.

Example 6

Solvent Extraction Removal of Gold from Thiocyanate Solution

Acidic synthetic thiocyanate solutions are prepared by dissolving potassium thiocyanate, ferric sulfate and gold in deionized water. Properties of the prepared thiocyanate solutions are summarized in Table 17. Two different organic liquid phases are prepared including Armeen™312 (Akzo Nobel) extractant. Armeen™312 is a tertiary amine (trilaurylamine) extractant. The first organic phase (O-1) is a solution of 0.05 M Armeen™312 in kerosene. The second organic phase (O-2) is a mixture of 0.9 part by volume of O-1 with 0.1 part by volume decanol (0.045 M Armeen™312).

TABLE 15

Test SCN-29 Results

| Elapsed Time (days) | Solution/Ore Ratio (Cumulative) | Pregnant Leach Solution | | | | | % Cumulative Au Extraction From Solution Assay Based on Head Analysis |
|---|---|---|---|---|---|---|---|
| | | [Au] (ppm) | [SCN] (ppm) | [Fe$^{2+}$] | pH | EhE[1] (mV) | |
| 1 | 0.126 | 3.55 | 435.0 | 3228.1 | 1.32 | 489 | 21.28 |
| 2 | 0.259 | 2.37 | 536.5 | 1105.8 | 1.63 | 510 | 36.37 |
| 3 | 0.402 | 0.61 | 507.5 | 826.6 | 1.67 | 515 | 40.52 |
| 4 | 0.537 | 0.55 | 478.5 | 837.8 | 1.61 | 517 | 44.06 |
| 5 | 0.676 | 0.45 | 464.0 | 893.6 | 1.59 | 524 | 47.04 |
| 6 | 0.824 | 0.33 | 493.0 | 826.6 | 1.59 | 521 | 49.37 |
| 7 | 0.955 | 0.17 | 464.0 | 804.2 | 1.60 | 518 | 50.44 |
| 8 | 1.094 | 0.17 | 478.5 | 837.8 | 1.47 | 512 | 51.57 |
| 9 | 1.215 | 0.16 | 493.0 | 781.9 | 1.39 | 507 | 52.48 |
| 10 | 1.355 | 0.10 | 522.0 | 776.3 | 1.52 | 505 | 53.15 |
| 13 | 1.493 | 0.14 | 522.0 | 1212.0 | 1.37 | 488 | 54.06 |
| 16 | 1.633 | 0.10 | 512.3 | 1340.0 | 1.39 | 482 | 54.73 |
| 17 | 1.769 | 0.01 | 145.0 | 533.0 | 1.55 | 473 | 54.79 |

[1]millivolts

TABLE 16

Test SCN-30 Results

| Elapsed Time (days) | Solution/Ore Ratio (Cumulative) | Pregnant Leach Solution | | | | | % Cumulative Au Extraction From Solution Assay Based on Head Analysis |
|---|---|---|---|---|---|---|---|
| | | [Au] (ppm) | [SCN] (ppm) | [Fe$^{2+}$] | pH | EhE[1] (mV) | |
| 1 | 0.125 | 4.54 | 884.5 | 3083 | 1.32 | 487 | 27.10 |
| 2 | 0.263 | 1.99 | 1000.5 | 1162 | 1.61 | 501 | 40.23 |
| 3 | 0.397 | 0.81 | 1131.0 | 983 | 1.61 | 505 | 45.39 |
| 4 | 0.525 | 0.63 | 1102.0 | 1184 | 1.57 | 507 | 49.23 |
| 5 | 0.664 | 0.41 | 1000.5 | 1016 | 1.59 | 515 | 51.95 |
| 6 | 0.811 | 0.31 | 1000.5 | 961 | 1.51 | 511 | 54.12 |
| 7 | 0.945 | 0.14 | 1015.0 | 916 | 1.54 | 509 | 55.01 |
| 8 | 1.084 | 0.11 | 971.5 | 949 | 1.53 | 506 | 55.75 |
| 9 | 1.205 | 0.16 | 1000.5 | 983 | 1.38 | 501 | 56.65 |
| 10 | 1.346 | 0.10 | 1024.9 | 894 | 1.52 | 498 | 57.32 |
| 13 | 1.484 | 0.15 | 976.3 | 1251 | 1.37 | 482 | 58.31 |
| 16 | 1.625 | 0.11 | 995.7 | 1447 | 1.39 | 476 | 59.05 |
| 17 | 1.761 | | 138.0 | 503 | 1.54 | 470 | 59.05 |

[1]millivolts

TABLE 17

Prepared Thiocyanate Solutions

| Pregnant Thiocyanate Solution | [Au] ppm | [SCN] ppm | [Fe][1] ppm | pH | E[2] mV |
|---|---|---|---|---|---|
| A-1 | 36.5 | 957 | 4488 | 1.72 | 530 |
| A-2 | 10.2 | 996 | 5074 | 1.74 | 549 |
| A-3 | 4.79 | 1121 | 5105 | 1.76 | 556 |
| A-4 | 1.95 | 1083 | 5058 | 1.75 | 556 |

[1]total dissolved iron
[2]millivolts

For each test, approximately 250 mL of pregnant aqueous thiocyanate solution is placed in a separatory funnel along with the organic phase at a volumetric ratio of organic phase to aqueous phase of either 1:1 or 1:2. The separatory funnel is shaken on a mechanical wrist shaker for approximately 10 minutes. The organic and aqueous phases are allowed to separate, and the aqueous raffinate and loaded organic phases are then removed from the separatory funnel for analysis. Results are summarized in Table 18. As seen in Table 18, gold recovery from the aqueous phase into the organic phase is high for all tests. Also, separation of the aqueous and organic phases following the solvent extraction is excellent for all tests.

Example 7

Solvent Extraction Removal of Gold from Thiocyanate Solution

Concentrated solutions of different amine extractants are obtained and organic liquid phases including the different extractants are prepared by diluting 0.2 part by volume of the concentrated solution as received with 0.8 part by volume of xylene. An aqueous pregnant thiocyanate solution is prepared by column leaching a sample of refractory sulfide gold ore that has been pretreated by bio-oxidation. The pregnant thiocyanate leach solution from the column leach contains 2.06 ppm dissolved gold, 899 ppm dissolved thiocyanate, and 6450 ppm total dissolved iron (with 290.4 ppm of the dissolved iron being ferrous iron), a pH of 1.5 and an E of 489 mV. The extractants tested are Alamine™336 (tertiary amine, tri-$C_8$-$C_{10}$-alkylamine, from Cognis), Amberlite™LA-2 (secondary amine, lauryl-tert-alkylamine, from Cognis), Armeen™ (primary amine, dodecylamine, from Akzo Nobel), and Armeen™312 (tertiary amine, trilaurylamine, from Akzo Nobel).

For each test, approximately 250 mL of pregnant aqueous thiocyanate leach solution is placed in a separatory funnel along with an approximately equal volume of the organic phase (0:A ratio=1:1). The separatory funnel is shaken on a mechanical wrist shaker for approximately 10 minutes. The organic and aqueous phases are allowed to separate, and the aqueous raffinate and loaded organic phases are removed from the separatory funnel for analysis. Results are summarized in Table 19. The best phase separation is obtained for test SX-21, but phase separation is good for all tests.

TABLE 18

Solvent Extraction Test Results

| Test | Aqueous Solution | Organic Phase | O:A[1] Ratio | Aqueous Raffinate [Au] ppm | [Fe] ppm | [SCN] ppm | pH | Gold Recovery % | Gold Loading in Organic ppm |
|---|---|---|---|---|---|---|---|---|---|
| SX-1 | A-1 | O-1 | 1:1 | 0.04 | 4829 | 116 | 1.84 | 99.89 | 36.46 |
| SX-2 | A-2 | O-1 | 1:1 | 0.01 | 4993 | 136 | 1.85 | 99.90 | 10.19 |
| SX-3 | A-3 | O-1 | 1:1 | 0.02 | 4927 | 97 | 1.87 | 99.58 | 4.77 |
| SX-4 | A-4 | O-1 | 1:1 | 0 | 5174 | 77 | 1.88 | 100.00 | 1.95 |
| SX-5 | A-1 | O-1 | 1:2 | 0.11 | 4679 | 213 | 1.83 | 99.70 | 73.88 |
| SX-6 | A-2 | O-1 | 1:2 | 0.04 | 4777 | 213 | 1.83 | 99.61 | 20.23 |
| SX-7 | A-3 | O-1 | 1:2 | 0.05 | 4916 | 174 | 1.82 | 98.96 | 9.62 |
| SX-8 | A-4 | O-1 | 1:2 | 0.01 | 5064 | 213 | 1.82 | 99.49 | 3.94 |
| SX-9 | A-1 | O-2 | 1:1 | 0.05 | 4679 | 174 | 1.93 | 99.86 | 36.45 |
| SX-10 | A-2 | O-2 | 1:1 | 0.02 | 4777 | 193 | 1.95 | 99.80 | 10.18 |
| SX-11 | A-3 | O-2 | 1:1 | 0.01 | 4916 | 174 | 1.95 | 99.79 | 4.78 |
| SX-12 | A-4 | O-2 | 1:1 | 0.03 | 5064 | 174 | 1.95 | 98.46 | 1.92 |
| SX-13 | A-1 | O-2 | 1:2 | 0.18 | 4490 | 348 | 1.78 | 99.51 | 73.74 |
| SX-14 | A-2 | O-2 | 1:2 | 0.05 | 4430 | 348 | 1.81 | 99.51 | 20.61 |
| SX-15 | A-3 | O-2 | 1:2 | 0.06 | 4797 | 387 | 1.83 | 98.75 | 9.60 |
| SX-16 | A-4 | O-2 | 1:2 | 0.01 | 4622 | 715 | 1.82 | 99.49 | 3.94 |

[1]volume ratio of organic phase (organic extractant liquid) to aqueous phase (pregnant thiocyanate solution)

TABLE 19

Solvent Extraction Test Results

| Test | Organic Phase Extractant | PH | [Au] ppm | [Fe][1] ppm | Gold Recovery % |
|---|---|---|---|---|---|
| SX-17 | Alamine 308 | 1.64 | 0.04 | 4384 | 98.06 |
| SX-18 | Alamine 336 | 1.49 | 0.02 | 5046 | 99.03 |
| SX-19 | Amberlite LA-2 | 1.48 | 0 | 2994 | 100.00 |
| SX-20 | Armeen | 1.05 | 0.25 | 5250 | 87.86 |
| SX-21 | Armeen 312 | 1.04 | 0.01 | 6279 | 99.51 |

[1]total iron

Example 8

Solvent Extraction Removal of Gold From Pregnant Thiocyanate Solution

A synthetic aqueous thiocyanate solution is prepared in deionized water containing 2.21 ppm dissolved gold, 905 ppm (0.15 M) dissolved thiocyanate, and 6470 ppm (0.11 M) total dissolved iron, and having a pH of 1.84 and an E of 493.3 mV. Tributylphosphate ("TBP") is used as the organic extractant phase at various volumetric ratios of TBP to the pregnant thiocyanate solution. For each test a total volume of the combined TBP and pregnant thiocyanate solution of about 500 mL is placed in a separatory funnel and shaken on a mechanical wrist shaker for 10 minutes, after which the organic and aqueous phases are allowed to separate. The organic and aqueous phases are removed from the separatory funnel for analysis. Results are summarized in Table 20, including gold recovery into the organic phase from the aqueous phase. Phase separation is good for all tests.

TABLE 20

Solvent Extraction Test Results

| | | Aqueous Raffinate | | |
|---|---|---|---|---|
| Test | O:A Ratio[1] | Au (ppm) | Ferric Iron (ppm) | Gold Recovery % |
| SX-22 | 1:1 | 0 | 6210 | 100.00 |
| SX-23 | 1:2 | 0 | 6800 | 100.00 |
| SX-24 | 1:5 | 0 | 6030 | 100.00 |
| SX-25 | 1:10 | 0 | 6290 | 100.00 |
| SX-26 | 1:20 | 0.60 | 6040 | 98.64% |

[1]Volume ratio of organic phase (TBP) to aqueous phase (pregnant thiocyanate solution)

Example 9

Ion Exchange Removal of Gold from Thiocyanate Solution

A sample of Purolite™600, (Purolite Company), a gel-type, strong anionic ion exchange resin is obtained and divided into two portions. Water is removed from one portion by vacuum filtration and the dry weight of the resin is determined to provide information concerning the moisture content of the wet resin. The wet resin contains about 65.72 weight percent resin and about 34.28 weight percent water. For each test, 480 mL of a pregnant thiocyanate solution is added to a 1 L flask along with 1 g of the Purolite™ 600 resin (containing about 0.6572 g ion exchange resin), and the contents of the flask are mixed by a magnetic stirrer. Thiocyanate leach solution samples of 20 mL each are removed from the flask at the end of 1 hour, 3 hours and 7 hours and analyzed. Tests are performed using different levels of gold loading in the pregnant thiocyanate solutions containing either approximately 0.02 M thiocyanate or approximately 0.05 M thiocyanate. Gold loading on the resin (based on dry resin weight) is determined at the end of 7 hours.

Figure 21:
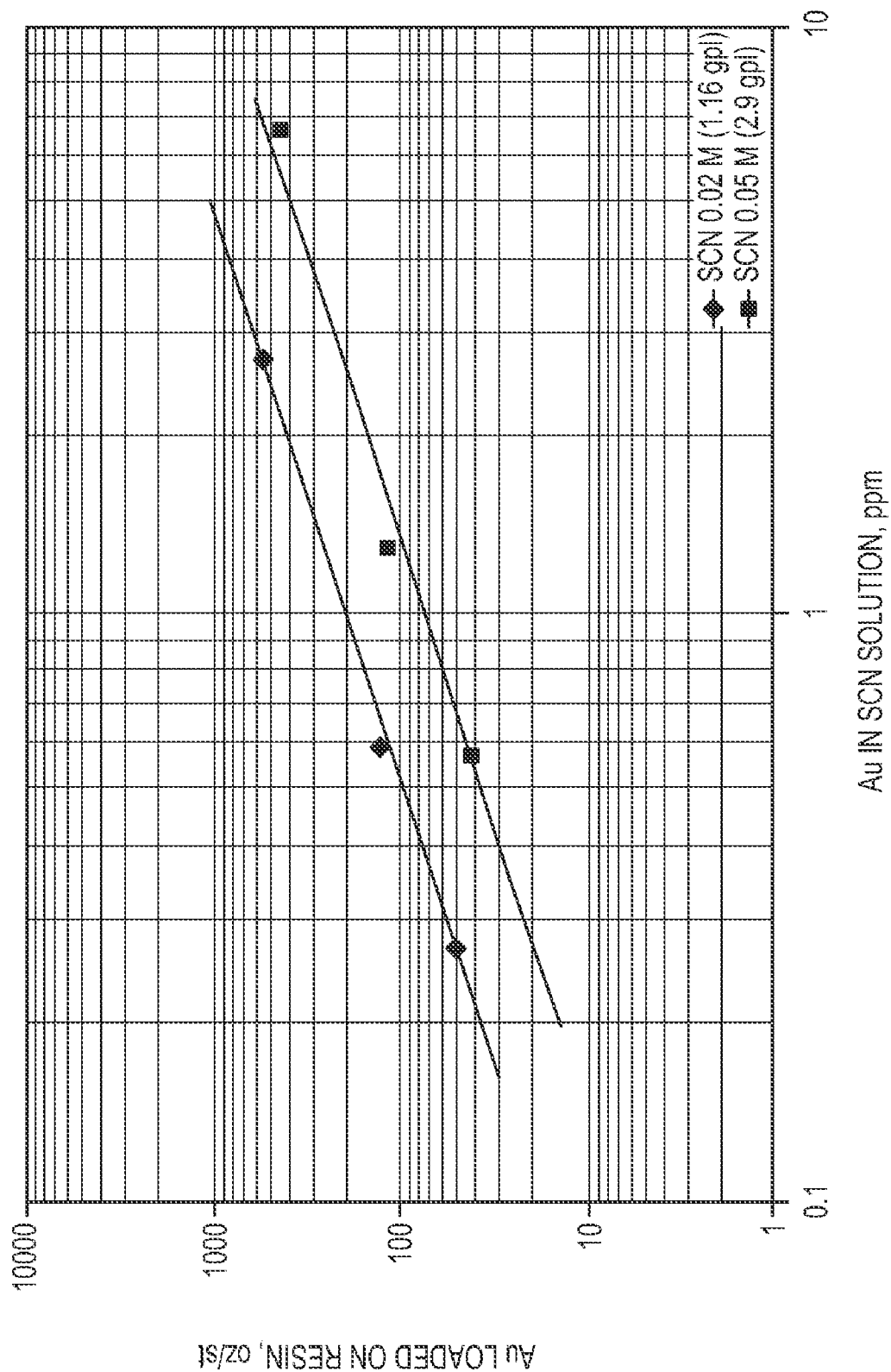
FIG. 21 is a plot of gold loading on ion exchange resin vs gold concentration in pregnant thiocyanate solutions for ion exchange recovery tests presented in Example 9.
Figure 22:
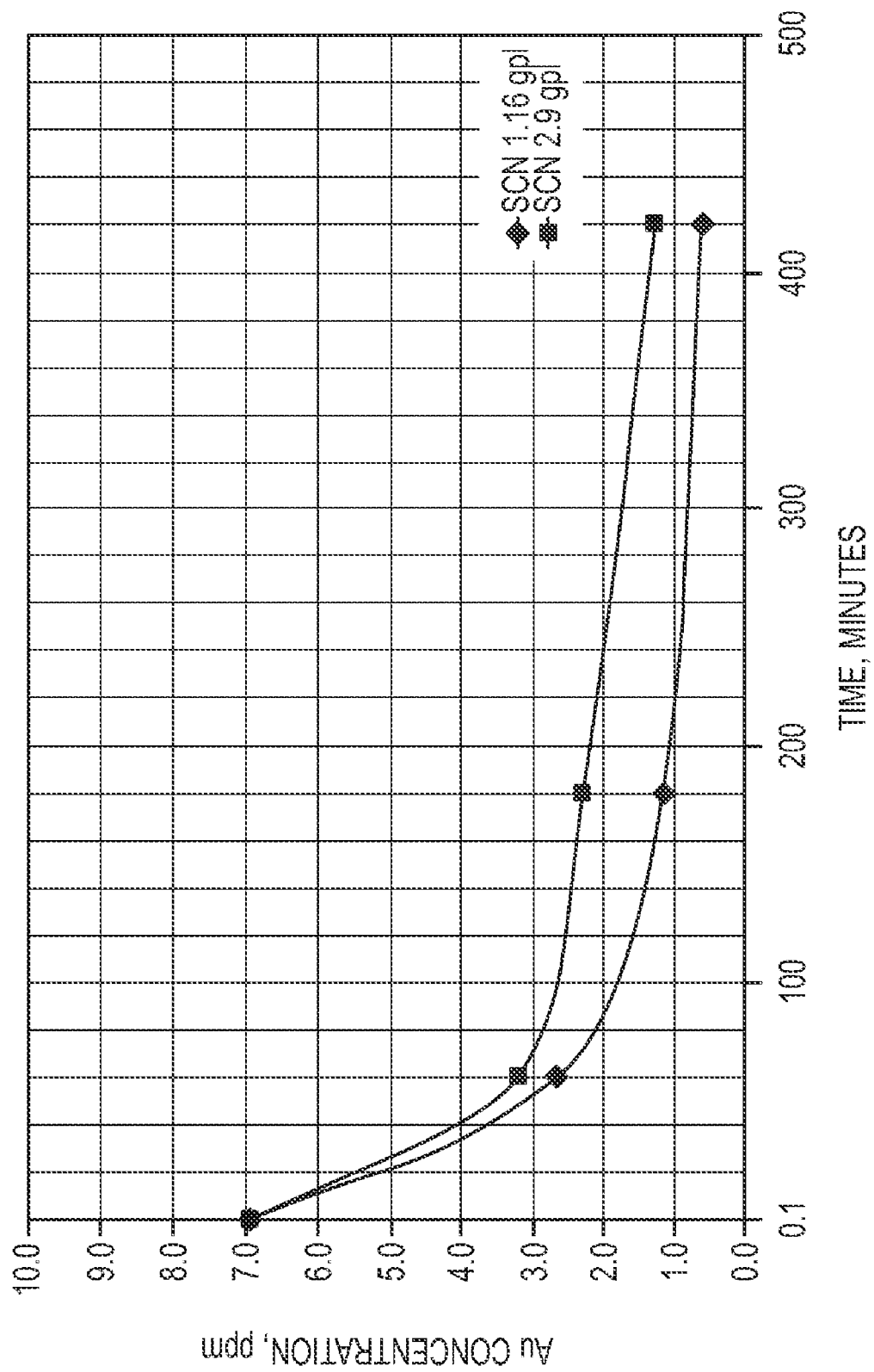
FIG. 22 is a plot of gold concentration in thiocyanate solutions vs time during ion exchange precious metal recovery tests presented in Example 9.
Figure 23:
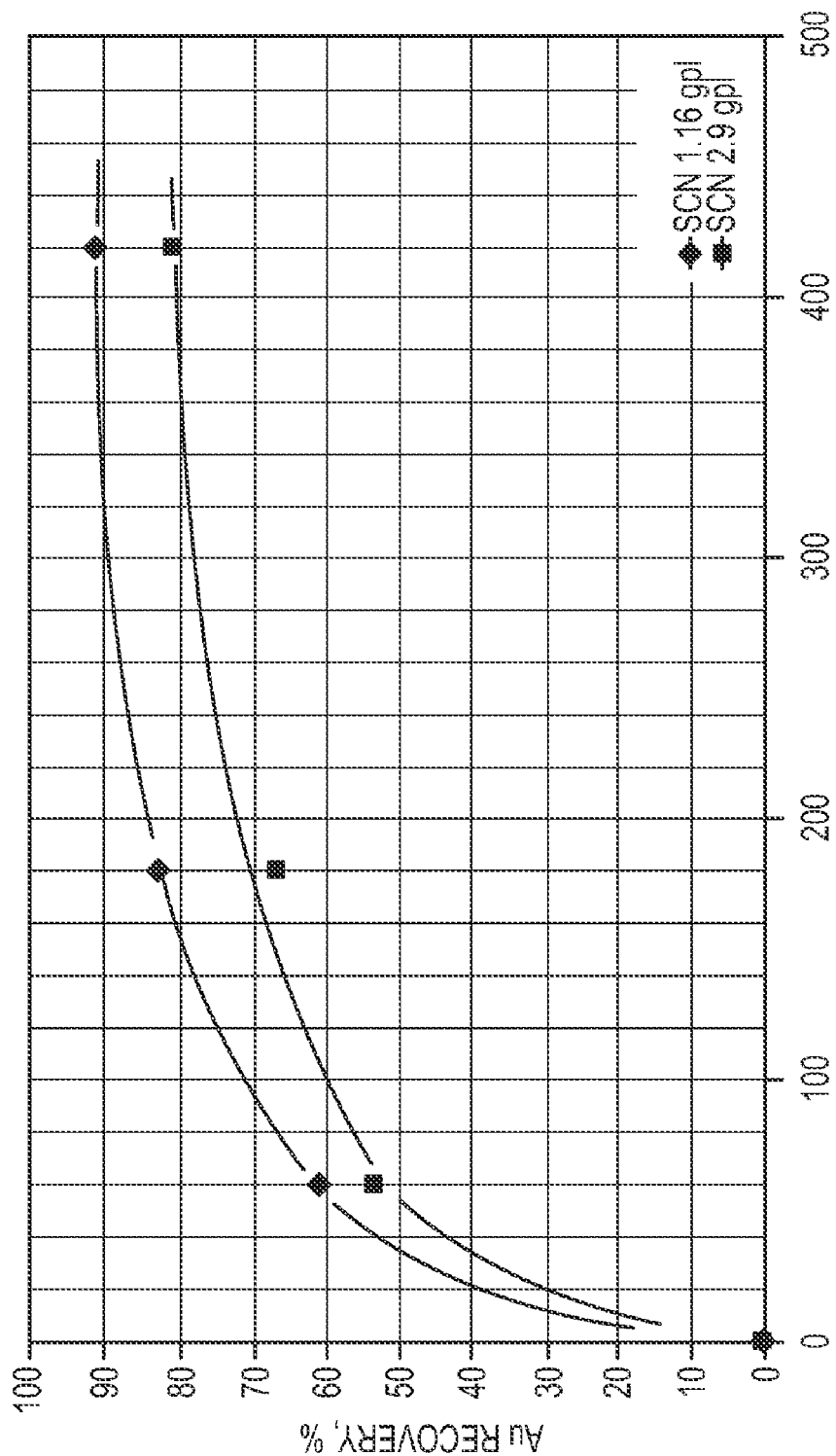
FIG. 23 is a plot of gold recovery from pregnant thiocyanate solutions vs time during ion exchange precious metal recovery tests presented in Example 9.

Test results are summarized in Table 21. FIG. 21 shows plots of gold loading on the resin (dry resin basis) relative to gold concentration in the thiocyanate solutions following adsorption of the gold by the resin. A separate plot is shown in FIG. 21 for those tests using about 0.02 M thiocyanate and those tests using about 0.05 M thiocyanate. FIG. 22 shows plots of the concentration of gold in the thiocyanate solution relative to time for test IX-2 (0.02 M thiocyanate) and test IX-5 (0.05 M thiocyanate). FIG. 23 shows plots of gold recovery from the thiocyanate solution relative to time for tests IX-2 (0.02 M thiocyanate) and IX-5 (0.05 M thiocyanate). As seen in Table 20 and FIGS. 21-23, ion exchange resin performance is better with lower concentrations of thiocyanate in the pregnant thiocyanate solution.

TABLE 21

Ion Exchange Test Results

| | Test | | | | | |
|---|---|---|---|---|---|---|
| Time/Properties | IX-1 | IX-2 | IX-3 | IX-4 | IX-5 | IX-6 |
| Time = 0 (Initial Solution) | | | | | | |
| [Au], ppm | 2.695 | 6.808 | 28.300 | 2.569 | 6.938 | 27.450 |
| [Fe], ppm[1] | 4602 | 4633 | 4524 | 4630 | 4607 | 4540 |
| [SCN], ppm | 1126.3 | 1140.2 | 1069.7 | 2664.5 | 2843.4 | 2692.1 |
| pH | 1.84 | 1.84 | 1.84 | 1.93 | 1.93 | 1.90 |
| Time = 1 hr | | | | | | |
| [Au], ppm | 1.108 | 2.638 | 10.746 | 1.319 | 3.214 | 10.894 |
| [Fe], ppm[1] | 4342 | 4462 | 4673 | 4450 | 4474 | 4872 |
| [SCN], ppm | 905.2 | 905.9 | 917.8 | 2528.9 | 2605.3 | 2408.7 |
| pH | 1.93 | 1.93 | 1.90 | 1.98 | 1.99 | 1.90 |

TABLE 21-continued

Ion Exchange Test Results

| | Test | | | | | |
|---|---|---|---|---|---|---|
| Time/Properties | IX-1 | IX-2 | IX-3 | IX-4 | IX-5 | IX-6 |
| Time = 3 hr | | | | | | |
| [Au], ppm | 0.542 | 1.137 | 4.238 | 0.934 | 2.282 | 7.955 |
| [Fe], ppm[1] | 4553 | 4871 | 4631 | 4790 | 4477 | 4299 |
| [SCN], ppm | 859.7 | 862.6 | 588.2 | 2394.4 | 2583.2 | 2376.7 |
| pH | 1.94 | 1.94 | 1.91 | 2.03 | 2.01 | 1.99 |
| Time = 7 hr | | | | | | |
| [Au], ppm | 0.267 | 0.591 | 2.691 | 0.567 | 1.282 | 6.663 |
| [Fe], ppm[1] | 4342 | 4340 | 4331 | 4291 | 4017 | 4295 |
| [SCN], ppm | 860.3 | 789.9 | 849 | 2431.7 | 2422.7 | 2531.1 |
| pH | 1.93 | 1.92 | 1.89 | 2.01 | 1.98 | 1.95 |
| Resin loading[2] | 1773.34 | 4540.72 | 18,704.08 | 1462.20 | 4129.52 | 15,182.23 |

[1]total iron
[2]mg gold per kg resin (dry basis)

Example 10

Cyanide/Carbon Removal of Gold from Thiocyanate Solution

Four different aqueous thiocyanate solutions are prepared in deionized water. For each test, approximately 250 mL of prepared thiocyanate solution is placed in a 500 mL flask along with activated carbon granules at a concentration of about 20 grams of the activated carbon granules per liter of pregnant thiocyanate solution. Sodium cyanide (NaCN) is added to the flask in sufficient quantity to provide a molar ratio of sodium cyanide to gold of 10. The contents of the flask are agitated on a mechanical shaker for 2 hours, and then the contents of the flask are removed and analyzed.

Properties of the prepared thiocyanate solution for each test and the results of each test are summarized in Table 22. Gold recovery from the thiocyanate solution is good for all tests, but is somewhat better from the thiocyanate solutions prepared with lower concentrations of thiocyanate.

Example 11

Cyanide/Activated Carbon Removal of Gold from Thiocyanate Solution

A thiocyanate solution is prepared in deionized water containing 5.25 ppm gold, 0.02 M thiocyanate, 0.1 M ferric iron and 0.0016 M ferrous iron and having a pH of 1.67 and an E of 560 mV. For each test, approximately 250 mL of the prepared thiocyanate solution is placed in a 500 mL beaker along with activated carbon granules at a concentration of 20 grams of the activated carbon granules per liter of the pregnant thiocyanate solution. Sodium cyanide (NaCN) is added to the flask in sufficient quantity to provide a molar ratio of sodium cyanide to gold of 10. The contents of the flask are agitated on a mechanical shaker for a different length of time for each test. Following the agitation, the thiocyanate solution is analyzed to evaluate the kinetics of gold recovery and reduction of ferric iron to ferrous iron.

Results are summarized in Table 23. As seen in Table 23, gold recovery kinetics are fast, and reduction of ferric iron to ferrous iron is not excessive.

TABLE 22

Cyanide/Carbon Adsorption Tests

| | Initial Prepared Thiocyanate Solution | | | | | Final Thiocyanate Solution | | | NaCN | |
|---|---|---|---|---|---|---|---|---|---|---|
| Test | [Au] ppm | [SCN] M | [Fe$^{3+}$] M | PH | E mV | [Au] ppm | PH | E mV | Addition ppm | Au Recovery % |
| C-1 | 5.09 | 0.02 | 0.1 | 1.8 | 587 | 0.13 | 1.61 | 471 | 12.7 | 97.45 |
| C-2 | 5.09 | 0.05 | 0.1 | 1.8 | 587 | 0.14 | 1.65 | 455 | 12.7 | 97.25 |
| C-3 | 2.01 | 0.02 | 0.1 | 1.8 | 587 | 0.06 | 1.56 | 469 | 4.7 | 97.01 |
| C-4 | 2.01 | 0.05 | 0.1 | 1.8 | 587 | 0.07 | 1.62 | 454 | 4.7 | 96.52 |

TABLE 23

Cyanide/Carbon Adsorption Tests

| Test | Elapsed Time Hours | Final Thiocyanate Solution | | | | Ferric Iron Reduction % | Au Recovery % |
|---|---|---|---|---|---|---|---|
| | | Au ppm | $Fe^{2+}$ M | pH | E mV | | |
| C-5 | 0.5 | 1.41 | 0.010 | 1.62 | 492 | 9.60 | 73.14 |
| C-6 | 1 | 0.30 | 0.006 | 1.51 | 428 | 6.40 | 94.29 |
| C-7 | 2 | 0.05 | 0.006 | 1.40 | 480 | 6.40 | 99.05 |
| C-8 | 4 | 0.06 | 0.008 | 1.26 | 461 | 8.40 | 98.86 |

Example 12

Cyanide/Activated Carbon Removal of Gold from Thiocyanate Solution

Tests are performed as described in Example 11, except that different molar ratios of sodium cyanide to gold are used and each test is run for two hours, after which the contents of the flask are analyzed. Results are summarized in Table 24. Gold recovery is good even using a lower mole ratio of cyanide to gold.

TABLE 24

Cyanide/Carbon Adsorption Tests

| Test | Mole Ratio [NaCN]:[Au] | Final Thiocyanate Solution | | | | Ferric Iron Reduction % | Au Recovery % |
|---|---|---|---|---|---|---|---|
| | | [Au]ppm | $[Fe^{2+}]$ M | PH | E mV | | |
| C-9 | 5:1 | 0.07 | 0.008 | 1.37 | 479 | 8.01 | 98.67 |
| C-10 | 10:1 | 0.05 | 0.006 | 1.40 | 480 | 6.41 | 99.05 |
| C-11 | 20:1 | 0.09 | 0.009 | 1.37 | 479 | 8.81 | 98.29 |

Example 13

Cyanide/Activated Carbon Removal of Gold from Thiocyanate Solution

Tests are performed as described in Example 11, except that different concentrations of activated carbon granules are used and each test is run for two hours, after which the contents of the flask are analyzed. Results are summarized in Table 25.

TABLE 25

Cyanide/Carbon Adsorption Tests

| Test | Activated Carbon g/L | Final Thiocyanate Solution | | | | Ferric Iron Reduction % | Au Recovery % |
|---|---|---|---|---|---|---|---|
| | | [Au]ppm | $[Fe^{2+}]$ M | PH | E mV | | |
| C-12 | 5 | 0.08 | 0.006 | 1.39 | 501 | 6.41 | 98.48 |
| C-13 | 10 | 0.05 | 0.008 | 1.37 | 489 | 7.61 | 99.05 |
| C-14 | 20 | 0.05 | 0.006 | 1.40 | 480 | 6.41 | 99.05 |

(1) grams activated carbon granules per liter of prepared thiocyanate solution

Example 14

Oxidation of Ferrous Iron to Ferric Iron in Thiocyanate Solution

A thiocyanate solution is prepared by dissolving ferrous sulfate ($FeSO_4$) and potassium thiocyanate in deionized water and adding sulfuric acid to adjust the pH to approximately pH 2. The thiocyanate solution contains 0.67 gram per liter (0.0120 M) dissolved ferrous iron and 1.96 grams per liter (0.0337 M) dissolved thiocyanate. For each test, 200 mL of thiocyanate solution is placed in a 500 mL flask and potassium persulfate ($K_2S_2O_8$) is then added to the flask. The mixture in the flask is agitated on a vibrating shaker for 10 minutes, and a 20 mL sample of solution is then collected from the flask and analyzed. The remaining solution is allowed to sit in the flask for about 47 hours and 50 minutes (total time 48 hours including time shaking) and is then analyzed. Results are summarized in Table 26.

TABLE 26

Oxidation of Ferrous Iron in Thiosulfate Solution

| Test | K$_2$S$_2$O$_8$ Addition | | 10 minutes | | | 48 Hours | | | Oxidation of Fe$^{2+}$ to Fe$^{3+}$ % | |
|---|---|---|---|---|---|---|---|---|---|---|
| | g | MR$^{(1)}$ | [Fe$^{2+}$] g/L | [SCN] g/L | E mV | [Fe$^{2+}$] g/L | SCN g/L | E mV | 10 mins | 48 hrs |
| OX-1 | 0.024 | 0.037 | 0.58 | 1.96 | 388 | 0.58 | 1.96 | 375 | 13.4 | 13.4 |
| OX-2 | 0.048 | 0.074 | 0.52 | 1.96 | 410 | 0.53 | 1.95 | 405 | 22.4 | 20.9 |
| OX-3 | 0.072 | 0.11 | 0.48 | 1.96 | 426 | 0.47 | 1.96 | 423 | 28.4 | 29.8 |
| OX-4 | 0.096 | 0.15 | 0.43 | 1.96 | 437 | 0.43 | 1.97 | 435 | 35.8 | 35.8 |
| OX-5 | 0.192 | 0.30 | 0.26 | 1.96 | 466 | 0.27 | 1.90 | 466 | 61.2 | 59.7 |
| OX-6 | 0.363 | 0.56 | 0.19 | 1.94 | 487 | ..20 | 1.95 | 482 | 71.6 | 70.1 |
| OX-7 | 0.484 | 0.75 | 0.08 | 1.84 | 512 | 0.19 | 1.91 | 503 | 88.1 | 85.1 |
| OX-8 | 0.968 | 1.49 | 0.01 | 1.64 | 541 | 0.04 | 1.55 | 522 | 98.5 | 94.0 |

$^{(1)}$MR = molar ratio of K$_2$S$_2$O$_8$ to Fe$^{2+}$

The foregoing discussion of the invention has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible implementations and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described or claimed with respect to any disclosed implementation may be combined in any combination with one or more of any other features of any other implementation or implementations, to the extent that the features are necessarily not technically compatible, and all such combinations are within the scope of the present invention.

The terms "comprise", "include", "have" and "contain", and variations of those terms, as may be used in relation to the presence of a feature, are intended to indicate only that a particular feature is present, and are not intended to limit the presence of other features. The phrase "at least a portion" of a method means some or all of the material, and preferably a majority of the material.

What is claimed is:

1. A method for removing copper and precious metal from a mineral material feed comprising copper and comprising precious metal locked in one or more sulfide mineral, the method comprising:
pressure oxidizing the mineral material feed in particulate form slurried in an aqueous liquid to decompose at least a portion of the sulfide mineral, the pressure oxidizing comprising dissolving at least a majority of the copper of the mineral material feed into the aqueous liquid;
recovering from the pressure oxidizing solid residue and acidic liquid effluent, the solid residue comprising at least a portion of the precious metal from the mineral material feed, the liquid effluent comprising in solution at least a majority of the copper of the mineral material feed;
thiocyanate leaching at least a portion of the solid residue with an acidic thiocyanate leach solution to dissolve into the thiocyanate leach solution in the form of precious metal-hiocyanate complex at least a portion of the precious metal from the solid residue; and
separating from the liquid effluent and recovering in a purified copper-containing product at least a majority of the copper dissolved in the liquid effluent;
wherein feed of the thiocyanate leach solution to the thiocyanate leaching comprises dissolved ferric iron and a molar ratio of the dissolved ferric iron to the dissolved thiocyanate of at least 2.

2. The method of claim 1, wherein the feed of the thiocyanate leach solution has a pH in a range of from pH 1 to pH 3 and the feed of the thiocyanate leach solution comprises from 0.0001 to 0.05 mole per liter of the dissolved thiocyanate and at least 0.05 mole per liter of the dissolved ferric iron.

3. The method of claim 2, wherein the ratio of the dissolved ferric iron to the dissolved thiocyanate is at least 7.

4. The method of claim 2, wherein the feed of the thiocyanate leach solution comprises not more that 0.03 mole per liter of the dissolved thiocyanate.

5. A method for removing copper and precious metal from a mineral material feed comprising copper and comprising precious metal locked in one or more sulfide mineral, the method comprising:
pressure oxidizing the mineral material feed in particulate form slurried in an aqueous liquid to decompose at least a portion of the sulfide mineral, the pressure oxidizing comprising dissolving at least a majority of the copper of the mineral material feed into the aqueous liquid;
recovering from the pressure oxidizing solid residue and acidic liquid effluent, the solid residue comprising at least a portion of the precious metal from the mineral material feed, the liquid effluent comprising in solution at least a majority of the copper of the mineral material feed;
thiocyanate leaching at least a portion of the solid residue with an acidic thiocyanate leach solution to dissolve into the thiocyanate leach solution in the form of precious metal-thiocyanate complex at least a portion of the precious metal from the solid residue; and separating from the liquid effluent and recovering in a purified copper-containing product at least a majority of the copper dissolved in the liquid effluent;

wherein:

the pressure oxidizing is conducted at a temperature of at least 160° C. and oxygen gas over pressure of at least 10 psi;

the feed of the thiocyanate leach solution has a pH in a range of from pH 1 to pH 3 and the feed of the thiocyanate leach solution comprises of from 0.005 to 0.05 mole per liter of the dissolved thiocyanate;

the mineral material feed comprises at least 3 weight percent sulfide sulfur and at least 0.1 weight percent of the copper;

the precious metal comprises gold and during the thiocyanate leaching, a majority of the gold is dissolved into the thiocyanate leach solution in the form of precious metal-thiocyanate complex; and the recovering comprises solvent extraction from the liquid effluent of a majority of the copper dissolved in the liquid effluent.

6. The method of claim 5, wherein the mineral material feed comprises at least 1 weight percent of the copper metal that dissolves into the aqueous liquid during the pressure oxidizing and that is thereafter separated from the liquid effluent during the separating.

7. The method of claim 5, wherein the mineral material feed comprises at least 2 weight percent sulfide sulfur.

8. The method of claim 5, wherein the mineral material feed comprises at least 3 weight percent sulfide sulfur.

9. The method of claim 8, wherein the mineral material feed comprises a sulfide concentrate.

10. The method of claim 5, wherein the mineral material feed comprises at least 5 weight percent of the copper that dissolves into the aqueous liquid during the pressure oxidizing and that is thereafter separated from the liquid effluent during the separating.

11. The method of claim 5, wherein the separating comprises solvent extraction of copper from the liquid effluent.

12. The method of claim 5, wherein the precious metal comprises gold; and the thiocyanate leaching comprises dissolving into the thiocyanate leach solution at least a majority of the gold from the solid residue.

13. The method of claim 5, wherein feed of the thiocyanate leach solution to the thiocyanate leaching comprises dissolved ferric iron and a molar ratio of the dissolved ferric iron to the dissolved thiocyanate of at least 2.

14. The method of claim 13, wherein the feed of the thiocyanate leach solution comprises at least 0.05 mole per liter of the dissolved ferric iron.

* * * * *

UNITED STATES PATENT AND TRADEMARK OFFICE
CERTIFICATE OF CORRECTION

| | | |
|---|---|---|
| PATENT NO. | : 7,947,108 B2 | |
| APPLICATION NO. | : 12/476084 | |
| DATED | : May 24, 2011 | |
| INVENTOR(S) | : Rong Yu Wan and K. Marc LeVier | |

It is certified that error appears in the above-identified patent and that said Letters Patent is hereby corrected as shown below:

At Col. 48, line 31, please delete "hiocyanate" and insert therefor --thiocyanate--.

At Col. 49, line 8, please delete the "." after the "C".

Signed and Sealed this

Twenty-eighth Day of June, 2011

David J. Kappos
*Director of the United States Patent and Trademark Office*